United States Patent
Yamamoto et al.

(10) Patent No.: US 12,553,817 B2
(45) Date of Patent: Feb. 17, 2026

(54) PHOTON COUNTING AND MULTI-SPOT SPECTROSCOPY

(71) Applicant: CAPTL LLC, West Lafayette, IN (US)

(72) Inventors: Masanobu Yamamoto, West Lafayette, IN (US); J. Paul Robinson, West Lafayette, IN (US); Keegan Hernandez, Chicago, IL (US)

(73) Assignee: Miftek Corporation, West Lafayette, IN (US)

( * ) Notice: Subject to any disclaimer, the term of this patent is extended or adjusted under 35 U.S.C. 154(b) by 711 days.

(21) Appl. No.: 17/415,311

(22) PCT Filed: Dec. 16, 2019

(86) PCT No.: PCT/US2019/066652
§ 371 (c)(1),
(2) Date: Jun. 17, 2021

(87) PCT Pub. No.: WO2020/131754
PCT Pub. Date: Jun. 25, 2020

(65) Prior Publication Data
US 2022/0057317 A1 Feb. 24, 2022

Related U.S. Application Data

(60) Provisional application No. 62/780,571, filed on Dec. 17, 2018.

(51) Int. Cl.
*G01N 15/1434* (2024.01)
*G01N 15/14* (2024.01)
(Continued)

(52) U.S. Cl.
CPC ....... *G01N 15/1434* (2013.01); *H10F 30/225* (2025.01); *H10F 77/959* (2025.01);
(Continued)

(58) Field of Classification Search
CPC ....... G01N 15/1434; G01N 2015/1438; G01N 2015/1486; H01L 31/02027; H01L 31/107
See application file for complete search history.

(56) References Cited

U.S. PATENT DOCUMENTS 2,874,301 A * 2/1959 Dewan .................... G01V 5/04
250/262
4,683,893 A * 8/1987 Mayo .................. G01S 7/52026
600/442
(Continued)

FOREIGN PATENT DOCUMENTS

SU           993124 A1 *  1/1983
WO    WO2018191497        10/2018
WO    WO-2018191497 A2 * 10/2018 ............ G01J 3/0208

OTHER PUBLICATIONS

Frach et al., The Digital Silicon Photomultiplier—Principle of Operation and Intrinsic Detector Performance, 2009 IEEE Nuclear Science Symposium Conference Record.
(Continued)

*Primary Examiner* — Michelle M Iacoletti
*Assistant Examiner* — Jarreas Underwood
(74) *Attorney, Agent, or Firm* — Piroozi-IP, LLC

(57) ABSTRACT

An example system can include a support and two or more sensor elements mounted to the support. Each sensor element can be electrically connected to a common electrical node and may include: a respective quench resistor connected to a respective internal node; and a respective photodiode (PD) connected to the respective internal node; a differentiating element fed by at least one of the photodiodes; a first readout electrode fed by the common electrical node; and a second readout electrode fed by the differentiating element. The common electrical node may be connected to at least one of the quench resistors or at least one of the photodiodes.

18 Claims, 55 Drawing Sheets

(51) Int. Cl.
*H10F 30/225* (2025.01)
*H10F 77/00* (2025.01)
(52) U.S. Cl.
CPC ............... *G01N 2015/1438* (2013.01); *G01N 2015/1486* (2013.01)

(56) References Cited

U.S. PATENT DOCUMENTS

| | | | | |
|---|---|---|---|---|
| 5,530,551 | A * | 6/1996 | Cantrall | G01B 11/105 356/394 |
| 9,029,772 | B2 * | 5/2015 | Pavlov | H01L 31/107 250/338.4 |
| 11,274,962 | B2 * | 3/2022 | Kim | G01J 1/44 |
| 2010/0020922 | A1 * | 1/2010 | Carmi | G01T 1/2985 378/19 |
| 2012/0112088 | A1 * | 5/2012 | Abraham | G01T 1/171 250/336.1 |
| 2015/0268244 | A1 * | 9/2015 | Cho | G01N 15/1433 435/7.23 |
| 2016/0209318 | A1 * | 7/2016 | Javadi | G01N 15/1434 |
| 2016/0356696 | A1 * | 12/2016 | Lewis | G01N 15/1433 |
| 2017/0212250 | A1 * | 7/2017 | Jin | G01T 1/20184 |
| 2018/0014112 | A1 * | 1/2018 | Iyer | G10L 21/0264 |
| 2018/0259625 | A1 * | 9/2018 | Gnecchi | G01S 7/4873 |
| 2018/0269236 | A1 * | 9/2018 | Sasaki | H10F 30/225 |
| 2019/0025440 | A1 * | 1/2019 | Steadman Booker | G01T 1/2928 |

OTHER PUBLICATIONS

Kolka et al., Statistical Analysis of Silicon Photomultiplier Output Signals, Sensors 2022, 22, 9134.
Eraerds et al., SiPM for fast Photon-Counting and Multiphoton Detection, Optics Express, Oct. 29, 2007, 15(22), pp. 14539-14549.
Bretz et al., An integrated general purpose SiPM based optical module with a high dynamic range, 2018 JINST 13 P06001.
Roncali et al., Application of Silicon Photomultipliers to Positron Emission Tomography, Annals of Biomedical Engineering, Apr. 2011, 39(4), pp. 1358-1377.
Bruschini et al., Single-photon avalanche diode imagers in biophotonics: review and outlook, Light: Science & Applications 2019, 8:87.
Jönsson et al., Photon-counting distribution for arrays of single-photon detectors, 2020 Physical Review A 101, 013815.
Ma et al., Photon-number-resolving megapixel image sensor at room temperature without avalanche gain, Optica, 4 (12) Dec. 2017, pp. 1474-1481.
Buehler et al., Single-Photon Counting Multicolor Multiphoton Fluorescence Microscope, Journal of Fluorescence, 15(1), Jan. 2005.
Goodwin et al., Application of Single Molecule Detection to Dna Sequencing, 1997 Nucleosides and Nucleotides, 16:5-6, pp. 543-550.
Nguyen et al., Detection of Single Molecules of Phycoerythrin in Hydrodynamically Focused Flows by Laser-Induced Fluorescence, Anal. Cham. 1987, 59, pp. 2158-2161.
Lubin et al., Quantum correlation measurement with single photon avalanche diode arrays, Optics Express, 27(23), Nov. 11, 2019.
Korpar et al., Solid state single photon sensors for the RICH application, 2020 Nuclear Inst. and Methods in Physics Research, A 970, 163804.
Poland et al., A high speed multifocal multiphoton fluorescence lifetime imaging microscope for live-cell FRET imaging, Biomedical Optics Express, 6(2), Feb. 1, 2015.
Krstajic, et al., 0.5 billion events per second time correlated single photon counting using Cmos Spad arrays, Optics Letters, 40(18 ), Sep. 15, 2015.
Liu et al., Fast sensitive diffuse correlation spectroscopy with a SPAD array, Biophotonics Congress: Biomedical Optics 2020.
Chauhan et al., Single molecule detection; from microscopy to sensors, 2022 International Journal of Biological Macromolecules 209, pp. 1389-1401.
Rossetta et al., The BrightEyes-TTM as an open-source time-tagging module for democratising single-photon microscopy, Nature Communications (2022) 13:7406.
Eraerds et al., SiPM for fast Photon-Counting and Multiphoton Detection, Optics Express, Oct. 29, 2007 / vol. 15, No. 22.
Healey et al., Characterization of an InGaAs/InP single-photon detector at 200 MHz gate rate, 2011, Institute for Quantum Information Science, and Department of Physics and Astronomy, University of Calgary.
Bruschini et al., Monolithic spad arrays for high-performance, time-resolved single photon time correlation, 2018 International Conference on Optical MEMS and Nanophotonics (OMN).

* cited by examiner

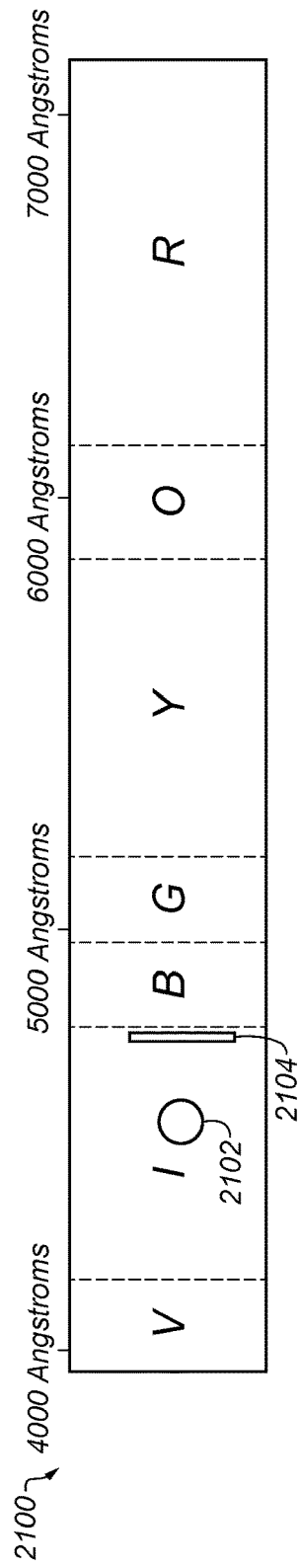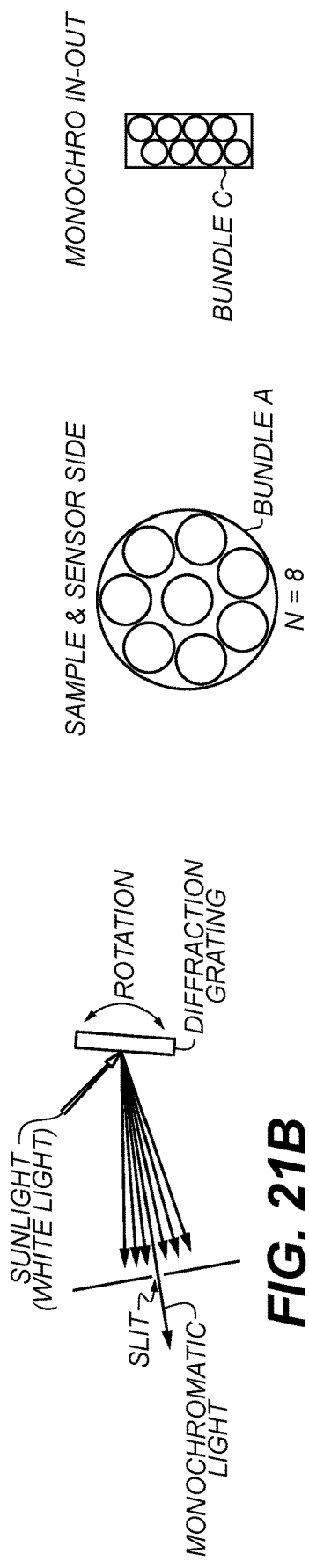
FIG. 21A
FIG. 21B
FIG. 21C
FIG. 21D
FIG. 21E
FIG. 21F
FIG. 21G

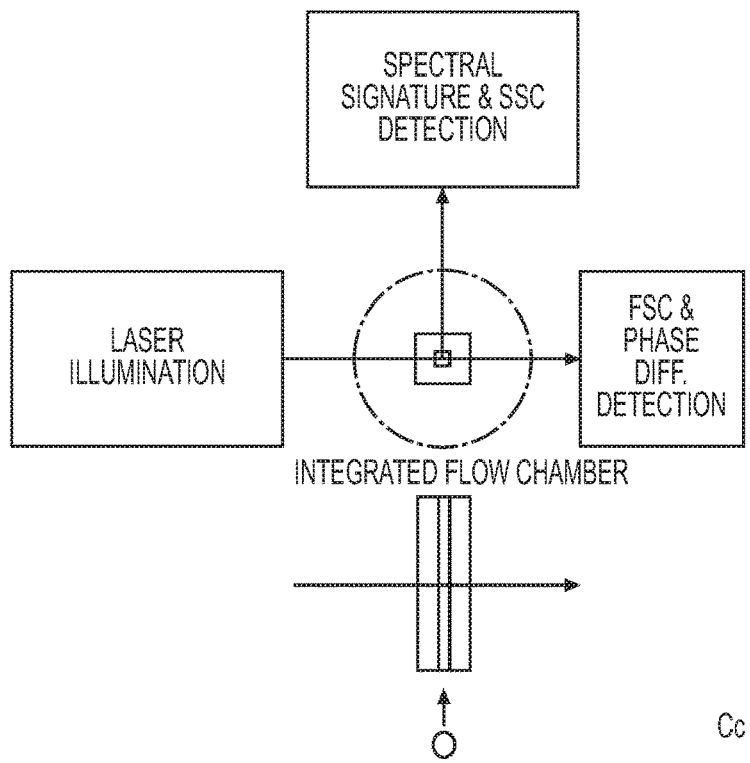
FIG. 47A
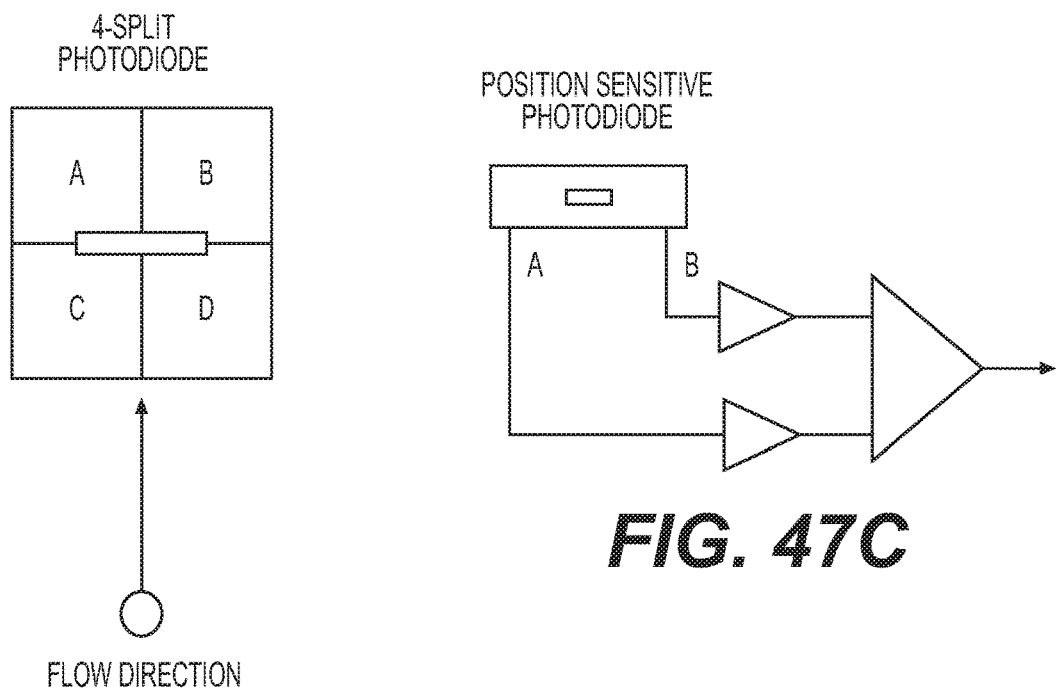
FIG. 47B
FIG. 47C

96 PIN PACKAGE

FROM FIG. 54

MULTI-LAYER CERAMIC BOARD

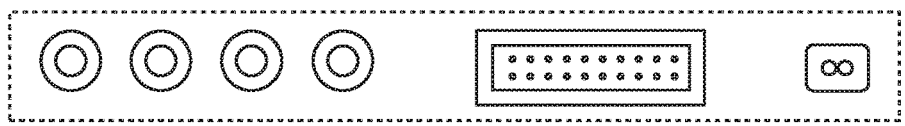
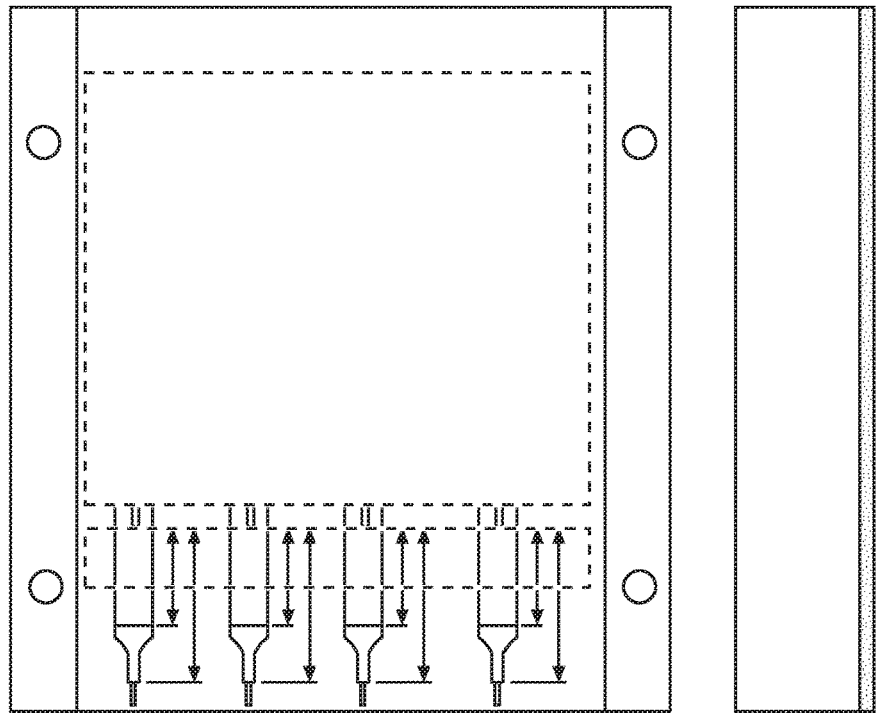
FIG. 55
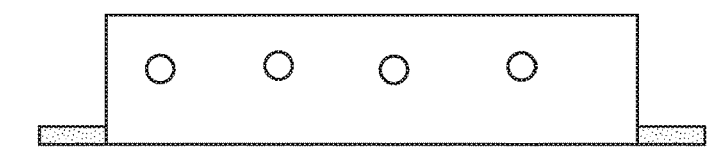
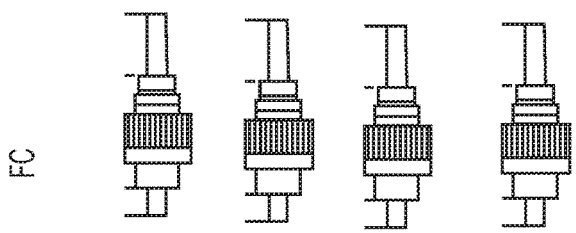
- LASER MODULATION FOR SEQUENTIAL EXCITATION
- ANY LAYOUT BY FIBER COUPLING
- REDUCED LASER LEAKAGE
- NO EXTERNAL LIGHT
SPECIFICATION
VERSATILE HIGH-SPEED LASER MODULATION INTERFACE

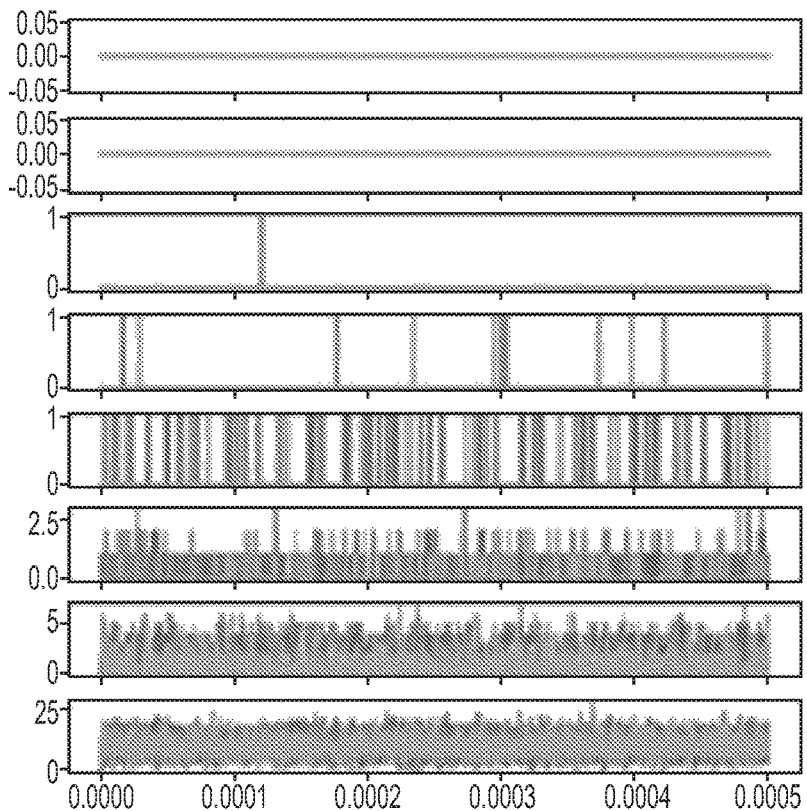

(3) THRESHOLD BASED ON MOVING AVERAGE - AVERAGE LENGTH CHOSEN AS 2US SO THAT SYSTEM CAN RESPOND TO 1US TIMEFRAME, AND WINDOW SIZE CHOSEN AS 10ns RESOLUTION ON FPGA IMPLEMENTATION

| RANGE | MAX |
|---|---|
| 1 | 0 |
| 10 | 0 |
| 100 | 1 |
| 1K | 1 |
| 10K | 1 |
| 100K | 3 |
| 1M | 7 |
| 10M | 29 |

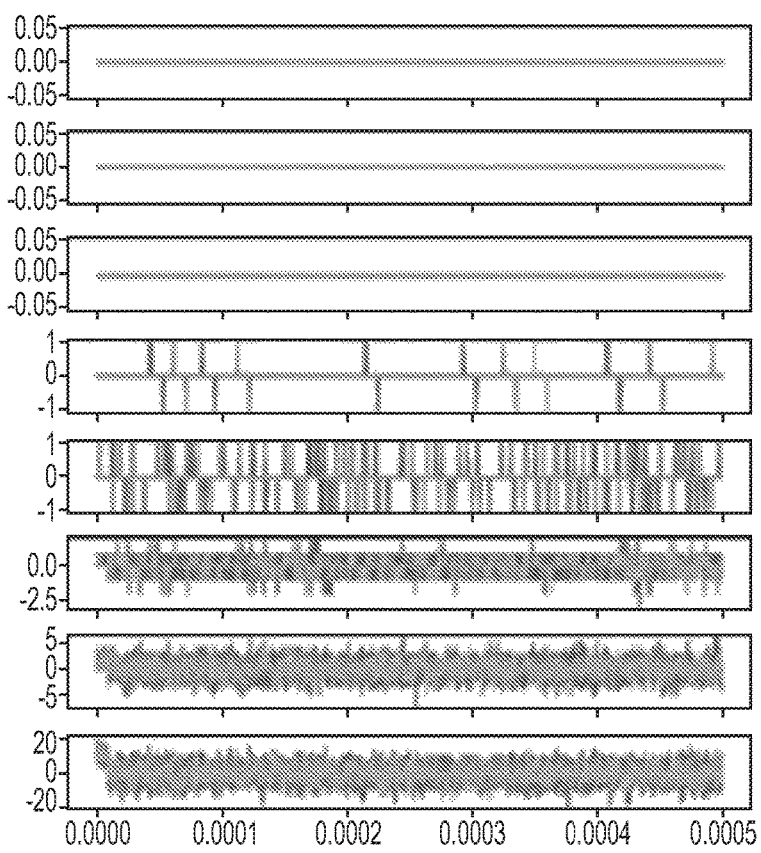

(4) THRESHOLD BASED ON DIFFERENTIAL OF MOVING AVERAGE - PARAMETERS ADJUSTED TO 1US WINDOW LENGTH, AVERAGE LENGTH - PARAMETERS THAT RESULT IN A RECOGNIZABLE WAVEFORM ONCE DIFFERENTIATED.

| RANGE | MIN | MAX |
|---|---|---|
| 1 | 0 | 0 |
| 10 | 0 | 0 |
| 100 | -1 | 1 |
| 1K | -1 | 1 |
| 10K | -1 | 1 |
| 100K | -3 | 3 |
| 1M | -7 | 7 |
| 10M | -19 | 20 |

*FIG. 59 cont.*

PHOTON COUNTING AND MULTI-SPOT SPECTROSCOPY

CROSS-REFERENCE TO RELATED APPLICATIONS

This application is a 35 U.S.C. § 371 Nationalization Application of and claims the priority benefit of the International Patent Application Serial No. PCT/US19/66652 filed Dec. 16, 2019, which claims priority to, and the benefit of, U.S. Provisional Patent Application No. 62/780,571, filed Dec. 17, 2018 and entitled "Photon Counting and Multi-Spot Spectroscopy," each of which is incorporated herein by reference in its entirety.

BRIEF DESCRIPTION OF THE DRAWINGS

Objects, features, and advantages of various aspects will become apparent when taken in conjunction with the following description and drawings. Identical reference numerals have been used, where possible, to designate identical features that are common to the figures. The attached drawings are for purposes of illustration and are not necessarily to scale.

FIG. 21A shows a spectrum spread spatially, and example fiber-bundle shapes.

FIG. 21B depicts components and operation of an example monochromator.

FIG. 21C shows a cross-section illustrating dense packing of optical fibers.

FIG. 21D shows an example circular fiber bundle.

FIG. 21E shows another example circular fiber bundle.

FIG. 21F shows an example rectilinear fiber bundle.

FIG. 21G shows another example rectilinear fiber bundle.

FIG. 47A illustrates a general overview of optics utilized in differential particle detection. As illustrated, an illumination source can illuminate a sample in an X direction (e.g., from left to right in FIG. 47A).

FIG. 47B illustrates an example of a multi-split PD that can be utilized in differential particle detection.

FIG. 47C illustrates an example circuit for combining the signals output by multiple photodiodes in a multi-split diode.

FIG. 55 illustrates an example housing for an optical system.

DETAILED DESCRIPTION

Overview

Figure 1:
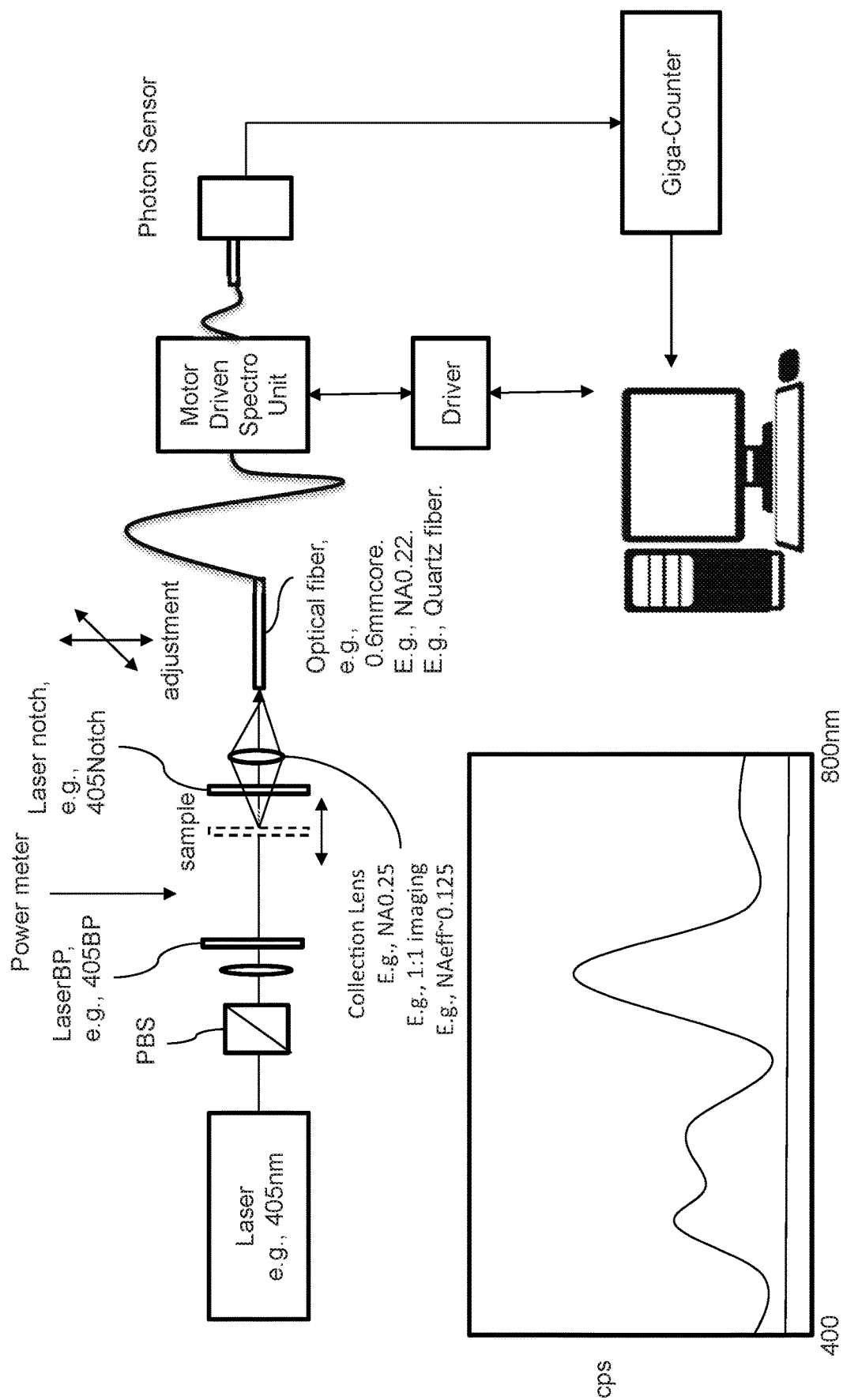
FIG. 1 shows a block diagram of an example excited-photon spectrum measurement/analysis system.

Various aspects relate to a silicon (Si)-based photon sensor and excited photon spectrum analyzer, e.g., a differential Geiger-mode photon spectroscope. Various examples receive photons at a solid-state photodetector that provides an output signal, then pass the output signal through a differentiator to provide a signal representative of the number or rate of photons striking the photodetector. Various examples count pulses or pulse widths of this representative signal to determine the rate of photons striking the photodetector. Various aspects can be used in flow cytometry, but are not limited thereto. Various aspects provide increased sensitivity and dynamic range compared to prior schemes. Various aspects relate to Single Photon Spectroscopy, e.g., counting each individual photon striking a photodetector. Various aspects can provide increased sensitivity for hyperspectral analysis, compared to prior schemes.

Laser induced fluorescence (LIF) analysis can be performed by photon counting for basic materials in flow cytometry, microscopy, imaging, and material science. Auto fluorescence (AFL) and photo bleaching phenomena in quartz, glass, sheath fluid, or other biological materials can be measured based on total photon counting over detectable spectral ranges. In order to investigate low level fluorescence, single photon spectral analysis with high spectral resolution can be performed in the spectral domain (i.e., across various wavelengths of light). Various aspects herein include devices, systems, and methods for performing single photon spectrometry. Various aspects use a motorized monochromator and a photon detector as described herein. Various aspects can measure the phenomena described in this paragraph, or optical characteristics of glass, quartz, or other light-transfer or -blocking materials, e.g., materials used in optical filters, lenses, or other components; in optically-clear vessels or adhesives; or in optical stops.

Various aspects permit using single-photon detection in flow cytometry, microscopy, or imaging. Various examples permit using single-photon detection in physics and chemistry experiments, e.g., the evaluation of materials such as optical components or other materials. Other examples of materials can include liquids, e.g., reagents, fluorochromes, buffers, or consumable liquids such as oils, wine, beer, juice, or water. Various examples of material evaluation permit measuring properties of materials with higher sensitivity and speed than some prior schemes, and at multiple wavelengths of light. Some examples permit evaluating properties of carbon nanotubes or other nanostructured materials. Such properties can include perhaps absorbance, autofluorescence, or reflectance. Some examples include measuring such properties using techniques described herein, and comparing the measured properties to references (e.g., in a database) to determine qualitative characteristics of the materials. Such characteristics can include, e.g., whether the materials are genuine.

In a tested example, samples were illuminated by 405-nm laser light in a 100 μm-diameter spot (after a bandpass filter) to reduce or eliminate accelerated spontaneous emission (ASE). Excited fluorescence on the optical axis was collected by a NA 0.125 lens and coupled to NA 0.22 optical fiber (after a laser wavelength notch filter). In some examples, e.g., using a filter with an optical density of about six (OD6), an additional notch or long pass filter can be used to separate laser illumination and induced fluorescence. The optical fiber was connected to a motorized monochromator having a 500 nm/sec scanning speed over a 200-900 nm spectral range. A synchronized stepping motor was used to drive a reflective grating. Photoelectrons were counted in a preset gating time for each spectral step selected. This permitted measuring at spectral steps of 1 nm and time intervals (gating times) of 0.1 sec. Counted photoelectrons were measured at specific photon energy levels. Such measurements can be performed in the spectral domain or the time domain. In some examples, spectral steps can be between ~0.1 nm and ~10 nm. In some examples, gating times can be between ~1 ms and ~10 s.

Various examples permit measuring or characterizing AFL spectra and bleaching phenomena, e.g., of basic materials used in flow cytometry instruments. Some examples permit observing spectra such as Raman spectra excited by laser wavelength, impurities, and molecular structures in materials. Single photon spectroscopy as described herein can provide increased sensitivity and wide dynamic range compared to prior schemes. Some examples can permit quantitative analysis of fluorescence, which can permit investigation of material characteristics as well as bio assays that exhibit lower levels of fluorescence than do assays testable by some prior techniques.

Various examples include a silicon (Si) photon sensor and single photon spectrometer that provide high sensitivity and permit quantitative analysis for fluorescence using relatively short measurement times. Single photon spectroscopy can permit next-generation cellular analysis and material improvement. Some examples can collect samples in microsecond-scale time windows via parallel spectral detection.

Various aspects relate to a wide-dynamic-range Si Photon Detection System using a differential Geiger-mode sensor. Digital photon detection based on the Einstein-Planck equation can permit sensing small numbers of photons. However, for photodetection in the context of biology, e.g., flow cytometry, some prior photodetectors do not provide a sufficiently wide dynamic range to effectively capture conjugated fluorescence signals. Therefore, various flow-cytometry schemes use photocurrent detection from a photomultiplier tube (PMT), solid-state photomultiplier (PM), or micro-PMT.

Various examples herein provide a Si photon sensor and electronics with a wide dynamic range, e.g., six orders of magnitude of dynamic range. Accordingly, sensors herein can be used in cytometry or other biological-analysis contexts.

Some examples use arrayed Si avalanche photodiodes (APDs) operating in the Geiger mode. Incident photons on a pixel (e.g., a particular APD) produce electron-hole pairs. The corresponding current is magnified by several orders of electrons by breakdown of the electric field at p-n junctions. Charged electrons are quenched by a serial register in each pixel, e.g., in ~50 ns for a ~100 kΩ quench resistor and a ~500 fF pixel capacitance. In prior schemes, the quenching time of a pixel defines the upper limit of photon pulse counting per second. The lower limit is determined by dark count or dark count deviation caused by thermal effects. In general, the dynamic range of a multi-pixel Si photomultiplier is dependent on the number of pixels.

Various examples herein collect a differential signal from a pixel. This style of collection is referred to herein as "differential Geiger mode." Using differential signals permits detection of multiple photons from a pixel even within the quenching time of that pixel. Shorter pulse pair resolution (less than 1 ns), as in various examples, can permit resolutions up to, e.g., one billion counts per second (1 Gcps). Various examples include a very-high-speed comparator and GHz-rate counter electronics, which can permit detecting and counting sub-ns photon pulses. Various examples have a low dark count of 50 kcps/mm$^2$ at room temperature, in a tested configuration. Various examples provide further reduction of the dark count by actively cooling the sensor, e.g., using a cooling unit. Various examples include a Peltier cooling unit and can achieve dark counts lower than e.g. 1 kcps, or about 100 cps at −30° C., with 10 cps standard deviation. Various examples include system-control and measurement software.

Various example Si photon detection systems herein can evaluate from sub-fW to nW range light power with theoretical linearity. Various examples provide a detectable sensitivity improved by about 3 orders of magnitude compared with prior photocurrent detection schemes. Various examples provide picosecond time resolution, which can permit measurement or analysis of individual molecular interactions in live cells. Some examples permit calibrating light power and analyzing spectrum as a measurement technology. Some examples include, e.g., calibrating based on knowledge of the Si photon sensor photon-detection efficiency (PDE) and reflective grating diffraction efficiency for particular wavelengths. Various examples can permit measuring intrinsic auto fluorescence phenomena of optical and biologically-pertinent materials such as quartz, glass, pure water, or silica or polymer beads.

Various examples can measure individual photons, which may have very low energies. Values of photon energy versus wavelength for typical laser wavelengths in flow cytometry are: 405 nm: 740 THz 3.06 eV; 488 nm: 614 THz 2.54 eV; 532 nm: 563 THz 2.33 eV; 594 nm: 504 THz 2.08 eV; 633 nm: 473 THz 1.95 eV; 780 nm: 384 THz 1.58 eV. Owing to the small energy per photon, the number of photons per pW can be expressed as megacounts per second (Mcps), e.g.: 405 nm: 2.04 Mcps/pW; 488 nm: 2.46 Mcps/pW; 532 nm: 2.68 Mcps/pW; 594 nm: 3.00 Mcps/pW; 633 nm: 3.20 Mcps/pW; 780 nm: 3.95 Mcps/pW. In general, 1 pW is the lowest detection limit of a PMT photocurrent signal. In general, a photon sensor has thermal noise, known as dark count, in the range of 1 cps to ~1 Mcps. Dark count is sensitive to temperature and determines the detection limit. In addition, dark-count standard deviation per second (r) and coefficient of variation CV (%) are considered as the resolution limit of light intensity. Temperature control of the sensor can improve dark count and its standard deviation.

Photon counting is the digital measurement of light intensity with extremely high sensitivity and linearity. If a detected photon pulse is an ideal impulse with pulse width "zero" and dark count "zero," the photon detection system is ideal. Unfortunately, real photon pulses have finite pulse width and waveform. The upper count rate is determined by pulse width and the lower limit by dark-count rate. Owing to pulse overlapping, the true count value N and measured value M are described as: N−M=NMt, where t is the pulse pair resolution. For example, with t=1 ns, the error is relatively small up to 10 Mcps and a gradually larger error for higher count rates. If necessary, it is possible to correct the measured value up to ~1 Gcps by this model. 1 Gcps is equal to 0.5/QE nW at 405 nm and 0.25/QE nW at 780 nm (QE=quantum efficiency). Therefore, it can be possible to achieve over six decades of magnitude and linearity with dark count <1 kcps and pulse pair resolution 1 ns, e.g., at a maximum 1 Gcps measurement. However, photon pulse pair resolution in some prior schemes is longer than 10 ns. Furthermore, measured signals have fluctuations that produce counting threshold deviation, causing additional error in some prior sensors.

Various examples can reach these levels of performance. Dark count rate (DCR) is another factor to determine sensitivity limit. In general, dark count is proportional to sensor area. A smaller photocathode or sensor active area usually reduces dark counts. Reducing sensor area by 90% may reduce dark count by about 90%. However, prior schemes, e.g., of flow cytometer optics for fluorescence detection, have relatively large aberrations as well as a large spot image due to broad wavelength and high NA collection lens without compensation. Various examples use reflective optics or optical fiber coupling to improve detection with smaller sensors.

Sensor structure and material can also significantly contribute to dark counts. Dark-count origins include thermal noise in the sensor or photocathode. Materials with higher sensitivity in the IR region have higher dark-count characteristics. For example, comparing bialkali and multi-alkali photocathode materials for detection at extended longer wavelengths, multi-alkali shows a higher dark count. Various examples control dark count and reduce signal deviations by temperature control. Peltier cooling can be used to reduce dark count. For cooling purposes, a smaller sensor is easier to implement.

Light intensity measurements with theoretical linearity can be performed by photon counting in the digital domain. Various examples permit analyzing the photon spectrum or photon energy. Hyperspectral analysis is a useful technique for cellular analysis. Photon spectroscopy can be implemented in at least two ways. One is in combination with a motorized monochromator and photon detector using a long capture time (>1 s). A recent motorized monochromator has a wavelength scanning speed of 500 nm/s. Because photon measurement for flow particles is in the μs to ms time domain, some examples include a parallel photon detection system.

Various examples permit biological fluorescence analysis using detectors having high sensitivity and wide dynamic range with linearity in wavelengths of interest, e.g., visible wavelengths or other wavelengths. Photon detection has sufficient sensitivity if dark count is low. The upper dynamic range of photon detection is mainly determined by maximum count capability per second. Various examples provide a shorter photon pulse width and reduced dead time, compared to some prior schemes.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art.

Steps of various methods described herein can be performed in any order except when otherwise specified, or when data from an earlier step is used in a later step. Example method(s) described herein are not limited to being carried out by components particularly identified in discussions of those methods. Section headers are solely for ease of reference and do not restrict the combinations covered by this disclosure. A feature described in a particular section can be used in conjunction or combination with features described in that section or in other sections.

Illustrative Configurations, Techniques, and Operations

FIG. 1 shows a block diagram of an example excited-photon spectrum analyzer system, and an example graph (lower left) of output in counts per second (cps) as a function of wavelength in nanometers (nm) from 400-800 nm. The example graph shows a visible range of 400 nm-800 nm, but this is not limiting. Various examples use a differential Geiger mode for photon detection. Example detectors can include an array of avalanche photodiodes having capacitive couplings ("C-couplings") to a sensor output (a "fast output"). In some examples, the fast outputs are wired in parallel, e.g., as shown in FIG. 36. Example photon sensors, and related components, are described herein with reference to FIGS. 2A-15, 19, 21A-22, 27A-28, 32, 33, or 35-37. For example, any of the following SENSL SiPMs can be used: 10010, 10020, 10035, 10050, 30020, 30035, 30050, or 60035. For example, an SiPM can have an active area of 1 $mm^2$, 3 $mm^2$, or 6 $mm^2$; a photodiode-cell size between 10 $\mu m^2$ and 50 $\mu m^2$; a fill factor between 25% and 75%; a photodiode count between 250 and 3000; or a photodiode density between about 100 $mm^{-2}$ and about 1000 $mm^{-2}$. "BP" is a bandpass filter; "notch" is a notch filter. "LaserBP" is a bandpass filter that will substantially pass the laser light; "Laser notch" will substantially block the laser light. "Giga-counter" is an electronic pulse counter, e.g., capable of counting at GHz rates.

The laser light L, or other electromagnetic radiation radiated into the sample, is referred to herein as "incident light." Light or other electromagnetic radiation transmitted through the sample, or light emitted from targets, fluorescent dyes (e.g., bound to targets), or other substances within the sample, is referred to herein as "resultant light." Resultant light can include electromagnetic radiation provided by, e.g., scattering, refraction, absorption, or rotation of the plane of polarization of the incident light, or any combination thereof. Throughout this document, the terms "scatter," "scattering," and the like include refraction, absorption, and polarization rotation, as appropriate, unless otherwise explicitly noted. Resultant light can include forward-scattered (FS) light and side-scattered (SS) light. FS and SS have substantially the same wavelength as the light source, e.g., the laser. Resultant light can also include fluorescent light, since such light can be emitted by the sample or substances within the sample. Resultant light can be substantially directional (e.g., transmitted light of the laser light L) or substantially omnidirectional (e.g., fluorescence), or can have a selected or characteristic radiation pattern (e.g., a cardioidal variation of intensity as a function of angle from the direction of the incident light).

Various example sensors or detection systems herein provide at least one of: a fast output, an amplifier having a bandwidth >200 MHz, an impedance <200Ω, or a pulse width (pulse duration) of <5 ns. For example, bandwidth >200 MHz and impedance <200Ω can permit detecting 1 ns-wide pulses. In some examples, sensors as described herein, e.g., with reference to FIGS. 2A-4A, 11A-11C, 32, 33, or 35-37 can be used as the illustrated "photon sensor." Various examples of photon-counting spectral-analysis systems such as that shown in FIG. 1 can provide or include pulse clamping (e.g., FIG. 9, 10, or 1517), a comparator (e.g., FIGS. 7 and 9), or very-high-speed counting (e.g., FIG. 9).

Various example systems and techniques shown in FIG. 1 and elsewhere herein can permit collecting data and analyzing the data to determine, e.g., wavelength or time dependencies for phenomena such as photo bleaching. Various examples permit detecting photon counts and, from those photon counts, together with at least one of photon energy, illumination power, optics NA, or sensor PDE, quantitatively estimating and analyzing fluorescence characteristics. Various examples permit determining optical-filter performance, performing material AFL analysis, performing color analysis, performing bio-assay analysis, or performing cellular or particle analysis.

In the illustrated example, incident light from the laser strikes the sample. Resultant light is collected in the optical fiber and carried to a spectral-discrimination device ("spectral device" or "spectro unit"), e.g., a monochromator or polychromator. The illustrated example shows a "motor driven spectro unit," e.g., a motorized monochromator. However, this is not limiting. In other examples such as some shown below in Table 1 and FIGS. 26B-29, a motorized or non-motorized polychromator can be used, e.g., with an array sensor or a fiber array. The spectral-discrimination device permits measuring different wavelengths of light separately. In FIG. 1, a single photon sensor successively measures each wavelength of interest in the resultant light. In other examples, one or more photon sensor(s) or elements thereof can concurrently measure respective wavelength(s) of the resultant light. The measurements can include rates of photon incidence on the photon sensor, e.g., in counts per second.

In various examples, a photon sensor can include a sensing element such as a vacuum-tube based photomultiplier tube (PMT), a solid-state (e.g., Si) photomultiplier tube (SSPMT, e.g., FIGS. 32 and 33), a silicon photomultiplier (SiPM, e.g., FIGS. 2A-3B), an avalanche photodiode (APD), or a single-photon avalanche diode (SPAD). The term "tube" is used in reference to SSPMTs merely to distinguish them from SiPMs and other types of photon sensors. The term "tube" does require, that an SSPMT have any particular pressure (e.g., vacuum) or material contained in the SSPMT. In various examples, a photon sensor can include multiple sensing elements, e.g., an array of SSPMTs arranged on a printed circuit board (PCB), or an array of SiPMs, APDs, or SPADs arranged on a wafer (e.g., FIGS. 2A-3B). In some examples, a photon sensor can include combinations of any of these. SSPMTs, SiPMs, APDs, SPADs, and arrays of any of those are examples of solid-state photon detectors (SSPDs). The term "SiPM" is used for brevity and can include other semiconductor photomultipliers (SPMs) that include APDs or SPADs, e.g., APDs or SPADs on InGaAs or SiC substrates, or other semiconductor types discussed below. In some examples, SiC is used for detection of ultraviolet photons.

Various examples can use different spectral-discrimination devices or photon sensors. Nonlimiting example combinations can include those listed in Table 1. Throughout this document, "CH" refers to a channel of optical measurement. Examples of various components listed in Table 1 are described herein with reference to FIGS. 1-6B, 9, 11A-11C, 17, 18, 19, 20, 21A-21G, 22, 23, 24, 25, or 26A-29.

TABLE 1

| Spectral Device | Example light extraction | Number of photon sensors | Type of photon sensor and mount | Example features of some aspects |
| --- | --- | --- | --- | --- |
| Monochromator | Angular scan across slit, optical fiber coupling, or sensing element | 1 | Any SSPD listed above (e.g., FIGS. 1 or 26A) | wide $\lambda$ range(200-900 nm); Accurate FWHM; Flexible combination |
| Polychromator | Linear scan across fiber coupling | 1 | Any SSPD listed above, receiving light via an optical fiber (e.g., FIG. 26B, linear scan) | $\lambda$ range (340~800 nm); simple mechanism; faster scan than angular; no $2^{nd}$ harmonic |
| Polychromator | Linear scan across sensing element (e.g., mounted SSPD) | 1 | Any listed above, mounted to receive light directly from polychromator (e.g., FIG. 26B, array) | As above; All in one; compact; lower cost |
| Polychromator | No movement; fixed fiber array, 32-64CH | 32-64 | SSPD array sensor, or group of discrete sensing elements. Mounted to receive light from respective optical fibers (e.g., FIGS. 27A and 27B | Parallel detection; High speed detection in µs |
| Polychromator | No movement; fixed SiPM array | 128-256 (or more, e.g., 1024 or 2048) | SSPD array sensor, mounted to receive light directly from polychromator (e.g., FIG. 26B, array) | As above; Low dark count; All in one |

Figure 2C:
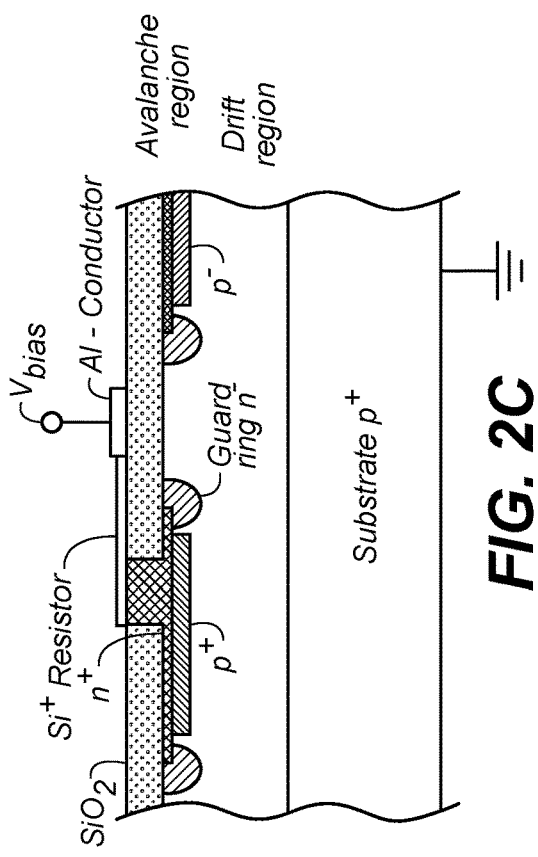
FIG. 2C is an elevational cross-section of an example SiPM.
Figure 2D:
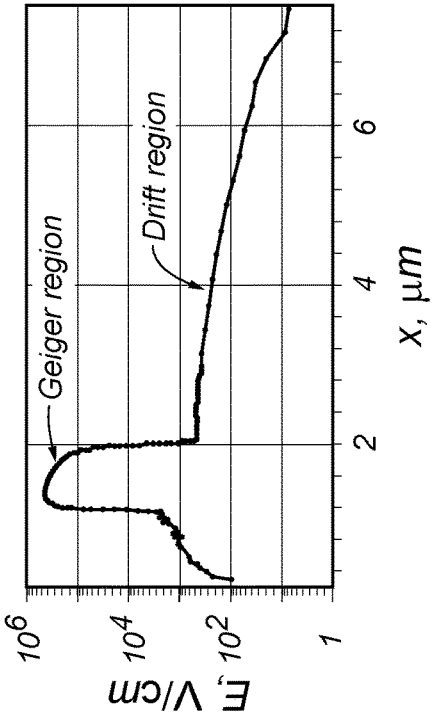
FIG. 2D shows electric-field characteristics of an example SiPM.
Figure 2A:
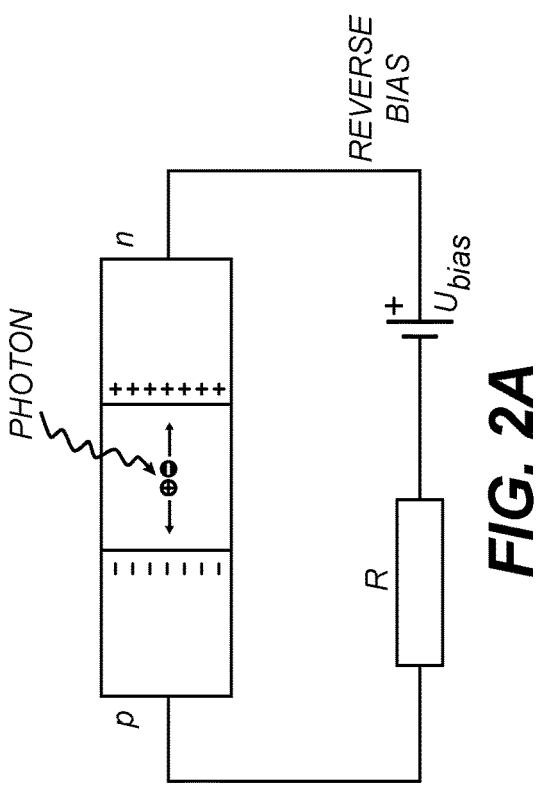
FIG. 2A shows an example structure of a silicon photomultiplier (SiPM) circuit.

FIG. 2A shows an example structure of a SiPM, which is an example of a solid-state photon detector (SSPD). An SiPM such as that shown can provide small size, high quantum efficiency, lower bias voltage, light durability, insensitivity to magnetic fields, lower cost, and more, compared to a conventional PMT. In a PMT, an incident photon produces an electron-hole pair in the photocathode, which is an electrical insulator; vacuum and high voltage can permit capture of the induced electron. On the other hand, the electron-hole pair of a solid-state sensor such as that shown is produced in the p-n junction, which is semi-conductive material. The produced electron moves rapidly and the acceleration depends on the reverse bias electric field. The illustrated SiPM includes a photodiode (PD), e.g., an APD or SPAD, and a quench resistor R, discussed below.

Figure 2B:
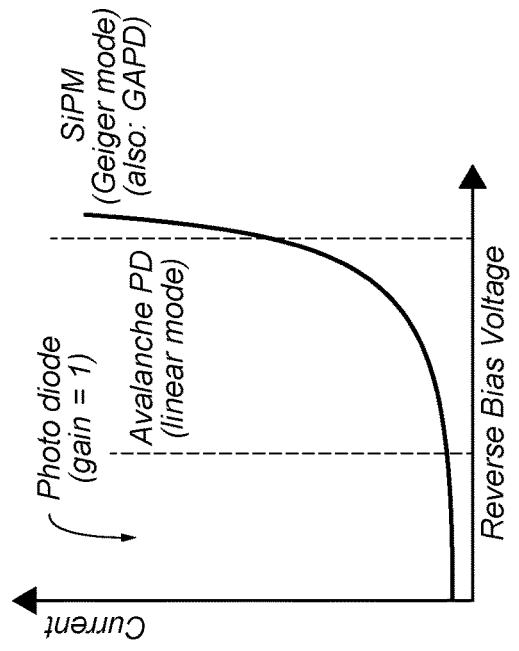
FIG. 2B shows example characteristics of an SiPM.

FIG. 2B shows various examples of principles of operation of example SiPMs. In the Geiger region of operation, the bias voltage is sufficiently high in magnitude (e.g., >$5\times10^5$ V/cm) that, when a photon strikes the sensor and releases a photoelectron, that electron can strike other atoms and release additional electrons. Accordingly, a single photon can trigger a cascade of electrons that causes the SiPM to become conductive and produce a detectable current. There are three phases of operation: P-I-N mode with gain=1, linear avalanche mode with gain ~100 and Geiger mode over break-down voltage with gain ~$10^6$. Geiger mode is highly sensitive for incident photons owing to a high QE ~0.8 and gain >$10^6$.

Figure 3A:
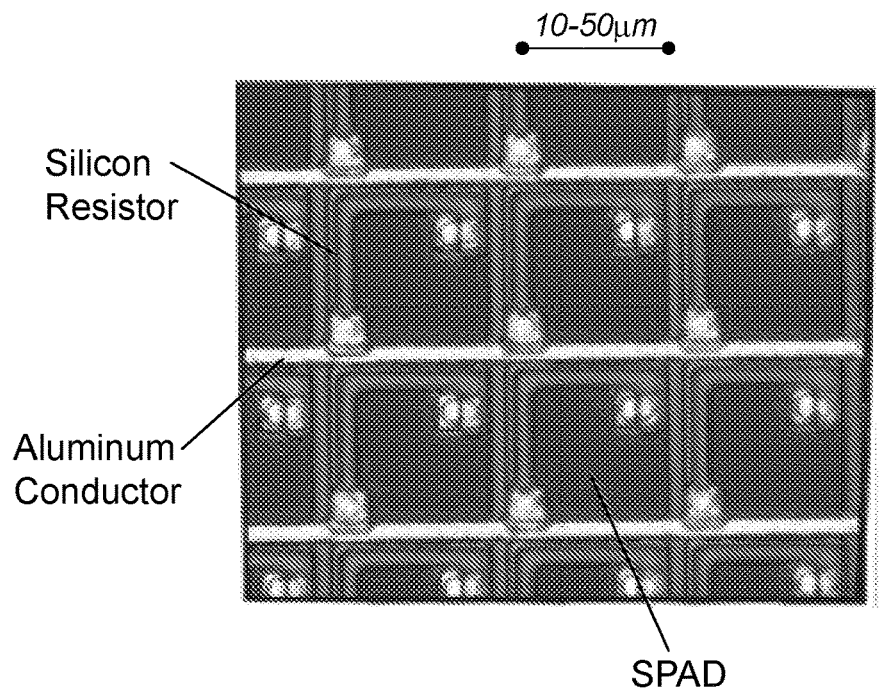
FIG. 3A is a graphical representation of a micrograph of an example SiPM.

Once a photon has hit and triggered an avalanche, a quenching resistor in series with the PD is used to reset the PD without requiring active circuitry. As the current increases, the quenching resistor's voltage increases, and so the photodiode's voltage decreases. Once the current increases to the point that the photodiode's voltage is below the Geiger breakdown threshold, conduction will substantially cease until the photodiode's voltage has risen above the breakdown threshold and the next photon impact event takes place. Quenching time, typically 50 ns, is called dead time because the detector will not fire even if struck by a photon. In order to expand the dynamic range, a Geiger mode sensor has a structure arrayed as pixels (FIG. 3A). SiPM photon detection efficiency PDE is defined as QE×$\epsilon_{geo}$×$\epsilon_{trig}$, where $\epsilon_{geo}$ is the geometrical fill-factor and $\epsilon_{trig}$ is the avalanche triggering probability. When a pixel is "fired," a SiPM has secondary fire phenomena called "crosstalk," at adjacent pixels, and "afterpulse," a delayed signal in the fired pixel. Various examples permit performing accurate photon-count measurements even in the presence of these factors.

FIG. 2C shows an elevational cross-section of an example SiPM fabricated on a wafer.

FIG. 2D shows an example of electric-field magnitude during operation of an SiPM.

APD cells vary in dimension from 20 to 100 microns depending on the mask used, and can have a density of up to 1000/mm$^2$. Avalanche diodes can also be made from other semiconductors besides silicon, depending on the properties that are desirable. Silicon detects in the visible and near infrared range, with low multiplication noise (excess noise). Germanium (Ge) detects infrared to 1.7 μm wavelength, but has high multiplication noise. InGaAs (Indium Gallium Arsenide) detects to a maximum wavelength of 1.6 μm, and has less multiplication noise than Ge. InGaAs is generally used for the multiplication region of a heterostructure diode, is compatible with high-speed telecommunications using optical fibers, and can reach speeds of greater than Gbit/s. Gallium nitride operates with UV light. HgCdTe (Mercury Cadmium Telluride) operates in the infrared, to a maximum wavelength of about 14 μm, uses cooling to reduce dark currents, and can achieve a low level of excess noise.

Silicon avalanche diodes can function with breakdown voltages of 100 to 2000V, typically. APDs exhibit internal current gain effect of about 100-1000 due to impact ionization, or avalanche effect, when a high reverse bias voltage is applied (approximately 100-200 V in silicon). Greater voltage can be applied to silicon APDs, which are more sensitive compared to other semiconductor photodiodes, than to traditional APDs before achieving breakdown allowing for a larger operating gain, preferably over 1000, because silicon APDs provide for alternative doping. Reverse voltage is proportional to gain, and APD gain also varies dependently on both reverse bias and temperature, which is why reverse voltage should be controlled in order to preserve stable gain. SiPMs can achieve a gain of $10^5$ to $10^6$ by using Geiger mode APDs which operate with a reverse voltage that is greater than the breakdown voltage, and by maintaining the dark count event rate at a sufficiently low level.

Geiger-mode APDs produce relatively large charge pulse when struck by a photon of the same amplitude no matter the energy of the photon. When reading out conventional APDs, noise of the preamplifier significantly degrades timing and amplitude resolution performance for short (shorter then ~500 ns) light pulses. Compared to conventional APDs, SiPMs using Geiger mode APDs provide much higher output amplitude, which can reduce the effect of preamplifier noise.

Figure 3B:
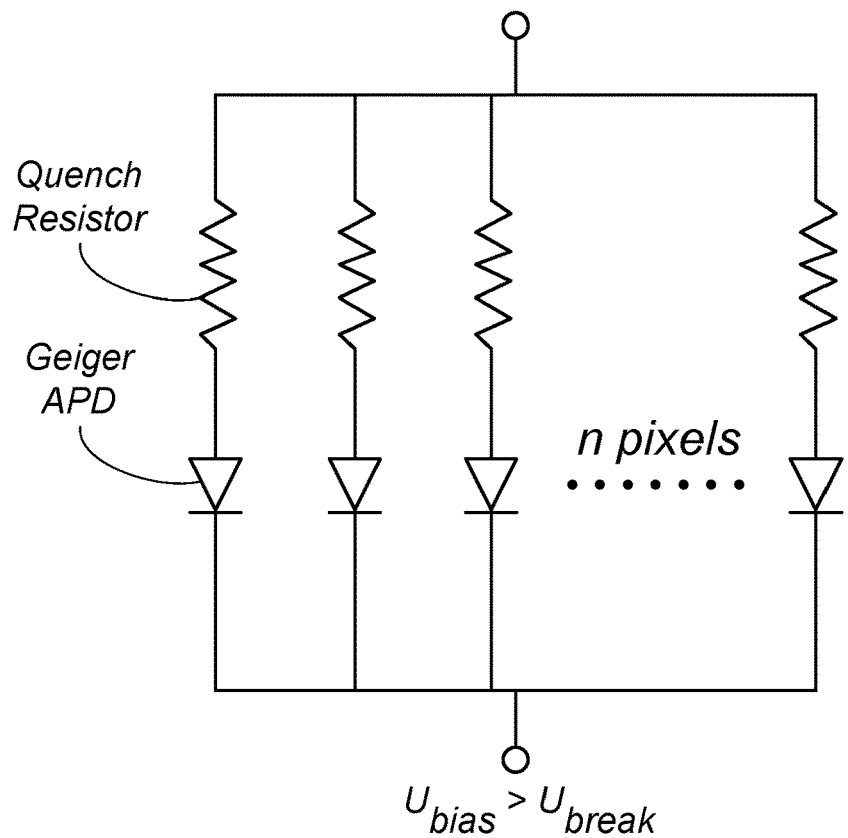
FIG. 3B is a circuit diagram of an example SiPM.

FIG. 3A is a graphical representation of a micrograph, and FIG. 3B is a circuit diagram, showing example configurations of SiPM arrays. As shown, a sensor can include rows and columns of sensor elements. As shown in FIG. 3B, each sensor element (or individual sensor elements) can include a quench resistor in series with a Geiger-mode avalanche photodiode (APD), e.g., a SPAD. as in Example details of these components are shown in FIGS. 2A-2D. The sensor elements ("pixels" or "microcells") can be electrically in parallel across a row, column, or 2-D sensor array. As current flows through the APD in response to impact of a photon thereon, voltage across the quench resistor increases. Therefore, voltage across the APD decreases. When the voltage across the APD drops below the Geiger threshold (FIG. 2B), the APD will cease to conduct and will be ready to detect another photon. This process is referred to as "quenching."

An array SiPM (e.g., using Geiger mode PDs) such as that illustrated can provide high gain (e.g., >$10^6$) and high sensitivity of photon detection. Such sensors can be relatively compact and can operate with relatively low bias voltages, e.g., <25-70 V. Such sensors can be durable under light exposure and can be relatively insensitive to magnetic fields. However, some prior schemes have a limited dynamic range due to the limited number of pixels on the sensors and the dead time during quenching, during which those prior sensors do not detect photons. Moreover, some prior sensors have relatively high dark count rates (i.e., appreciable output signal even when no light is incident) or can be sensitive to temperature variations.

In some examples, the SiPM avalanche process is very fast, e.g., on the order of picoseconds (e.g., 10 ps-100 ps). However, the quenching ("recharge" or "dead time") process is comparatively slow, e.g., on the order of nanoseconds (e.g., 50 ns-100 ns). As noted above, during some prior schemes, the sensor does not detect photons during the recharge process. Accordingly, some prior sensors only provide a dynamic range of about three orders of magnitude.

Figure 4A:
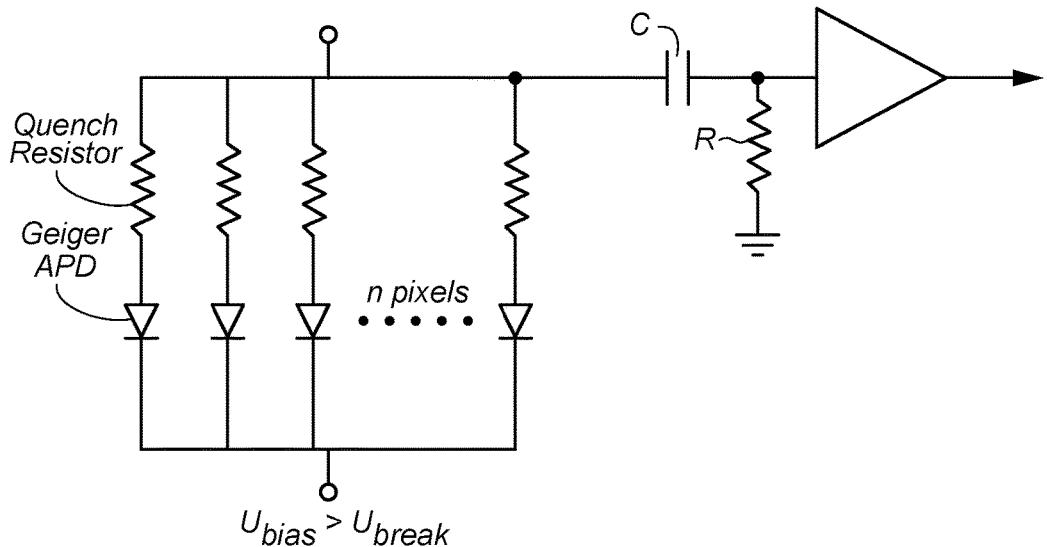
FIG. 4A shows an example SiPM readout circuit including a differentiator, and related SiPM components.

Some examples sensors and detection systems herein permit using SiPMs for biological photon detection applications that require wider dynamic range, e.g., six orders of magnitude. Various examples detect the avalanche mode using a combination of a high pass filter and a differentiation signal processing block. A tested example was able to perform multiple photon detection, even during the dead time. Accordingly, various examples can provide a dynamic range up to, e.g., six orders of magnitude FIG. 4A shows an example circuit using a differentiator (represented as an RC high-pass filter followed by a buffer (triangle)) to provide 1 ns photon pulses. In some examples, the differentiator produces a time derivative (e.g., $\Delta V/s$ or $\Delta A/s$) of the input signal (e.g., V or A). Using a differentiator can permit detecting multiple photons using a single pixel, which can in turn increase dynamic range. The SiPM output waveform has a fast avalanche process measured in picoseconds and a slow recharge process measured in nanoseconds. The high-pass filter and signal differentiation permit detecting only the avalanche process. Experiments were performed using an ultrahigh-speed differentiating circuit with GHz-bandwidth amp or equivalent differentiation in pixels to show multiple photon detection even during quenching dead time. This measurement technique, and corresponding signal processing described herein, are referred to for convenience and without limitation as "differential Geiger mode." In some examples, a monolithic or on-chip capacitor is used to perform filtering with reduced parasitic capacitance and inductance compared to off-chip parts. In the illustrated example, the differentiator's input (on capacitor C) is connected opposite the quench resistor from the APD. The illustrated differentiator can additionally or alternatively be connected to: the anode of the SSPMT shown in FIGS. 32 and 33; the Vbias or Iout electrodes shown in FIG. 35; or the Vbias, Fast out, or Iout/Common electrodes shown in FIG. 36.

Figure 4B:
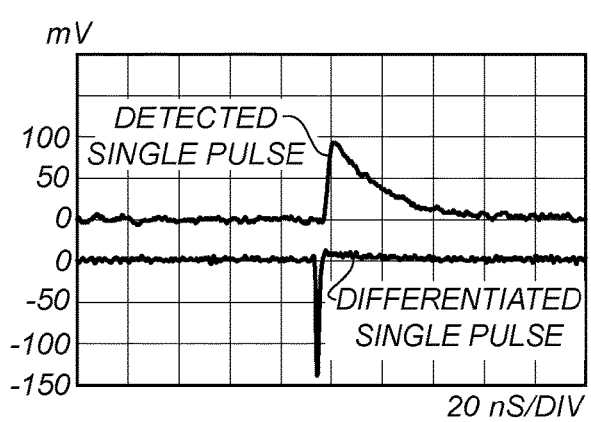
FIG. 4B shows measured data of an output from the circuit of FIG. 4A for a single photon pulse.

FIG. 4B shows an example output from the circuit of FIG. 4A, showing that a single pulse produces a detectable spike in the differentiated photon signal output by the differentiator circuit.

Figure 4C:
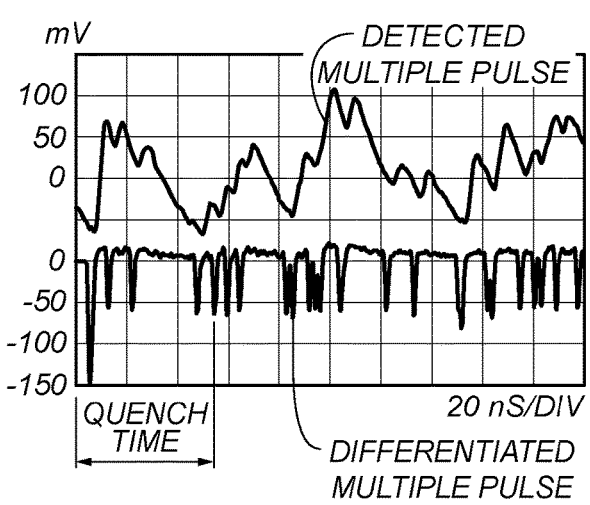
FIG. 4C shows measured data of an output from the circuit of FIG. 4A for multiple photon pulses.

FIG. 4C shows an example output from the circuit of FIG. 4A. As shown, the differentiated photon signal shows pulses even when a photon strikes the detector during the dead time (quenching period). Although the differentiator is shown as attached on the anode side of the APDs, it can additionally or alternatively be attached on the cathode side of the APDs. Similarly, the quench resistor for an individual APD can be attached on either the anode or the cathode side of that APD.

An experiment was performed to measure a photon pulse using an SiPM without a fast out, e.g., similar to the configuration of FIG. 4A. A unipolar pulse of FWHM ~600 ps duration was detected, with a pulse height of ~50 mV.

An experiment was conducted to measure counts per second (cps) from a sensor as a function of the power of the light incident on the sensor in pW. The experimental results showed a positive correlation between pW and cps. That correlation was substantially linear in certain regimes, e.g., 0-400 pW and 600-1400 pW. In some examples, accordingly, counts above 250 Mcps can be provided and counted. An experiment was also conducted to measure signals output by a differentiator circuit, e.g., as discussed herein with reference to FIGS. 4 and 5. The experimental data showed discernable pulses.

Figure 5:
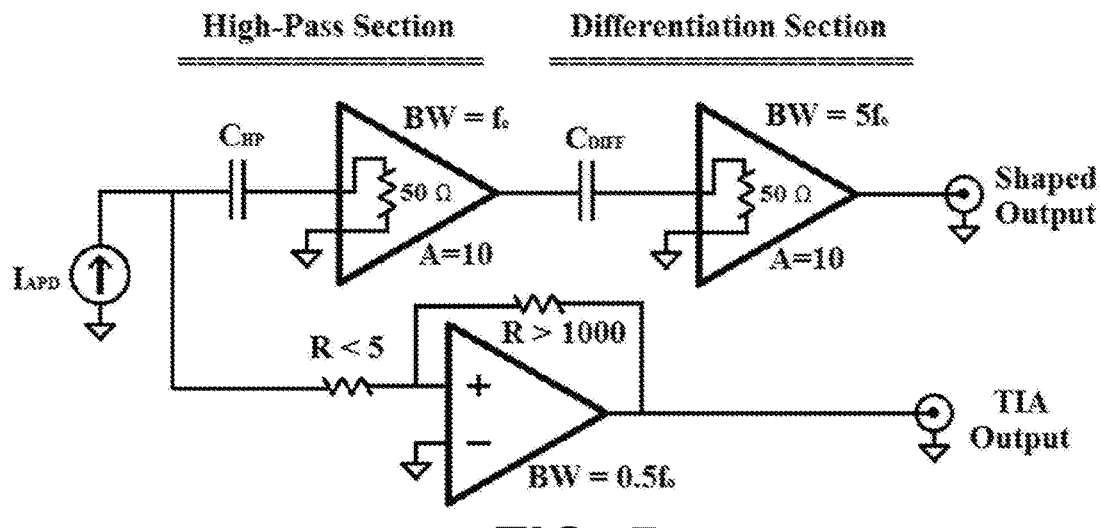
FIG. 5 shows an example differentiator circuit usable, e.g., in the circuit of FIG. 4A.

FIG. 5 shows an example differentiator circuit including a high-pass filter section and a differentiation section. Various example ranges of component values are illustrated. The values of the components illustrated can be adjusted, e.g., to provide differentiation signal processing with a rise time $T_{rise}$ corresponding to the timescale of the avalanche process with respect to a particular SiPM, e.g., 10 ps-100 ps. In some examples, differentiation circuitry such as that shown is used with SiPMs or similar devices. Differentiation circuitry can be used to increase detection sensitivity, e.g., of photon detectors that have asymmetric waveforms (e.g., ps-range rise times and ns-range fall or quenching times).

Figure 6A:
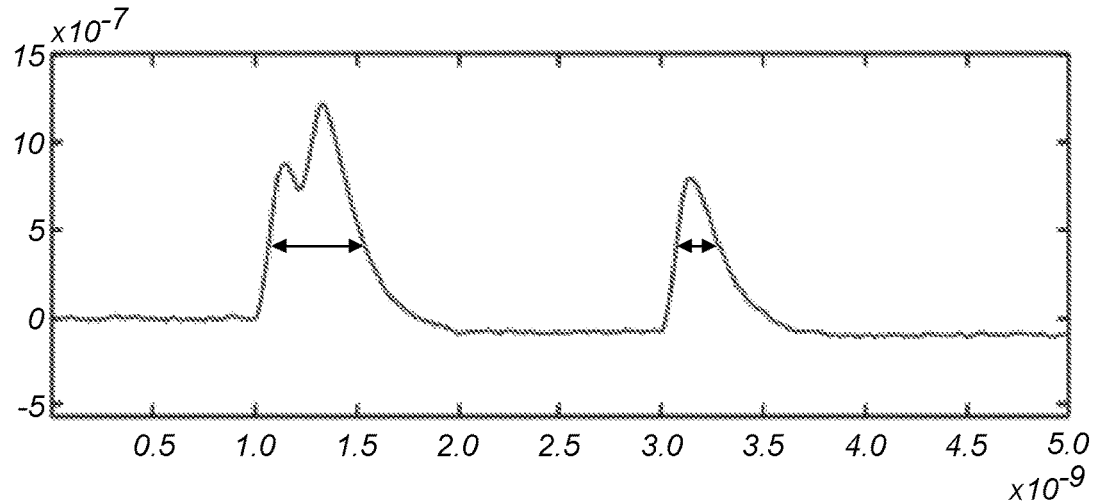
FIG. 6A shows measured data of an example input to the differentiation stage of the circuit of FIG. 5.
Figure 6B:
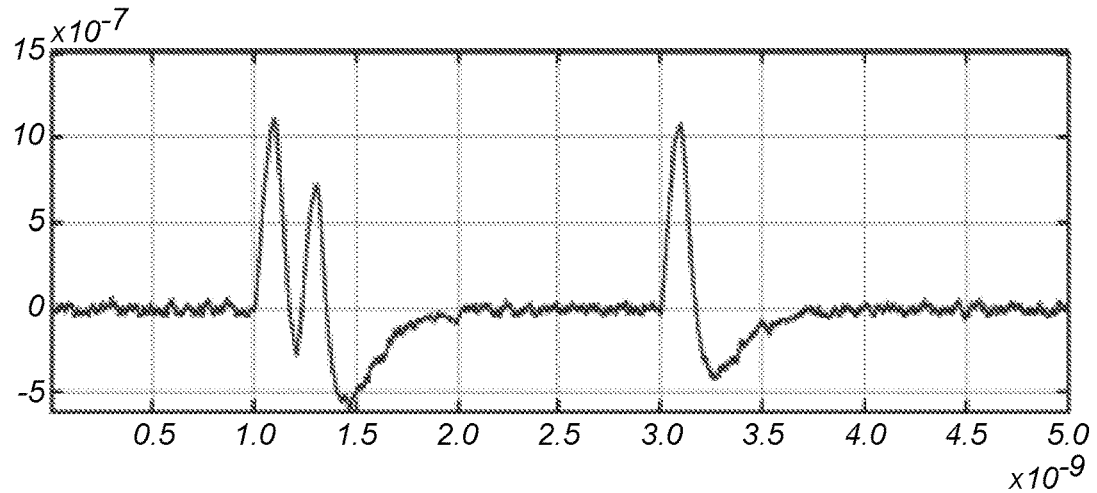
FIG. 6B shows measured data of an example output from the differentiation stage of the circuit of FIG. 5, for the input of FIG. 6A.

In some examples, differentiation signal processing can distinguish photons within overlapped photon pulses. This can provide more accurate photon counting, since photons that would otherwise be missed during an SiPM's dead time can be detected. In the illustrated circuit, an ideal square pulse produces a Gaussian pulse after the high pass filter. Circuit parameters of the differentiation section can be adjusted to provide separation of two partially-overlapping Gaussian pulses. Some example circuit parameters can include:

High-pass filter: CHP (Farad)=$T_{RISE}$/50
Differentiation filter: $C_{DIFF}$ (Farad)=(1/5)CHP=$T_{RISE}$/250
Primary corner frequency: F0 (Hz)=1/(10 $T_{RISE}$)
$T_{RISE}$ avalanche process time; typical<100 ps FIG. 6A shows an example input to the differentiation stage of the circuit of FIG. 5. FIG. 6B shows an example output from that circuit. As shown, the differentiation stage responds to two overlapping pulses (top), e.g., triggered by two separate photons, by providing a signal having two zero-crossings (bottom). Other thresholds than zero can additionally or alternatively be used. As indicated by the double-ended arrows in the top plot, a multiple-photon pulse can have a wider pulse width (longer duration) than a single-photon pulse. Accordingly, a pulse width differential can be used to discriminate closely overlapped 1-photon pulses from 2-photon pulses. Examples of pulse discrimination are described herein with reference to FIG. 14.

Figure 7:
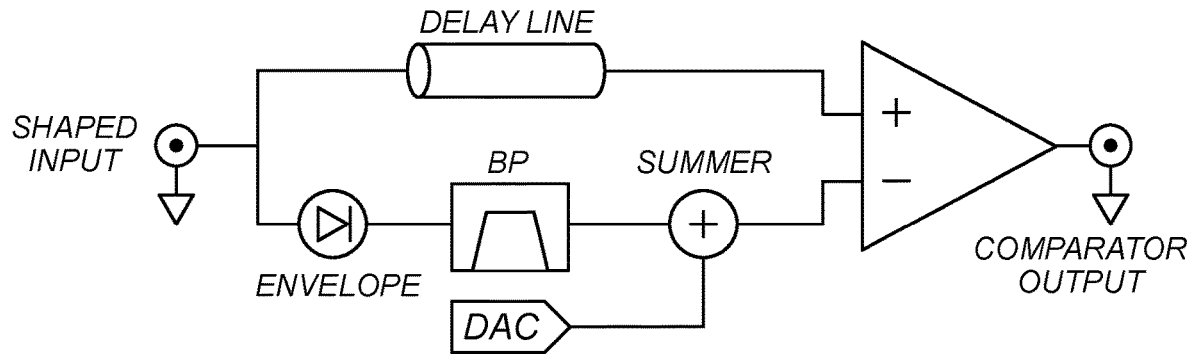
FIG. 7 shows an example adaptive comparator circuit.

FIG. 7 shows an example adaptive comparator circuit. The example circuit can provide, e.g., adaptive reference (threshold) level changes following pulse modulation. Due to AC-coupling of outputs from the differentiator section, large excursions of the signal baseline can occur among rapid successive pulses. To reduce miscounts, the illustrated circuit causes threshold level(s) respond adaptively by tracking the signal baseline. An RF envelope detector, e.g., monolithic or made from discrete COTS components, produces a signal that closely follows the negative peak excursions of the input. An appropriate filter further smooths the signal. A constant offset is added to the envelope to produce the tracking threshold level(s). The pulse is delayed, e.g., through at least one of a long transmission line or a passive network, so that the pulse arrives to the comparator at the same time as the moving threshold(s).

Figure 8:
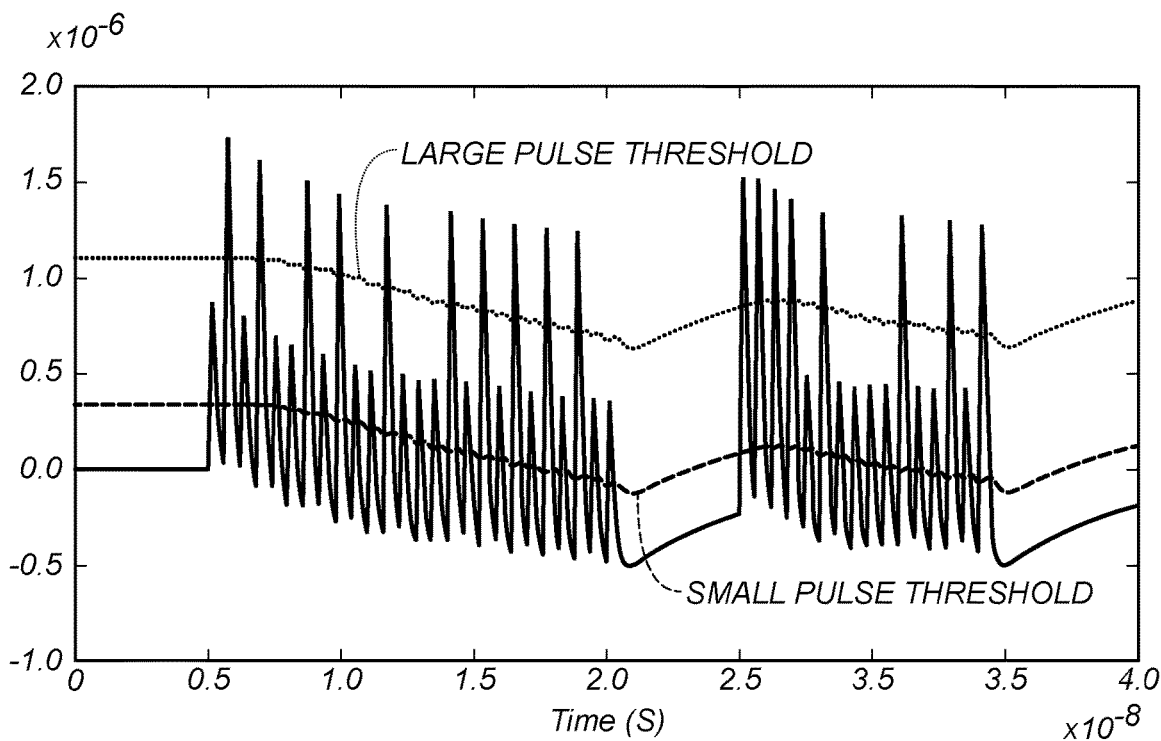
FIG. 8 shows example inputs and outputs of the adaptive comparator circuit of FIG. 7.

FIG. 8 shows example inputs and outputs of the adaptive comparator circuit of FIG. 7. Two thresholds are illustrated: a large-pulse threshold and a small-pulse threshold. In some examples, the small-pulse threshold is used to detect single-photon excitation (1PE) pulses and the large-pulse threshold is used to detect double-photon excitation (2PE) pulses. A 2PE pulse can result from near-simultaneous absorption of two photons, or from absorption of a single photon of a shorter wavelength.

Figure 9:
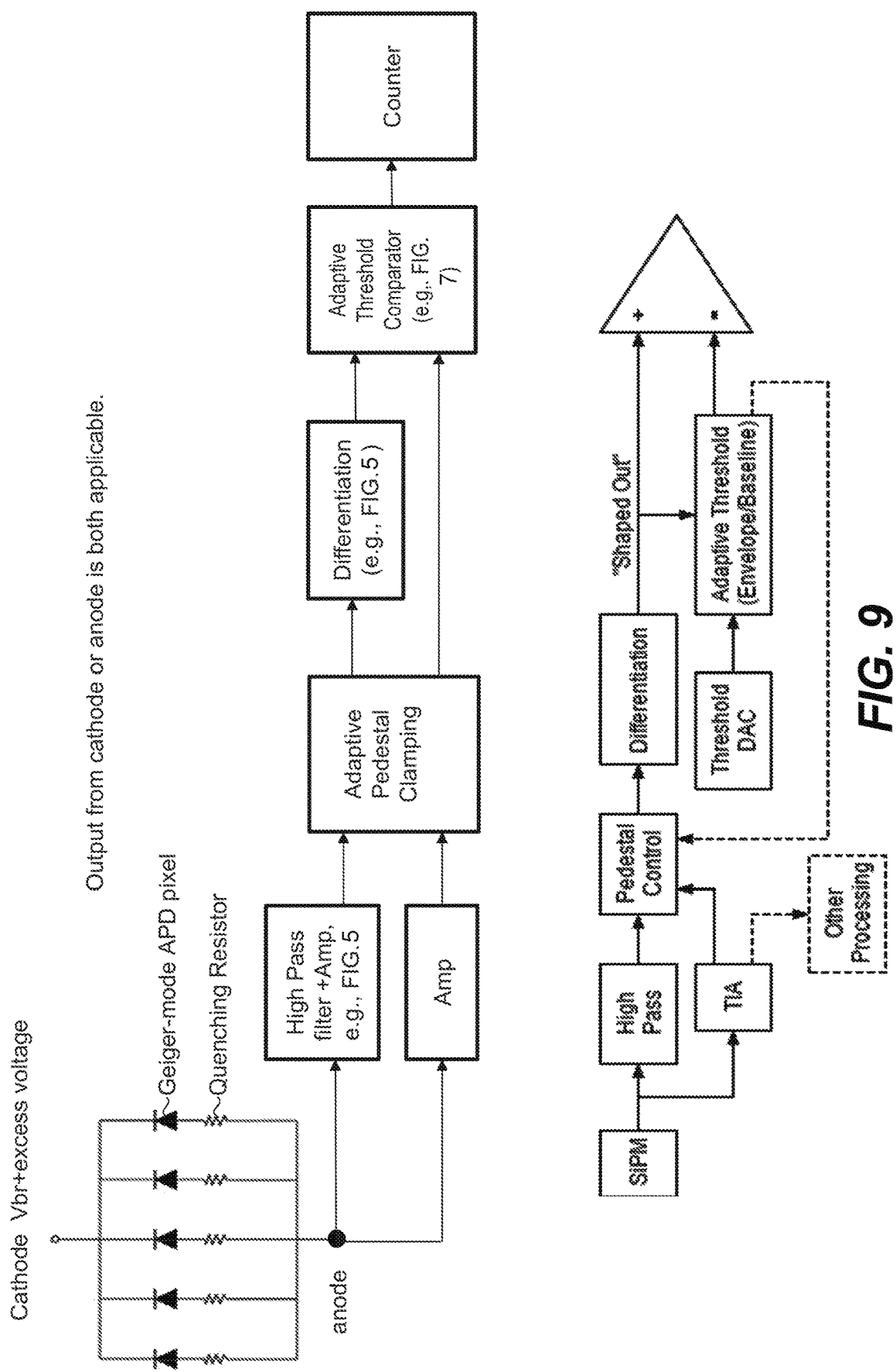
FIG. 9 shows a block diagram of signal processing for photon detection, and related components.

FIG. 9 shows a block diagram of signal processing for photon detection, and related components. Various examples are designed to operate with at least one of: an avalanche process ~100 ps, a photon pulse width <1 ns, or a quenching time >50 ns. In some examples, output can be taken from, or referenced to, the cathode, the anode, or both. Although shown as connected on the anode side of the APDs, the measurement electronics can additionally or alternatively be connected on the cathode side.

FIG. 9 shows sequencing of signal processing. FIG. 5 shows differentiation before a comparator. FIG. 7 shows determination of the comparator threshold. FIG. 9 shows an example overall flow of signal processing: photo current-HP-Pedestal clamping-differentiation (FIG. 5)-comparator (FIG. 7).

In some examples, the differentiation section can mix the signal with the differential of the signal. This can accentuate overlapping peaks, increasing dynamic range.

In some examples, a pedestal correction factor between 0.1 and 0.15 can be used. In some examples, the pedestal correction can be determined based on the light level (e.g., high vs. low) using feedback from the adaptive threshold determining unit.

In some examples, a full amplifier is used. In some examples, e.g., in which capacitance is implemented in each sensor pixel, a pre-amplifier (preamp) can be used without a full amplifier.

An experiment was conducted to measure single-pulse and multiple-pulse detection. In the tested example, multiple photons were detected, even during the avalanche quenching time. Some prior schemes are unable to detect photons during the quenching time.

In some examples, the high pass filter permits detecting avalanche processes as <1 ns-width pulses, e.g., corresponding to a single photon. In some examples, the high pass filter output can be processed to detect multiple photons even during a recharge process, unlike prior schemes.

Figure 10A:
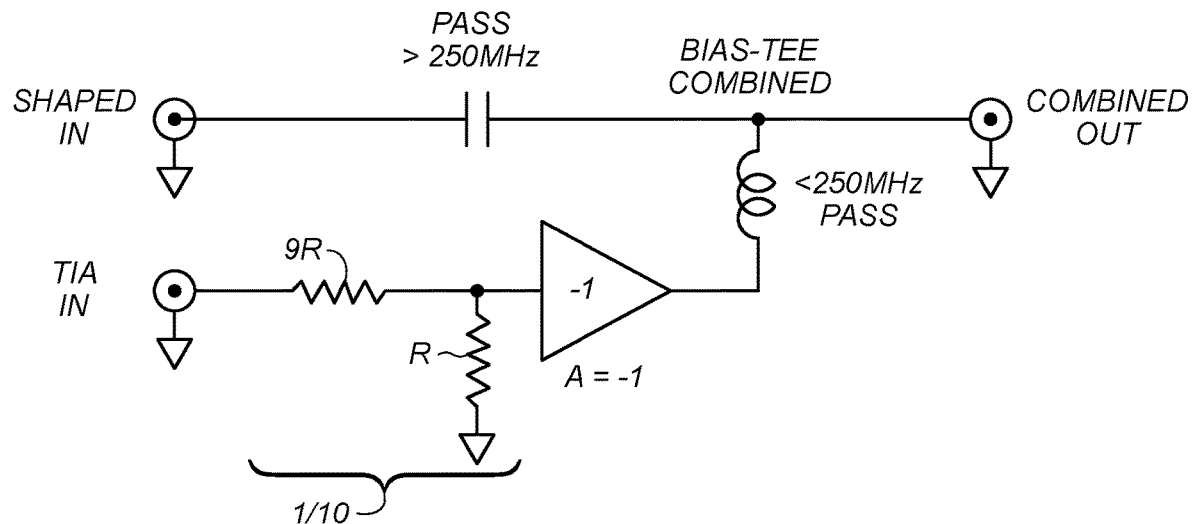
FIG. 10A shows an example circuit configuration of an adaptive pedestal clamping circuit.
Figure 10B:
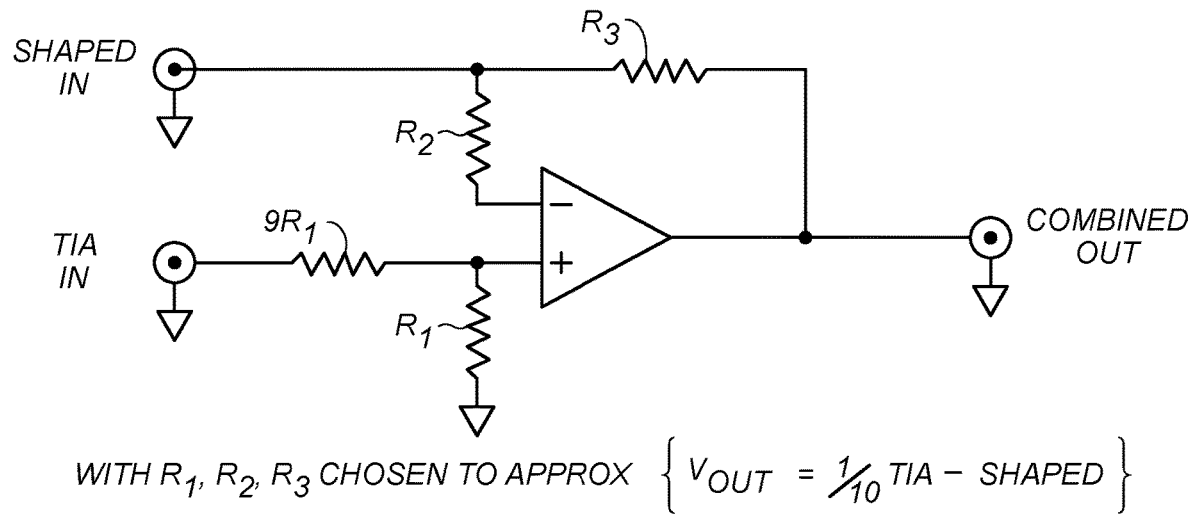
FIG. 10B shows another example circuit configuration of an adaptive pedestal clamping circuit.

FIGS. 10A and 10B show example circuit configurations of adaptive pedestal clamping circuits, e.g., as discussed herein with reference to FIG. 9. In some examples, the illustrated circuitry can stabilize the pedestal level of short photon pulse signals. In some examples, as a number of incident photons increases, a signal pedestal fluctuates due to the high-pass filter. However, counting photon signals without the high-pass filter can lead to level deviations and a smaller signal, which can result in the limited dynamic range of some prior schemes. Therefore, some examples count the high-pass filter or differentiator output and use pedestal clamping circuitry to reduce pedestal-level variation and to stabilize the inputs to the comparator.

Some examples improve the accuracy of the pedestal clamping by reducing the phase difference between the pixel-signal output and the differentiator ("HF") output. For example, components of the circuit can be adjusted, or delay lines or other delay elements added, to keep the phase shift of the electronics below the pixel pulse width.

An experiment was conducted to measure data of pixel output signals, differentiator ("HF") output signals, and signals after adaptive pedestal clamping. Tests were performed at a relatively lower count rate (lower optical power incident on the sensor) and at a relatively higher count rate. The tested adaptive-pedestal circuit provided a steady baseline from which a threshold for determining counts could be set. In some examples herein, once the baseline has been set by the adaptive pedestal clamping, the threshold determined by the adaptive threshold unit can be applied to count pixels by counting times when the differentiator output crosses the threshold.

In some examples of a Gaussian profile having a full width at half maximum (FWHM) of 1.2 ns, pulse height and pulse resolution are negatively correlated. For a photon pulse amplitude following a Gaussian form, comparator pulse resolution is correlated with count accuracy. In some examples, to detect 1 ns pulse widths, 200 ps pulse resolution is used. Reducing the pulse resolution can reduce the measured count. Some commercial universal counters have a pulse resolution of 4 ns, and some 1 GHz digital oscilloscopes have a resolution of about 0.4 ns. Therefore, in some examples, a high-frequency counter, e.g., implemented using an FPGA, is used to provide, e.g., 200 ps pulse resolution or better resolution.

Figure 11A:
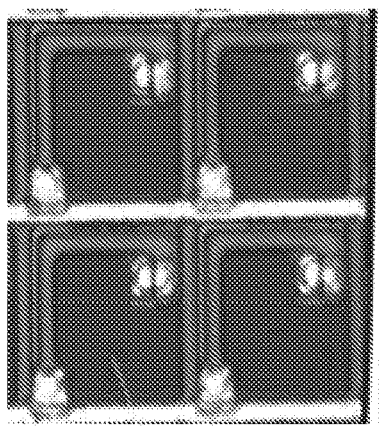
FIG. 11A is a graphical representation of a micrograph of an example SiPM.

FIG. 11A is a graphical representation of a micrograph of a portion of an example SiPM.

Figure 11B:
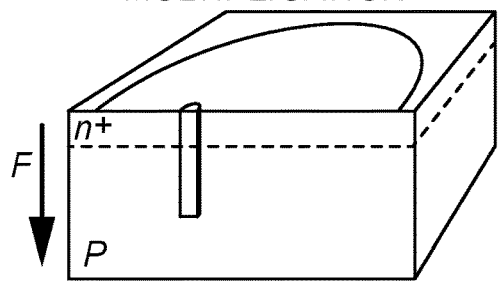
FIG. 11B depicts characteristics of longitudinal multiplication in an SiPM.
Figure 11C:
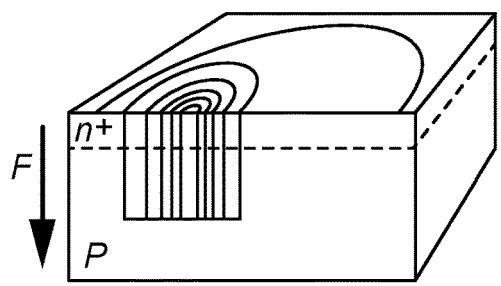
FIG. 11C depicts characteristics of transverse multiplication in an SiPM.

FIGS. 11B and 11O show examples of estimation of the avalanche process time, and internal structures of example SiPMs.

Figure 12:
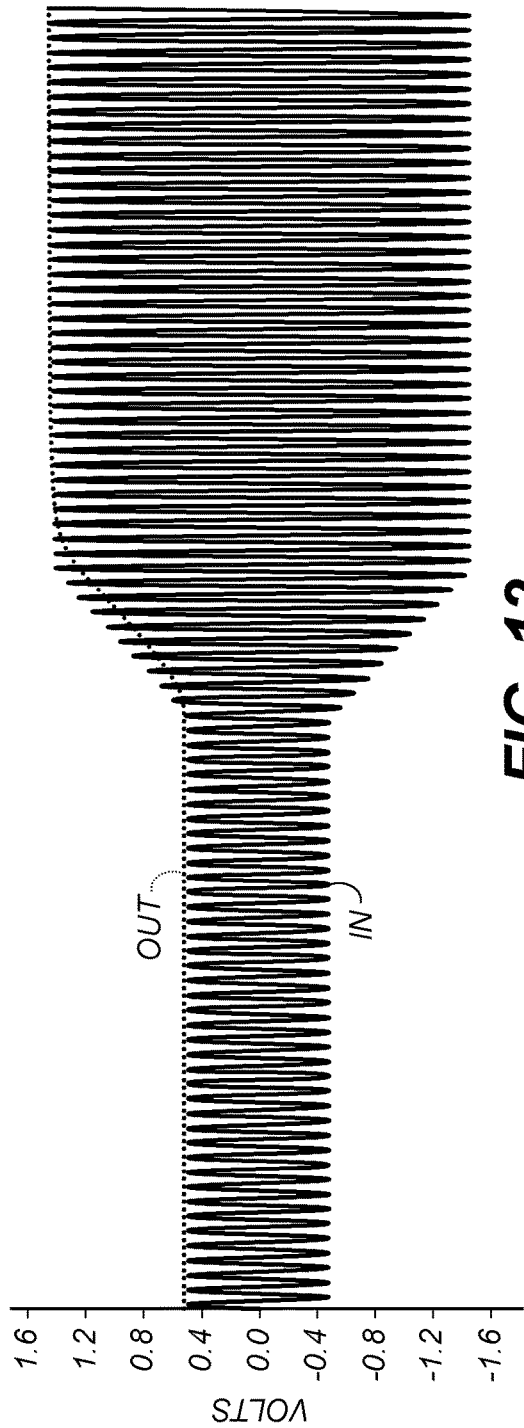
FIG. 12 shows simulated inputs and outputs of the circuit of FIG. 13.
Figure 13:
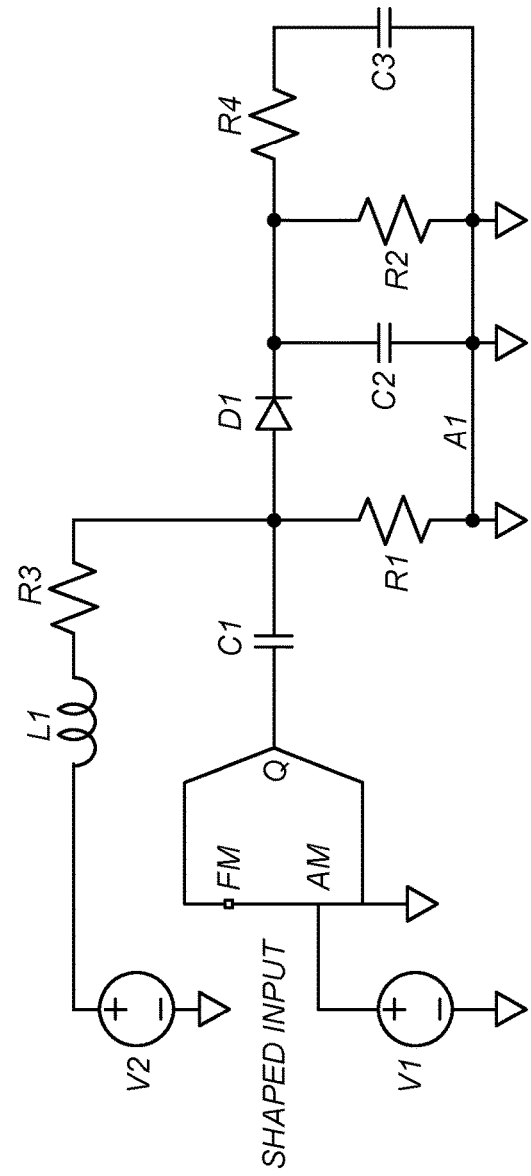
FIG. 13 is a circuit diagram of an example filter section in an envelope-detector circuit.

FIG. 12 shows simulated outputs of the circuit of FIG. 13. The SPICE simulation conditions were .tran 0.00001 0; mark=1000000000; space=0; PULSE(1.5 0.5 0.000002 0.00000001 0.00000001 0.000002 0.000004).

FIG. 13 shows an example filter section in an envelope-detector circuit (e.g., FIGS. 7, 8, 10A-10B, 13, or 14). The illustrated filter section can be used, e.g., in the adaptive threshold circuit of FIG. 7. In some example envelope detectors, the diode is specified for GHz operation with junction capacitance, e.g., about 1 pF-about 10 pF. Some example envelope detectors include a transimpedance amplifier (TIA). Component values can be, in some examples: V2 1.4 V; L1 22 nH; R3 50Ω; C1 22 nF; R4 50Ω; R1 50Ω; C2 20 pF; R2 5Ω; C3 20 pF.

Figure 14:
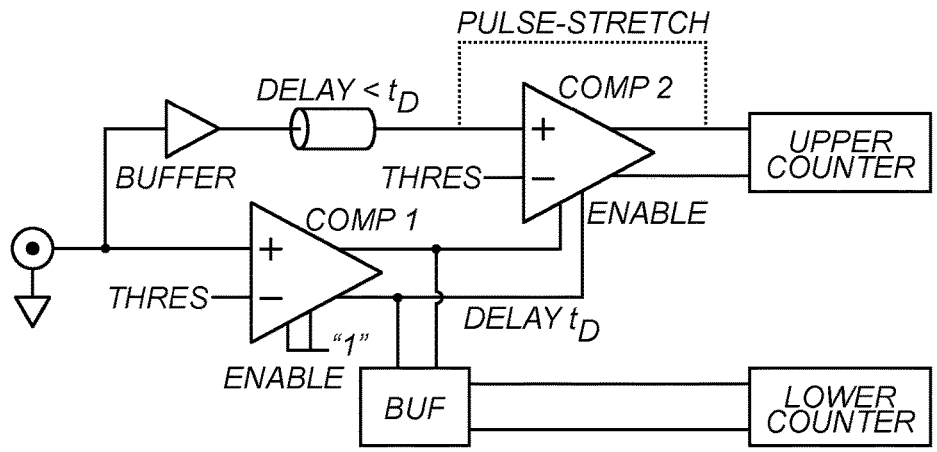
FIG. 14 is a circuit diagram of an example pulse-width counter/discriminator circuit.

FIG. 14 shows an example pulse-width counter/discriminator circuit. Some examples include various ways to distinguish pulse widths. In general, a fixed comparator threshold level can be used to detect pulse width difference. As an example, the block diagram shown in FIG. 14 can discriminate between single- and overlapped-photon pulses.

In some examples, illustrated circuits can detect two overlapping photon avalanches that result in a pulse that is longer (wider) than a "standard" pulse width of a single-photon pulse. For linearity of the measurement system, some examples identify such pulses as being two photons rather than one photon.

The illustrated examples use two comparators: Comp 1 and Comp 2. The comparators can be single-ended- or differential-output. Various comparator technologies can be used, e.g., technologies that allow for propagation delays of hundreds of picoseconds.

Figure 15:
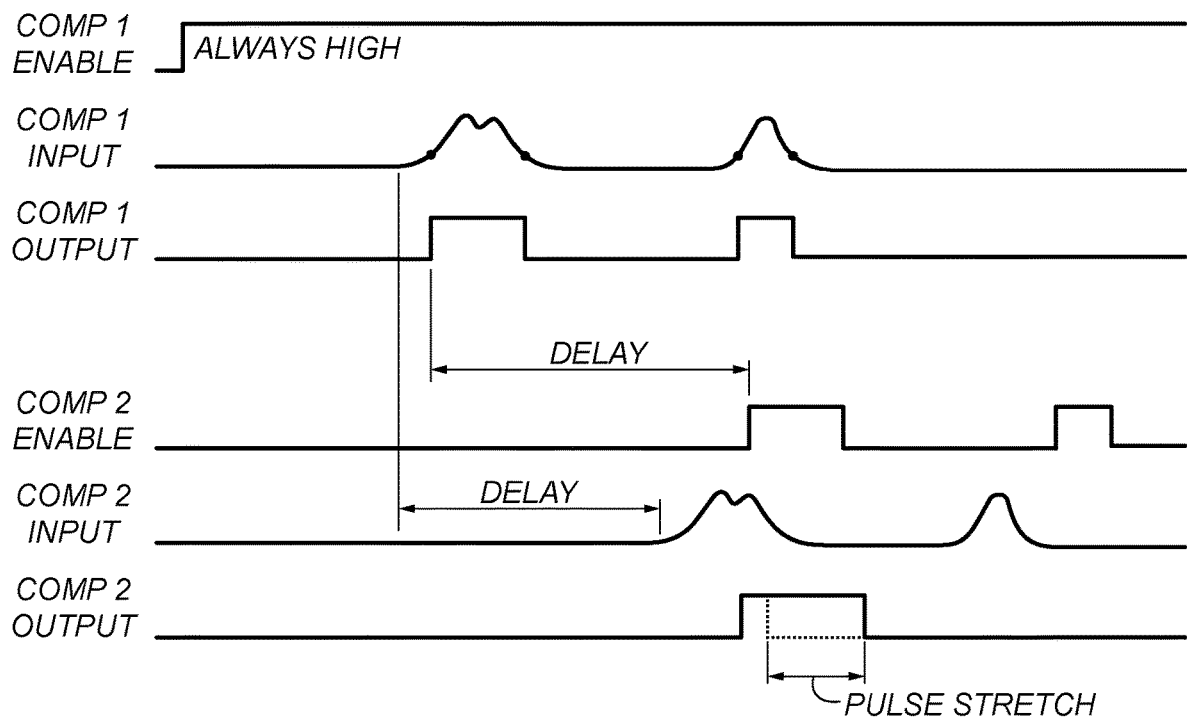
FIG. 15 shows example timing diagrams of the circuit of FIG. 14.

FIG. 15 shows example timing diagrams of the circuit of FIG. 14. In the illustrated examples, longer pulses are counted twice: once with the lower counter on Comp 1, and once with upper counter on Comp 2. The total count is then the sum of the lower counters count and the upper counters count. In illustrated examples, Comp 2 can only go high if the pulse is longer than one standard pulse-width, because Comp 2 is only enabled once a standard pulse-width's worth of time has passed after the onset of the pulse. This can prevent double-counting of single photons while still providing accurate counting of two overlapped photon pulses.

In some examples, Comp 1 is continuously enabled while measurements are being taken. Comp 2 is enabled by Comp 1, after a delay $t_o$. The input signal is also delayed by an amount less than to, so that it arrives at Comp 2 one standard pulse-width before Comp 2 becomes enabled. Therefore, Comp 2's input signal is high when it becomes enabled only if the pulse is wider than one standard pulse-width. In some examples, the buffer and delay line introduce a delay of $t_d$, the predetermined standard pulse-width). The propagation delay $t_d$ is the time between when the input pulse arrives at Comp 1 and when comp 2 becomes enabled ($t_d < t_o$). The standard pulse-width varies by device and preamp. In some examples, the standard pulse-width can be ~400 ps-~900 ps. The standard pulse-width can be selected empirically and embodied physically, e.g., in delay lines, or as a stored configuration value in software or firmware. For a long pulse, Comp 2 outputs a high level and stretches the output pulse in time, so that the counter can register the pulse.

The illustrated polarity is an example and is not limiting. For example, the counters can increment on an active-low or active-high clock. Suppose a positive rising pulse is applied to IN+ and a threshold is applied to IN−. The comparator will go LO->HI as the positive pulse crosses the threshold. This is appropriate for an active-high counter. For a negative pulse, the inputs would be flipped in order to continue using an active high comparator. In some implementations there may be multiple buffers or multiplexers for signal observation and sourcing; those muxes could invert the signal one or more times.

Figure 16:
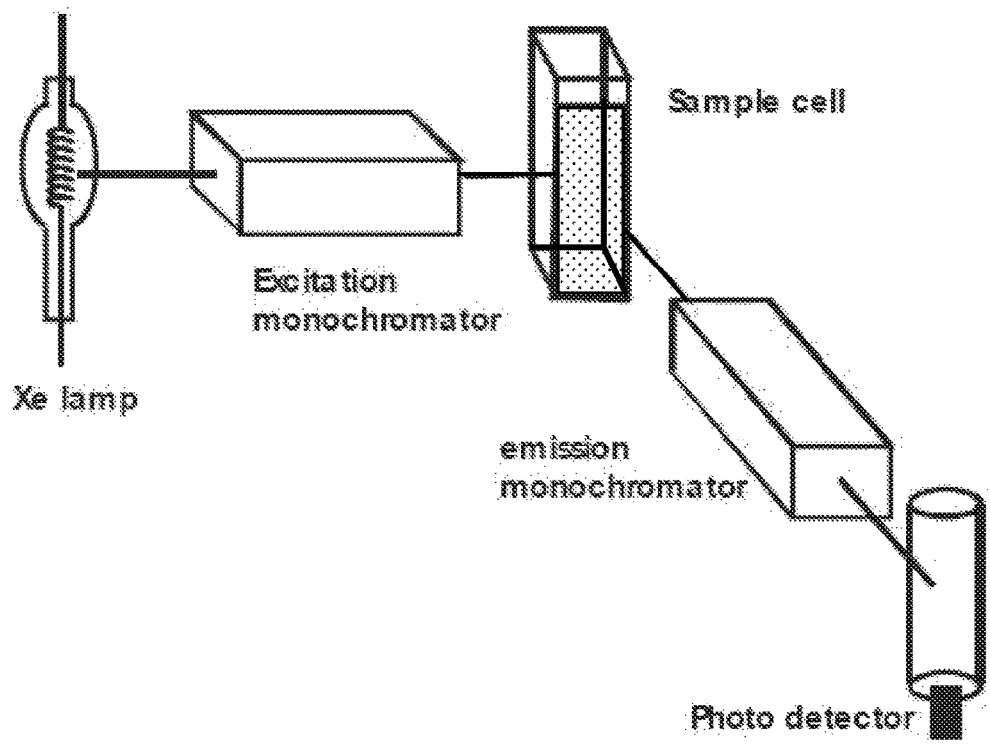
FIG. 16 shows an example spectrofluorometer configuration according to various prior schemes.

FIG. 16 shows an example spectrofluorometer configuration according to various prior schemes. Various prior schemes suffer from at least one of the following limitations. Use of an incoherent white light source (e.g., a xenon or halogen lamp) and two monochromators can result in large power consumption for the lamp, e.g., 150 W; low excitation power through a slit; intensity that is difficult to measure; or difficulty observing high-intensity phenomena like photobleaching. A perpendicular optical layout between the sample and a fluorescence detector, used to avoid effects due to the excitation light, limit the configuration and shape of samples and sample cells that can be used. Use of an emission monochromator and photocurrent detection can prevent the use of quantitative collecting optics, resulting in measured intensity values in arbitrary units rather than meaningful photometric units, and can provide a low sensitivity due to photocurrent detection. Accordingly, some prior schemes do not provide quantitative fluorescence measurement, and can be bulky and expensive.

Figure 17:
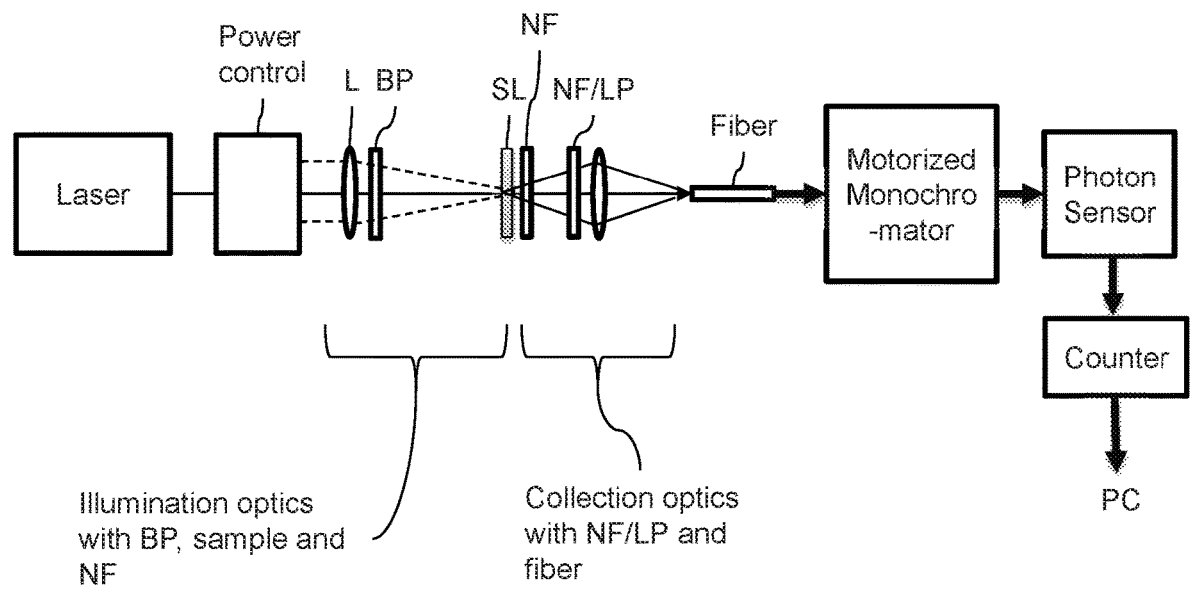
FIG. 17 shows a single-photon spectrometer configuration according to various examples herein.

FIG. 17 shows a single-photon spectrometer configuration according to various examples herein. Illustrated is a coherent light source, e.g., a laser. Other lasers or sources that provide one or more specific wavelengths of light can be used. An illumination intensity control unit can be used, and can include, e.g., at least one of a laser power control unit, a polarizer, or a neutral density (ND) filter.

In some examples, illumination optics can include a lens (L); a laser notch filter (NF), e.g., a dielectric filter, at a beam waist of the laser beam or other incident light; and a laser bandpass filter (BP) between L and NF. A sample (SL) or other target to be measured can be located adjacent to or otherwise proximal to the NF filter. This can provide a double excitation effect by reflection of the laser beam off the notch filter. Examples are discussed herein, e.g., with reference to FIG. 18 or 20. Fluorescence detection optics downstream of SL and NF can include additional notch filters, long-pass (LP) filters, lenses to focus emitted resultant light, e.g., fluorescence, to an optical fiber, or any combination thereof. A motorized monochromator can select a particular wavelength of light to direct to the photon sensor. The photon sensor and associated electronics, e.g., as in FIGS. 1-15, can drive a counter to count pulses. The counter value can be read by, e.g., a personal computer (PC) and software.

In some examples, meta-material absorption materials can be used to reduce effects due to stray light in a spectrometer. For example, a carbon-nanotube absorber can have <0.1% reflectivity. This can increase the dynamic range of the measurement system.

Some examples use an optical bandpass filter (BPF). In various examples, a BPF can reduce or substantially eliminate accelerated (or amplified) spontaneous emission (ASE). In some examples, an incident laser beam induces ASE photons with a broad spectrum, e.g., red-shifted slightly with respect to the incident light. In an example, the ASE peak extends from approximately 430 nm to approximately 465 nm. To improve the accuracy of photon counting, ASE can be reduced by adding a bandpass filter, e.g., centered at 405 nm (or other laser peak wavelength) with a width of, e.g., 20 nm (e.g., 395 nm-415 nm). Data can be measured of stray light and autofluorescence at various power levels, demonstrating that the measurement system can effectively characterize even the performance of some of its own optical components.

In a tested example, a SiPM was illuminated with a light source through a cover having a thickness of ~3 µm. The measured data exhibited peaks at specific wavelengths, indicating that interferometric effects were present in the resultant light being measured. These effects can be due to protective layers on the SiPM die or package. To reduce noise due to such interferometric effects, anti-reflective (AR) coating(s) can be used on the SiPM or optical elements associated therewith.

Additionally or alternatively, detectors as described herein can be used to measure layer thicknesses using interferometric effects. An example optical structure can include two interfaces ("1-2" and "2-3") between three layers ("1," "2," and "3"). In some examples, at least one of the layers (e.g., layer 1, or layers 1 and 3) can be air. For example, Layer 2 can represent a cover of the SiPM. The thickness d of Layer 2 can be determined based on the wavelengths (nm) of the peaks and valleys of the interference pattern ($\lambda_n$), and on a refractive index n. In an example, layer 1 is air (n≈1.0), layer 2 is a transparent layer having refractive index n, and layer 3 is a reflective layer, e.g., comprising silicon. Using measurement techniques herein can permit, e.g., measuring the thickness d of the cover of the SiPM (layer 2) using diffraction patterns. In various examples, detection circuitry as described herein (e.g., SiPM sensors and circuitry such as shown in, e.g., FIG. 9) can permit measuring thickness of optical filters or other elements, e.g., imaged onto a cover-less SiPM (or a SiPM with an AR-coated cover).

Figure 18:
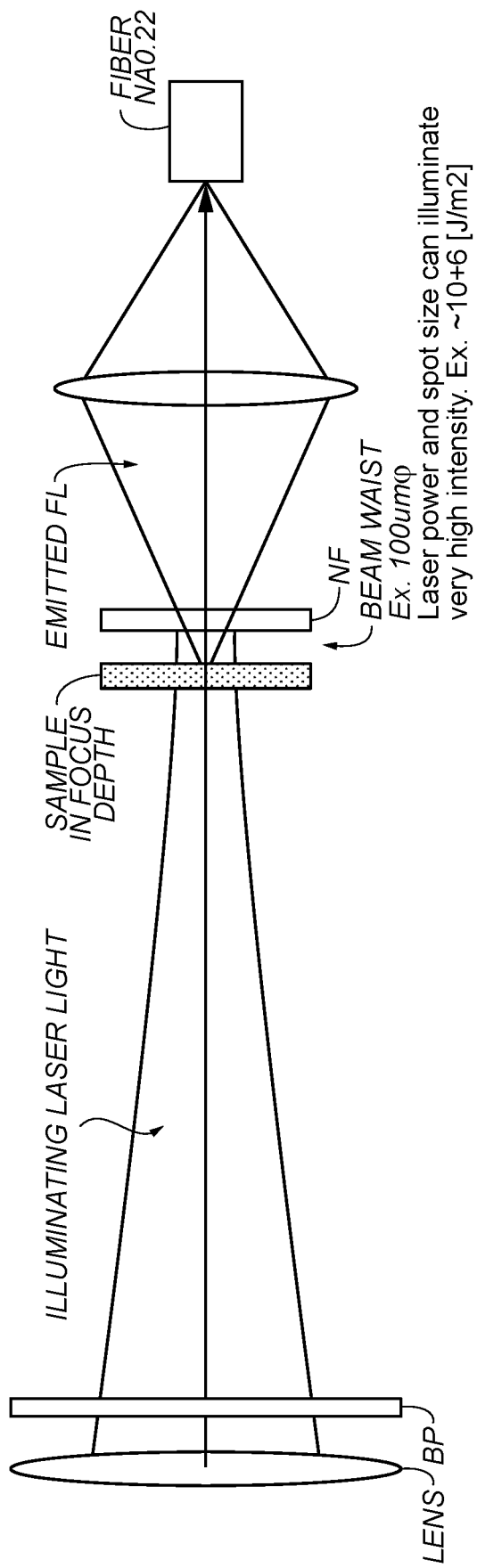
FIG. 18 shows sample-illumination and resultant-light-collection optics according to various examples herein.

FIG. 18 shows illumination and collection optics according to various examples herein. "NF" is a notch filter. "FL" is fluorescence. Various examples permit readily aligning the laser beam and the filter/sample positions. In some examples, the laser beam is focused on the NF filter to obtain a conjugate image, i.e., an image that follows an optical path symmetrical to the optical path of the incident illumination. In some examples, the laser beam is reflected by the NF and excites the sample again. This provides a double excitation effect and roughly double the detection sensitivity. For example, if the reflected laser beam illuminates a portion of the sample that has not yet been illuminated, another fluorescent photon may be emitted.

In some examples, the collection optics can have a consistent numerical aperture (NA). Therefore, the collection efficiency can be determined quantitatively. Moreover, the optical fiber used to convey the collected resultant light can couple to small sensor area effectively. In some examples, the NA of the collection optics is smaller than the NA of the fiber. In some examples, a long pass filter is positioned between NF and fiber. In some examples, a filter can be used as discussed herein with reference to FIG. 24. In some examples using a long pass filter to reduce laser leakage, only single-photon pulses are measured. In some examples, an OD6 filter is not used.

Experiments were conducted to measure cps as a function of time for various tested examples. Tests were performed of Quartz/Glass photo bleaching at a high level of exposure, as indicated by the total photon count. The tests were conducted with a 405 nm laser emitting 500 µW and a 100 µm-diameter (φ) beam waist. Three tests were conducted, respectively with: a quartz 0.1 mm thick, cover glass 0.17 mm thick, and cover glass 0.1 mm thick. The plotted exposure data were collected over the course of ten minutes (600 s). Quartz exhibited the lowest total count and intermediate photo bleaching, 0.1 mm cover glass exhibited the highest total count and high photo bleaching, and 0.17 mm cover glass exhibited an intermediate total count and low photo bleaching (relatively little change in output over the course of the ten minutes).

Figure 19:
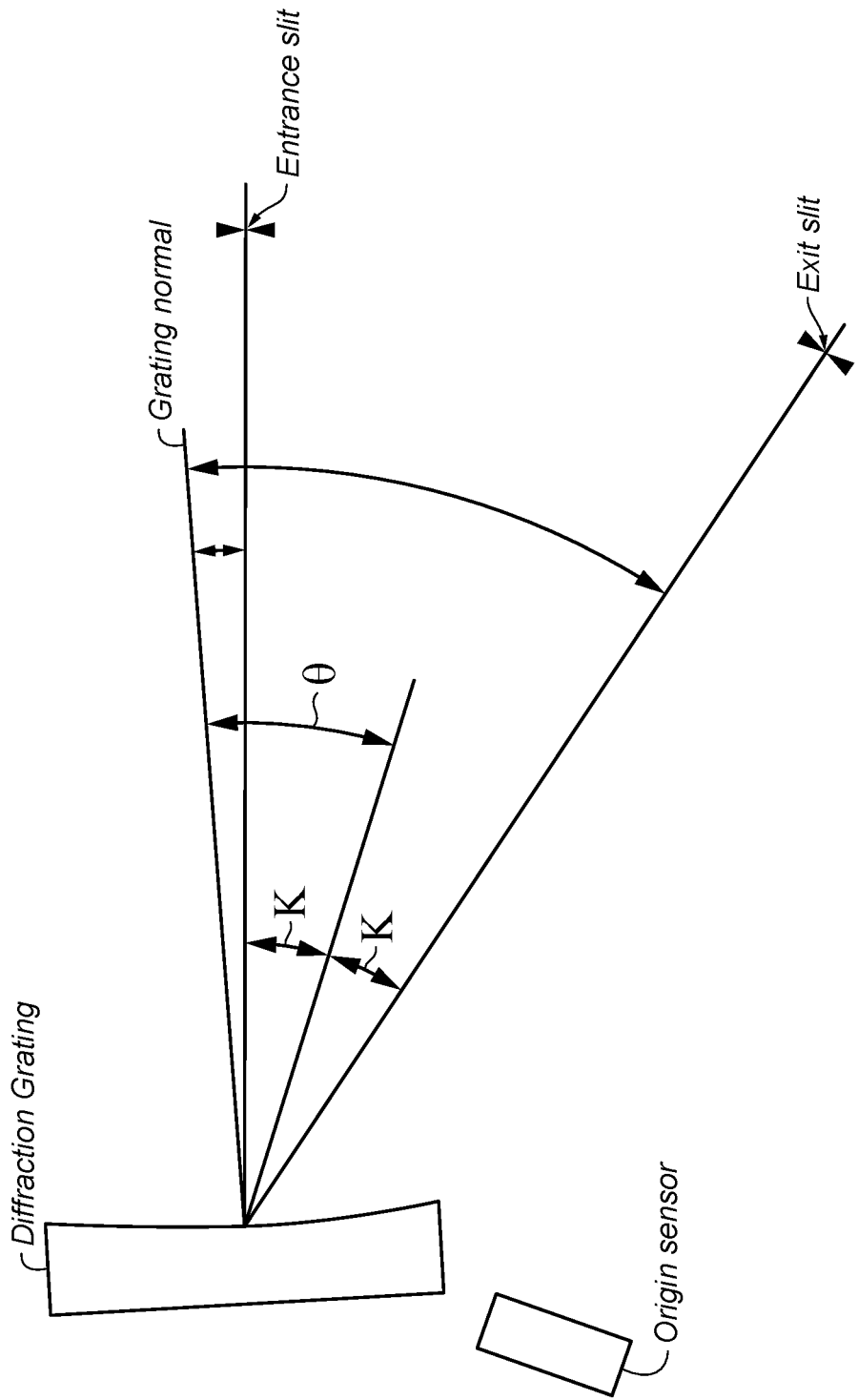
FIG. 19 shows some components and optical paths of an example motorized monochromator.

FIG. 19 shows some components and optical paths of an example motorized monochromator. The illustrated monochromator can be configured to receive broadband illumination via the entrance slit and provide illumination of a narrow bandwidth (e.g., only a few nm) via the exit slit. The motor can turn or otherwise adjust the grating or other optical components of the monochromator to select which wavelengths are collected and counted.

There are various sources of stray light in a monochromator. Some include stray light from the entrance, stray light from the exit, and AFL from the inside walls of the monochromator. Other sources include 2nd order and 0th order light from the grating, in configurations in which the 1st order light is normally used. To reduce stray light and improve detection sensitivity when using monochromators and other optical enclosures, various examples use a metamaterial absorber. For example, carbon nanotubes (CNTs) with or arranged in metastructure can absorb photons to a level of less than 0.1% reflectivity, compared to a typical anodized Al coating reflectivity of about 4%. Improvements in reflectivity can directly improve dynamic range. For example, a reduction in reflectivity to 1% of its former levels can improve the dynamic range of a spectrometer by 100 times.

Measured data was collected at various wavelengths for a tested monochromator. Calculated addresses for the wavelengths were compared with the measured data. The tested monochromator agreed with the calculated results.

Figure 24:
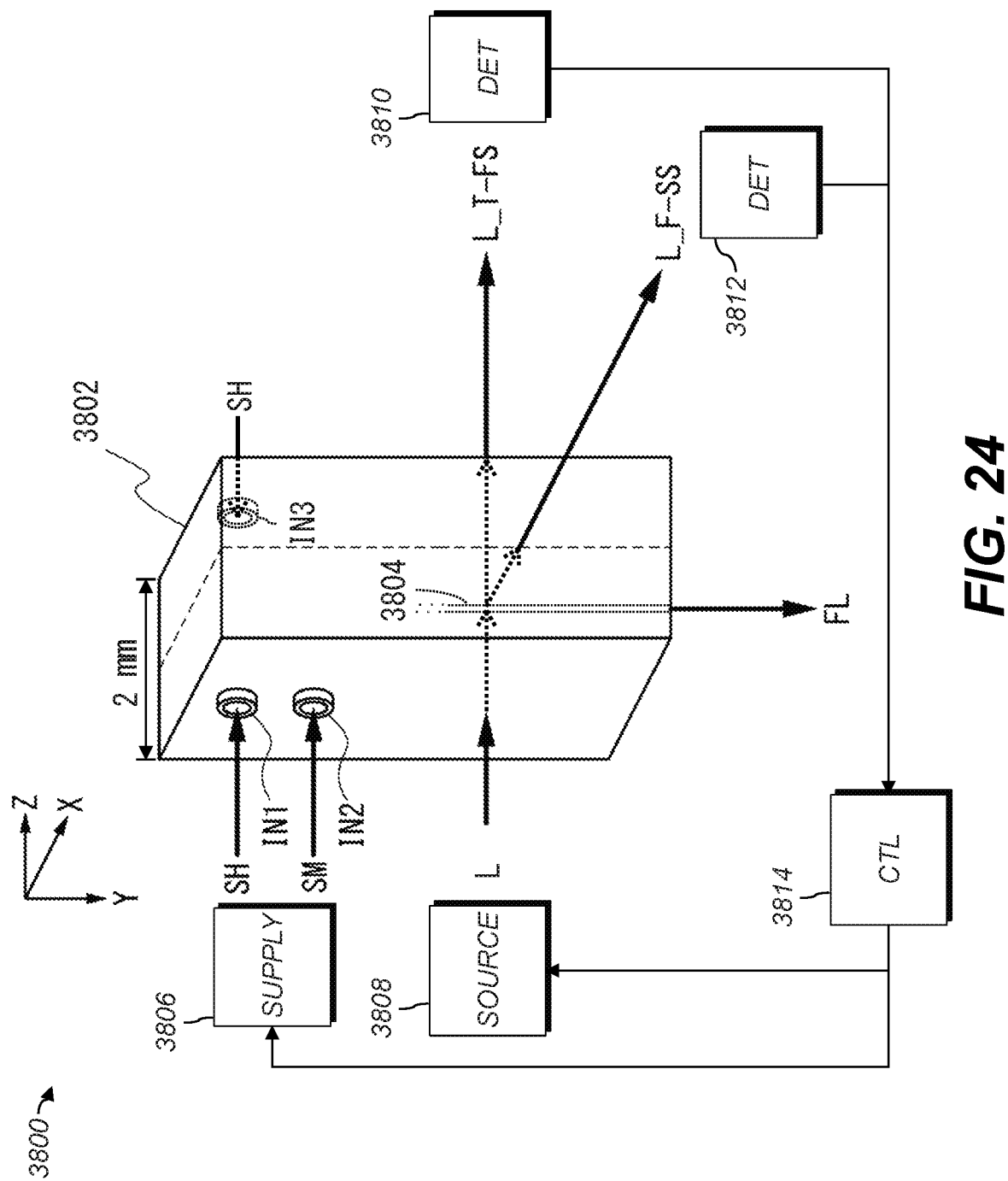
FIG. 24 shows an example flow-cytometry system according to various examples herein.

In some examples, systems such as that shown in FIG. 1 can provide photon counts for each of a plurality of wavelength intervals at each of a plurality of times (or in each of a plurality of time windows). For example, the wavelength windows can be 0.1-10 nm, the scan times for a particular wavelength can be 1-1000 s, and the exposures can be captured over 1 ms-10.00 s. However, other values outside these ranges can additionally or alternatively be used. In some examples, 1 s samples over a long period of time, e.g., 600 s, can be used to measure photo bleaching. An example is shown in FIGS. 24 26. In some examples, the dark count can be about 125 cps.

An experiment was conducted to measure data of a single-photon spectrum of a sheath fluid for a flow cytometer, as measured by a system such as that shown in FIG. 1 including a motorized monochromator. The system background count was measured after installing, successively, a 440 nm long-pass filter, a tube holder, and dry tubing. Measurements were then taken after liquid sample filling to determine autofluorescence (AFL) of a tested sheath liquid for a flow cytometer, e.g., as discussed herein with reference to FIG. 24. The system was able to effectively measure the sheath liquid, with cps peaking over 450,000 compared to a background level after installing the dry tubing of less than 50,000.

Figure 20:
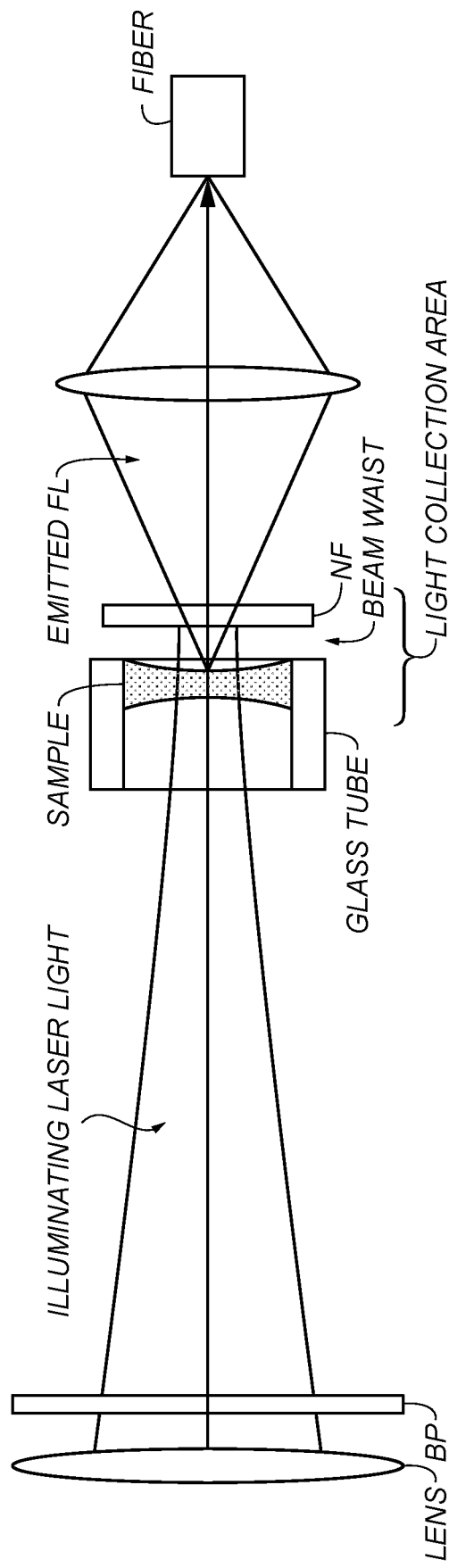
FIG. 20 shows an example configuration of an optical system permitting wall-less fluorescence detection of liquid samples by coaxial illumination in a tube.

FIG. 20 shows an example configuration of an optical system permitting wall-less fluorescence detection of liquid samples by coaxial illumination in a tube. In some examples of wall-less detection, no vessel is used in a manner that would cause the vessel to exhibit autofluoresence. Abbreviations are as discussed herein with reference to FIGS. 17 and 18.

Many materials exhibit autofluorescence (AFL), including high-grade quartzes and glasses. In some prior schemes, liquid samples require a vial for measurement. However, measurements of the sample fluorescence can be affected by AFL of the vial walls, i.e., photons emitted by the vial walls because of AFL. Therefore, wall-less capturing of sample liquid permits fluorescence detection with reduced noise from vessel AFL. In some examples, the sample liquid is held by surface tension within a 2-3 mm (inner diameter) glass tube, e.g., having relatively flat inner surfaces and open ends. This size is nonlimiting; other sizes can be used as long as the sample is retained within the tube by surface tension. Other materials than glass can be used for the tube, e.g., quartz. The sample is illuminated along a coaxial direction, e.g., substantially parallel to the walls of the tube. This can significantly reduce the amount of incident light reaching the tube walls, so can substantially reduce measurement noise due to vial wall auto fluorescence. In some examples, 10 µL-20 µL of sample fluid is used to provide a 2 mm sample thickness. In some examples, e.g., as discussed herein with reference to FIGS. 30 and 31, the tube can be a tube or well in an array of tubes, e.g., a plate array. Plates can include, e.g., 96 tubes, 384 tubes, or more tubes. In some examples, the tube has an open end and retains a fluidic sample (e.g., a liquid sample) by capillary action.

In some examples, the tube, the laser source, or other components of a measurement system are arranged so that the beam does not cross or intersect with the tube within a light-collection area associated with the tube and the sample. In the illustrated example, the light-collection area is a portion of the sample or its surroundings from which resultant light is directed to the collection fiber by the collection lens or other optics. If the beam crosses the tube away from the light-collection area, AFL photons will not be directed to the collection fiber, so will not corrupt the measurement. In some examples, the light-collection area comprises at least the smallest cylindrical volume that is coaxial with the incident light, that extends longitudinally only far enough to encompasses the entirety of the sample, and that extends radially only as far as necessary to encompass (or, in some examples, reach) the outer walls of the tube.

In some examples, measurement systems as described herein can be used for automated drug screening or other high-volume biological measurement tasks. For example, in automated high throughput screening, multiple samples can be arranged in separate tubes along the path of a laser. The fluorescence of each sample can be measured individually, permitting measuring more samples in a given amount of time. The dynamic range and wavelength selectivity can permit performing advanced chemical analyses, such as drug screening, not supported by some prior schemes.

FIGS. 21A-21G show examples of aperture shape conversion fiber bundles configured to provide increased spectral resolution and coupling efficiency. In some examples, a bundle of fibers is used to convey light between the monochromator slits and other optical components.

FIG. 21A shows spectrum 2100, e.g., as spatially distributed by a grating such as that shown in FIG. 19. Overlaid on spectrum 2100 are example fiber-bundle shapes 2102 (circular) and 2104 (rectilinear, short axis along the spectrum).

FIG. 21B shows an example monochromator for selecting light of a particular wavelength from a broadband source such as sunlight.

FIG. 21C is a cross-sectional view of an example of dense packing of circular optical fibers.

FIGS. 21D and 21E show cross-sections of fibers bundled into circular bundles 2102. Such configurations can be used, e.g., at the interfaces to the laser, lenses, sensors, or sample.

FIGS. 21F and 21G show cross-sections of fibers bundled into substantially rectilinear configurations 2104. Such configurations can be used at the monochromator entrance and exit slits to improve spectral resolution.

In the illustrated example, bundles A and B (FIGS. 21D and 21E) are circular bundles, so have aspect ratios (long side:short side) of 1:1. Bundles C and D (FIGS. 21F and 21G) are rectangular bundles. Bundles C and D are examples of bundles having an elongated shape, e.g., bundles for which the best-fit ellipsoid is substantially non-circular. For example, for bundles C and D, the elongated shape is a substantially rectangular shape. For bundle D, the elongated (rectangular) shape has an aspect ratio (long:short) exceeding 3:1, specifically, 700:186≈3.8. In some examples, the elongated shapes have aspect ratios of at least, or greater than, 2:1. Fiber bundles can provide improved power efficiency while maintaining spectral selectivity compared to some prior schemes.

Some example monochromators have performance figures of merit expressed in spectral width vs. slit width, and exit intensity vs. slit width. In some examples, narrower slit widths of the monochromator generally correspond with narrower wavelength bands into or out of the monochromator, which can increase spectral resolution. For example, a wider slit has larger signal but less spectral resolution compared to a narrower slit. In some examples, a conversion fiber bundle converts from circular close packing to linear packing, e.g., as in FIG. 21. This can provide increased signal and increased spectral resolution.

FIGS. 21F and 21G show examples of proximal ends of bundles. A bundle can receive, at its proximal end, at least one of a spatially dispersed plurality of wavelengths, e.g., from a monochromator exit slit or while scanning across the output field of a polychromator (e.g., FIG. 26B). The distal end of the bundle can be arranged to provide light to an SPM, e.g., as in FIG. 27B.

An experiment was performed to measure data of a test of conjugate excitation in Quartz 7980, and the effect of conjugated optics. The measurement equipment used for this test included a single core fiber. The sensor's dark count level was measured from 350-850 nm, as was the system's background count curve (higher than the dark count level across the range, but less so at longer wavelengths). Results were measured across that range of one-pass excitation of the quartz material, and showed a peak around 40,000 cps near 510 nm, compared to a background level of about 19,000 cps. A spectral profile was then measured by conjugated excitation, in which the quartz material receives double the illumination due to reflection of the incident light off the notch filter after passing through the quartz material the first time. The ~510 nm peak of the two-pass condition was ~71,000 cps, over twice the counts per second of the one-pass.

An experiment was performed to measure the spectral profile, after subtracting the background, of conjugate excitation in Quartz 7980. An intensity profile was measured by conjugated excitation. A separate intensity profile was measured by one-pass excitation. The double-excitation curve had a peak 2.57× higher than the peak of the single-excitation curve (51.7 kcps vs. 20.1 kcps).

An experiment was performed to measure data of cps by wavelength (350-510 nm) for, e.g., various diameters of fiber core. In the tested condition, using a core diameter >0.6 mm, the spectral FWHM was larger than the sampling resolution. The FWHM as a function of core diameter was as shown in Table 2.

TABLE 2

| Slit width | FWHM (nm) |
|---|---|
| 0.2 mm | 1.5 |
| 0.3 mm | 2.0 |

TABLE 2-continued

| Slit width | FWHM (nm) |
|---|---|
| 0.4 mm | 2.8 |
| 0.5 mm | 3.4 |
| 0.6 mm | 4.0 |
| 0.7 mm | 4.6 |
| 0.8 mm | 5.0 |

Figure 22:
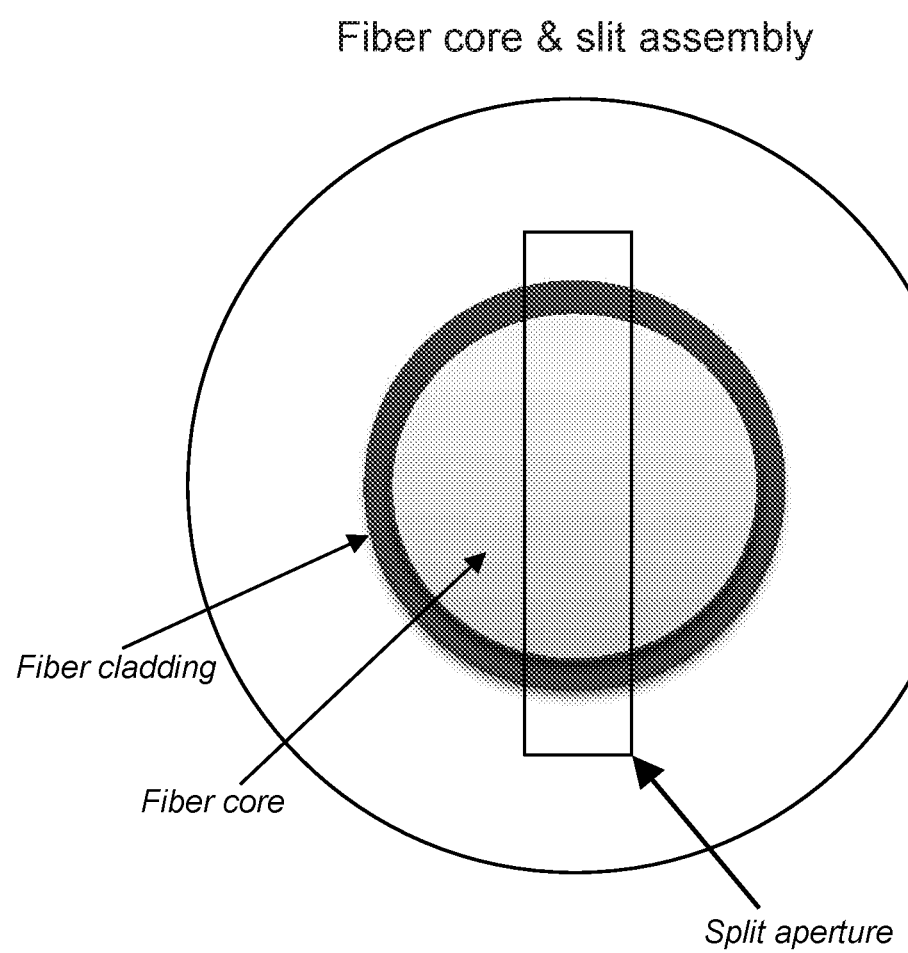
FIG. 22 shows an end view of an example using a relatively large-core fiber and a slit aperture at the end of the fiber.

FIG. 22 shows an end view of an example using a relatively large-core fiber and a slit aperture at the end of the fiber. This combination can provide improved coupling efficiency and spectral resolution compared to various prior schemes. The slit aperture can provide increased selectivity with reduced complexity compared to fiber bundles.

An experiment was performed to measure data of optical efficiency (in percent) and of FWHM (nm) as a function of slit width in mm. As slit width increased, optical efficiency and FWHM both increased. Below a slit width of 0.6 mm, efficiency dropped more rapidly as slit width decreased than was the case above 0.6 mm. The experiment showed that FWHM was controlled by the input core size.

Figure 23:
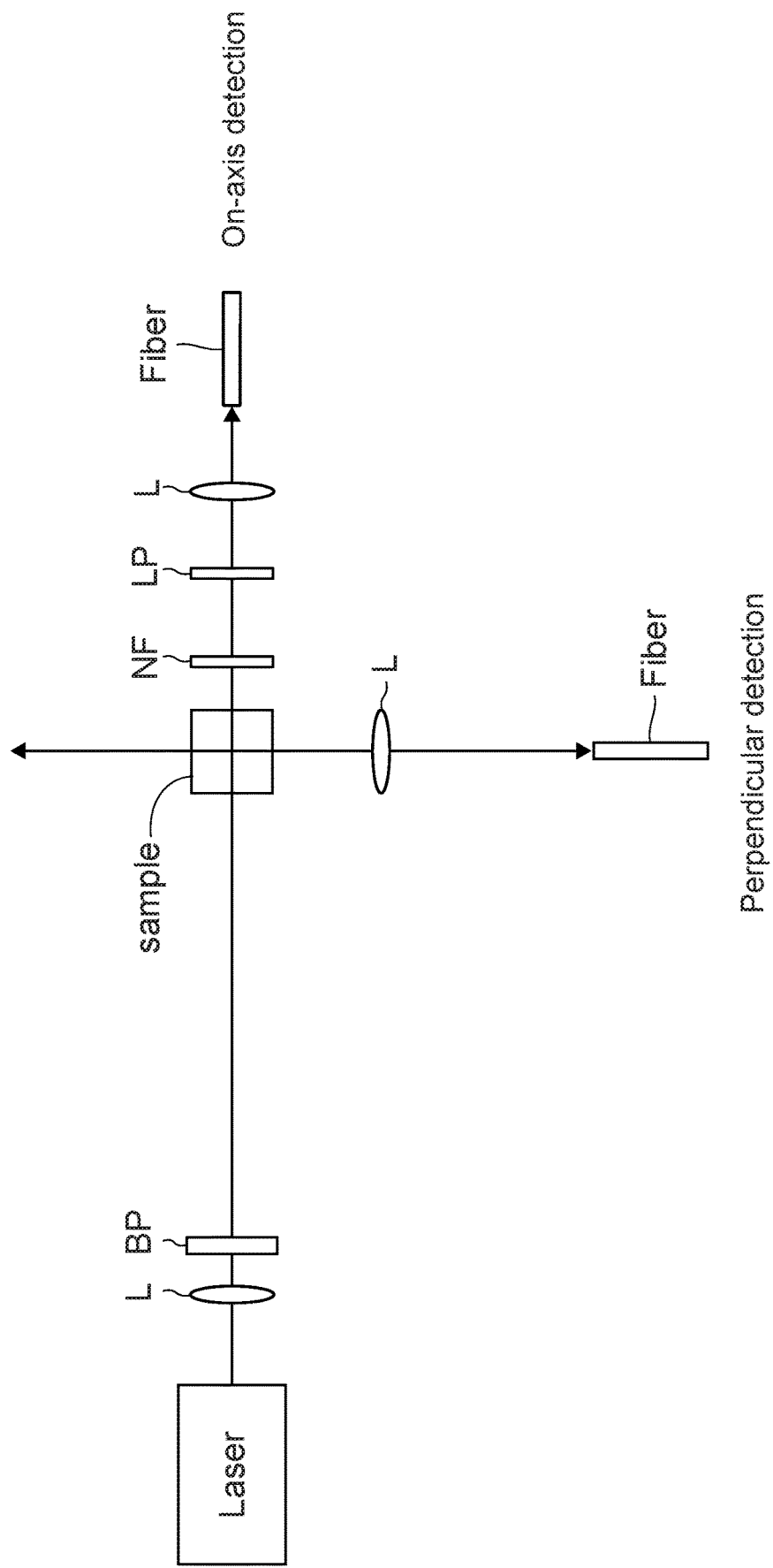
FIG. 23 shows components of an example optical system supporting on-axis and perpendicular measurement.

FIG. 23 shows components of an example optical system supporting on-axis and perpendicular measurement, in any combination. The illustrated components can additionally or alternatively be applied at other angles than those shown, e.g., 45°. In some examples, the illustrated sample can be located in a flow chamber, e.g., as discussed herein with reference to FIG. 24. In some examples, detectors using a monochromator as described herein (e.g., FIGS. 17, 19, 21B, or 26A), or a polychromator as described herein with reference to FIG. 26B, can be used to measure the on-axis and perpendicular resultant light. Some examples can use a slit and large core combination (FIG. 22) with perpendicular detection. The on-axis and perpendicular configurations are shown for purposes of example; single photon spectroscopy as described herein can be applied at any angle with respect to the incident beam. For example, on-axis detection can be used with transparent samples and conjugate excitation. Perpendicular detection can be performed without a filter, so can have reduced spectral loss.

The Influence of excited AFL depends on optics configuration. In-line detection to laser incident direction may be more affected than perpendicular fluorescence detection. In the case of confocal fluorescence imaging or flow cytometry with longer gate period for small particles, optics AFL can be reduced for higher contrast and accurate detection.

An experiment was performed to measure data of photon spectra of two different quartz samples, in cps over the wavelength range (in nm). In the tested example, the two types of quartz were distinguishable from each other using single-photon measurements.

The experimental data were collected in a step mode. In some examples, counting can be performed in, e.g., a step mode or a scan mode. In step mode, the monochromator can be adjusted to a particular wavelength (e.g., a 1 nm window), photons can be collected for a predetermined time (e.g., 1 s) while the monochromator is substantially fixed with respect to wavelength, and the adjusting and collecting operations can be repeated to collect respective photon counts for each of a plurality of wavelengths.

In scan mode, by contrast, the monochromator can be adjusted to change the wavelength continuously at a predetermined rate. For example, the monochromator can scan a 2 nm-wide window across the spectrum, and data can be collected, e.g., substantially continuously, or at points or intervals in time associated with predetermined wavelengths (e.g., the window centered on 400 nm, 405 nm, 410 nm, . . . ).

FIG. 24 is a perspective view schematically showing an example flow-cytometry system 3800 that can be used with sensors and detection systems described herein, e.g., FIG. 23. System 3800 includes a flow cell 3802. The flow cell 3802 includes a flow chamber 3804, and is, at least in part, transparent or substantially transparent to irradiation such as light L and resultant light such as light L_T-FS and L_T-SS. For clarity, only part of flow chamber 3804 is shown. Further details of various configurations of flow chamber 3804 and other parts of a flow system 330 (FIG. 3) are discussed below with reference to FIGS. 3A, 3B, and 5-10B. As shown, the flow cell 3802 can be 2 mm thick along the direction of propagation of light L.

A sheath flow SH flows into the flow cell 3802 from an inlet port IN1. For example, saline, which is an isotonic liquid, or water, can be used as the sheath flow SH. However, the sheath flow SH is not limited to saline, but various types of liquid such as water, other aqueous solutions (whether isotonic or not), and organic solvents can be used. In various examples, the sheath flow SH also flows into the flow cell 3802 from at least one additional inlet port, shown as IN3.

Further, a sample flow SM including microparticulate samples or other targets to be analyzed flows into the flow cell 3802 from an inlet port IN2. For example, saline, which is an isotonic liquid, can be used as the sample flow SM. However, the sample flow SM is not limited to saline, but various types of liquid such as water, other aqueous solutions (whether isotonic or not), and organic solvents can be used. The inflow pressure of the sample flow SM can be higher than or lower than the inflow pressure of the sheath flow SH. Flow chamber 3804 or other fluid channels in flow cell 3802 can be arranged so that the center of the sample flow is the fastest and the flow velocity approaches zero at the walls of the flow channel 3804. This can cause targets to be hydrodynamically focused, i.e., positioned by the fluid flow, substantially in the center of the sample flow. In the illustrated example, the fluid flows SM and SH are provided by a fluidic supply 3806.

The inlet ports IN1, IN2, IN3 can be bored, molded, or otherwise formed in the flow cell 3802. In an example, the flow cell 3802 includes glass or quartz. For example, flow channels (e.g., flow chamber 3804) can be formed by micro-blasting of quartz sheets. Ports IN1, IN2, IN3 can be drilled out of the quartz sheets. Other etching and boring techniques can be used to form flow channels, inlets, and other features. For example, sample channels, including flow chamber 3804, can be etched, and sheath channels can be micro-blasted using a mask to define the desired pattern. In other examples, channels and other cavities described herein can be injection molded, molded using other techniques, bored, or etched.

The sheath flow SH and the sample flow SM merge in the flow chamber 3804, so that a flow FL is provided in which the sample flow SM is substantially hydrodynamically focused with the sheath flow SH, e.g., around the sample flow SM, or arranged in other hydrodynamic-focusing configurations. The flow FL can be discharged to the outside of the flow cell 3802 in some examples.

An optical source 3808, e.g., a laser or other illumination source, can provide light L aimed, focused, or otherwise directed to irradiate the targets entrained within the sample flow SM. Laser light L can be at least partly transmitted or at least partly scattered, providing resultant forward-scattered light L_T-FS and resultant side-scattered light included in L_F-SS. Targets, e.g., chromophores bound to target molecules of interest, can fluoresce, producing resultant fluorescent light also included in L_F-SS. A detector 3810, e.g., an on-axis detector (FIG. 23), can detect light L_T-FS. A detector 3812, e.g., a perpendicular detector (FIG. 23), can detect light L_F-SS. Various examples can use one detector or more than one detector. Detectors can be placed at any angle with respect to the axis of the light L.

In some examples, optical source 3808 can include at least one component described in at least one of FIG. 1, 16, 17, 18, 19, 20, 21, 22, 23, or 25. In some examples, at least one of detector 3810 or detector 3812 can include at least one component described in at least one of FIG. 1-5, 7, 9-11C, 13, 14, 17-23, 25, 28, or 32-37. For example, optical source 3808 can include a laser and conjugate focusing optics, and detector 3810 can include a motorized monochromator, a SiPM using Geiger-mode PDs, and a differential detection circuit (FIGS. 4A-6B).

In some examples, a controller ("CTL") 3814 can control operation of the fluidic supply 3806 or the optical source 3808. In some examples, controller 3814 can receive information, e.g., photon counts, from detectors 3810, 3812.

Example Features

Various examples relate to multiple photon detection, e.g., with <1 ns pulse width, e.g., by avalanche signal processing. Various examples relate to spectrum analysis. Various examples relate to or include at least one of the following features, in any combination:

1. High pass filter Signal Processing: E.g., $C_{HP}$ (Farad) =$T_{RISE}$/50, e.g., t=100 ps, c=2 pF. E.g., $C_{HP}$ (Farad)=$T_{RISE}$/25~100

2. Adaptive pedestal clamping by ADD signal processing—Add two signals using a gain that stabilizes the pedestal level. In some examples, the two signal phase difference is smaller than 10 pulse pairs in resolution.

3. Differential Signal Processing of Photon Pulse: e.g., $C_{DIFF}$ (Farad)=(1/5)$C_{HP}$=$T_{RISE}$/250. In some examples, the primary corner frequency F0 (Hz)=1/(10 $T_{RISE}$)

3, using Differential Amplitude: $C_{DIFF}$ (Farad)=(1/5) $C_{HP}$=$T_{RISE}$/250; Primary corner frequency F0 (Hz)=1/(10 $T_{RISE}$)

3, using Differential Pulse Width: Two comparators at a threshold level of photon pulses; pulse width discrimination by pulse width comparison.

4. Adaptive comparator: Adaptive Envelope reference level determined as constant+envelope signal.

5. Comparator pulse resolution: smallest resolvable pulse smaller than pulse width at 70% level of Pulse height.

6. Photon Spectrum Analyzer including at least one of the following: Excitation Laser; focus lens; bandpass filter (laser wavelength); sample illumination; collection lens; notch filter; fiber-motorized monochromator; fiber-photon detection.

6, including a scanning monochromator for synchronized spectrum window Δλ at x seconds.

6, including photon counting per each Δλ, and repeated exposures.

6, configured to provide data indicating n×Δλ vs. photon count as a histogram.

6, configured to provide data indicating a counting trend at a specific wavelength (photon energy).

7. Spectrometer including a coherent-light illumination unit, a monochromator, and a single photon detector.

7, where the optics includes illumination optics and collection optics that convey the light to an optical fiber.

7, where the optics are arranged in an in-line layout between illumination and detection.

7, where the illumination optics focus the laser beam on a reflective laser notch filter. This way, the light excites the sample twice: once before reflection and once after. The sample is located close to the laser beam waist and the notch filter.

7 or the preceding, where the Illumination optic include a laser band pass filter to reduce laser spontaneous emission (e.g., ASE).

7, where the collection optics collects fluorescence photon in specific solid angle defined by a NA.

7, where the monochromator IN and OUT fiber bundles have slit shapes with close packing at the monochromator.

The preceding, where the fiber bundles have circular shapes away from the monochromator.

8. Tube Trapping of a liquid sample. This can reduce vial AFL.

9. Fluorescence photons scanned by a motorized monochromator for spectral analysis.

10. Data is analyzed for wavelength and time dependence, e.g., photo-bleaching.

11. Estimating and analyzing fluorescence characteristics quantitatively based at least in part on photon count, photon energy, illumination power, optics NA, or sensor PDE.

12. Simultaneous (e.g., concurrent) detection of photocurrent and photon counting. Various systems can utilize outputs from normal and differential output circuits in order to sense photon count and/or photocurrent. Simultaneous detection can enable additional levels of analysis and improved filtering of background signals.

13. Wide dynamic range by selectively switching a sensor array between Geiger mode and linear (e.g., non-Geiger) mode. In some cases, the switching can be performed by a bias control circuit that can change the mode of the sensor array relatively quickly. In some examples, over 7 decades of dynamic range is achievable using a system in which a sensor array can be switched between Geiger mode and linear mode.

14. A multi-channel (e.g., 42 channel) sensor array to be coupled to a polychromator that can be attached to one or more fibers. In some cases, a multi-channel (e.g., greater than 36 channel) Geiger-mode sensor array can be used to detect spectral signatures. The sensor array can be integrated with a spectrometer, in order to achieve a spectral resolution that can distinguish between wavelengths of light that are no more than 20 nm different from each other. In addition, light can be delivered to the sensor array using the fiber(s).

15. Time addressing for individual photon signals. In some cases, an individual single photon signal can be identified by a time address in a particle pulse width. Time resolution of the time address can be shorter than 100 ps, 1 ns, or smaller units of time. In some cases, time address information per particle can be stored and/or computed. A moving average, of photon count per period, can be used to provide a particle waveform based on photon stream.

16. Self-gating based on a photon stream signal and real-time gating for sorting.

17. Photon counting based on fluorescence emission and intensity profile from fluorescent signal emitted from a sample. A photon count can refer to a number of photons received during a gating signal. A photon number can represent emitted photon energy from a particular sample (e.g., a particle). A photon interval can be analyzed for dynamic phenomena, like fluorescence decay, bleaching, and the like.

18. Flow immersion optics coupled to a fiber to collect fluorescence signals and SSC signals. An collection optical system may have a catadioptric configuration, which can include at least one mirror, concave lens, and convex lens including an aspherical surface. The mirror may be integrated into or onto the flow chamber. Collected fluorescence can be coupled to a fiber core. A numerical aperture of the optical system can be greater than 1.0 using water as a carrier fluid. An image-object distance can be less than 30 mm.

19. Phase differential particle detection. A single particle can be detected using an excitation laser beam. A particle signal can be detected based on phase difference and/or diffraction of the excitation laser beam. In some cases, a split photodiode can be used as a push-pull signal to monitor a spot at which the excitation laser beam intersects a sensing area. A sum of the push-pull signal can be used to identify time and/or particle location.

20. Spot position and power monitoring by splitting/position photosensor. In some cases, a pass-through excitation beam, which may have passed through a sensing area, can be detected for phase signal, laser power, and can be used to identify flow velocity, spot alignment, and the like. A split photodiode can be used to detect laser power and other flow-independent parameters.

21. Sequential illumination of multi-wavelength excitation by separate beams. Fluorescent light from multiple excited beams can be guided onto a single fiber core, which can reduce signal noise. To reduce the influence of multiple excitation beams on each other, emission sources can be consecutively activated and deactivated, such that only one emission source is activated at a given time as a sample passes through a sensing area. Accordingly, multi-beam interference can be substantially eliminated without the use of an optical notch filter.

22. Photon stream particle detection and triggering. In various implementations, a photocurrent profile may have a delay with respect to a photon stream signal, due at least in part to the inclusion of a low pass filter in a circuit used to generate the photocurrent profile. The photon stream can include a summation of individual photon detection signals from individual sensors in a sensor array. The photon stream can be a 1 bit signal with picosecond time resolution. Time or photon number per unit period can be used to generate a gate signal. A number of photons per unit period (or a first derivative of the same) can be used to accurately time the beginning of a photocurrent signal. Accordingly, the photon stream can be used for triggering and/or gating. Using the photon stream, various systems can be self-gating with each photon stream signal. In some cases, triggering error can be prevented by using AND logic from multiple photon streams.

23. Any of the foregoing example features, combined or used with components described herein with reference to FIGS. 2A-2D, 4A-4C, 32-34, or 39-60

24. Examples described herein with reference to FIGS. 2A-2D, 4A-4C, 32-34, or 39-60.

Various aspects described herein provide detection and quantitative measurement (e.g., counts) of photons, e.g., using an SiPM or SSPMT. A technical effect is to measure emissions of fluorescent targets, e.g., in a sample fluid. A further technical effect is to effectively detect photons that strike a SiPM during the quench/recharge/dead time of that SiPM.

In some examples, SiPM or SSPMT Photon Detectors as described herein can provide improved sensitivity and linearity of fluorescence analysis. A dynamic range of six orders of magnitude can be measured, compared to three orders of magnitude for conventional photocurrent analysis. In some examples, flow cytometry systems herein can apply high power laser beam illumination to a sample in order to analyze material characteristics at high intensity illumination. Some examples can detect photo-bleaching phenomena using single photon analysis, unlike some prior schemes. Some examples can reduce auto fluorescence compared to some prior cytometers, e.g., by removing AFL effects due to a quartz flow chamber, sheath fluid, water, or calibration microbeads. Some examples permit cellular analysis by determining material AFL and providing very-low-fluorescence detection, e.g., of microparticles or single molecules.

Example 1: Data-Processing System

Figure 25:
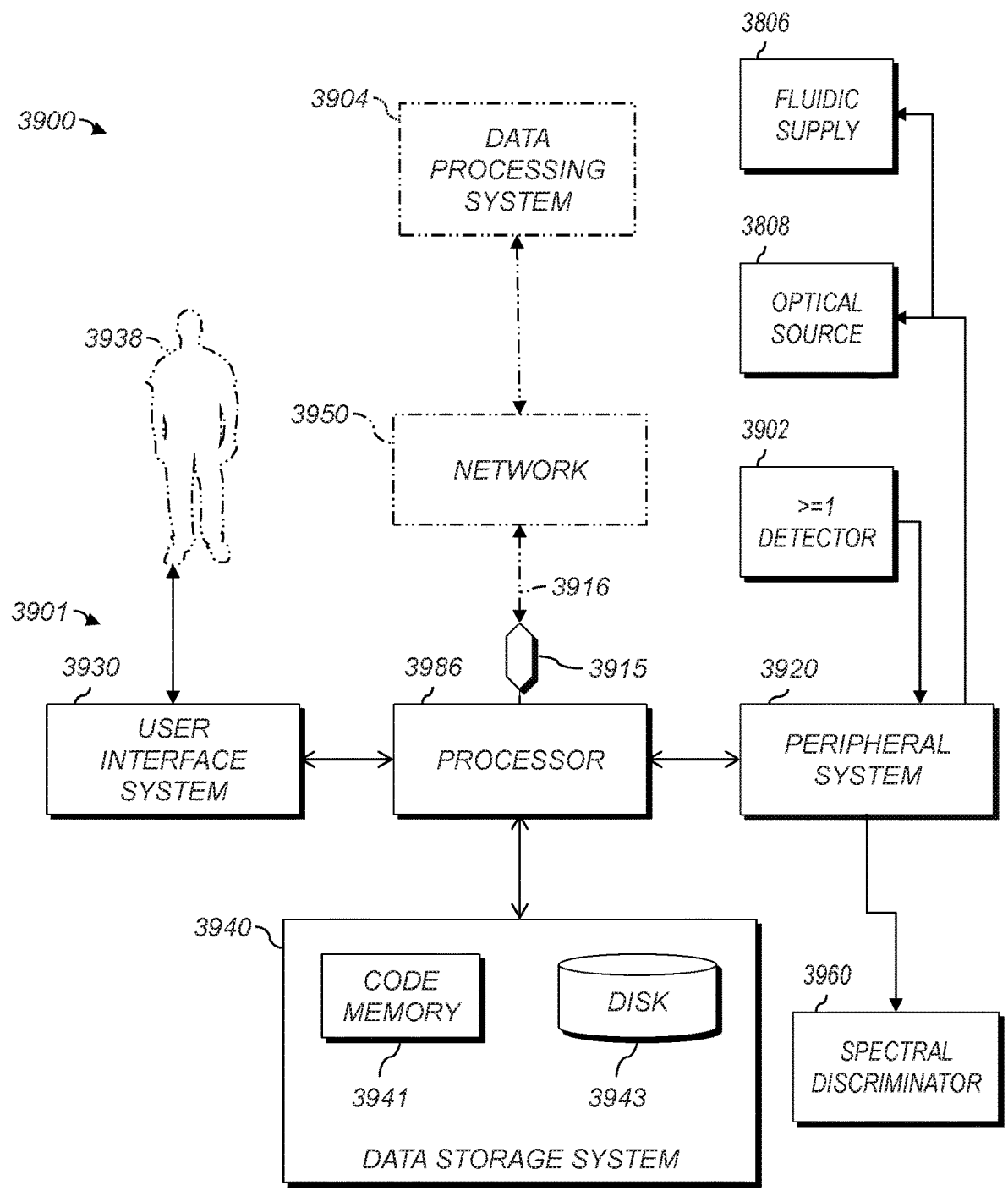
FIG. 25 shows an example data-processing system according to various examples herein.

FIG. 25 is a high-level diagram 3900 showing the components of an example data-processing system 3901 for analyzing data and performing other analyses described herein, and related components. The system 3901 includes a processor 3986, a peripheral system 3920, a user interface system 3930, and a data storage system 3940. The peripheral system 3920, the user interface system 3930, and the data storage system 3940 are communicatively connected to the processor 3986. Processor 3986 can be communicatively connected to network 3950 (shown in phantom), e.g., the Internet or a leased line, as discussed below. Devices above (e.g., the PC in FIG. 1, the system in FIG. 9, the PC in FIG. 17, controller 3814 shown in FIG. 24, the PC shown in FIG. 34, or other processing systems herein) can each be or include one or more of systems 3901, 3986, 3920, 3930, or 3940, and can each connect to one or more network(s) 3950. Processor 3986, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 3986 can implement processes of various aspects described herein. Processor 3986 and related components can, e.g., carry out processes for detecting photons, collecting count data from counters, operating a laser (e.g., adjusting the laser power), operating a monochromator (e.g., to scan across a wavelength band), or operating a fluid supply or other components of a flow-cytometry system as in FIG. 24.

Processor 3986 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 3920, user interface system 3930, and data storage system 3940 are shown separately from the processor 3986 but can be stored completely or partially within the processor 3986.

The peripheral system 3920 can include or be communicatively connected with one or more devices configured or otherwise adapted to provide digital content records to the processor 3986 or to take action in response to processor 186. For example, the peripheral system 3920 can include digital still cameras, digital video cameras, cellular phones, or other data processors. The processor 3986, upon receipt of digital content records from a device in the peripheral system 3920, can store such digital content records in the data storage system 3940. In the illustrated example, the peripheral system 3920 permits the processor 3986 to control fluidic supply 3806 and optical source 3808. The peripheral system 3920 also permits the processor 3986 to receive data from detector(s) 3902, e.g., detectors 3810 or 3812. In some examples, the peripheral system 3920 also permits the processor 3986 to control a spectral discriminator 3960, e.g., a motor or other drive that operates a monochromator to select the particular wavelength band output by the monochromator (e.g., FIG. 19 or 26).

The user interface system 3930 can convey information in either direction, or in both directions, between a user 3938 and the processor 3986 or other components of system 3901. The user interface system 3930 can include a mouse, a keyboard, another computer (connected, e.g., via a network or a null-modem cable), or any device or combination of devices from which data is input to the processor 3986. The user interface system 3930 also can include a display device, a processor-accessible memory, or any device or combination of devices to which data is output by the processor 3986. The user interface system 3930 and the data storage system 3940 can share a processor-accessible memory.

In various aspects, processor 3986 includes or is connected to communication interface 3915 that is coupled via network link 3916 (shown in phantom) to network 3950. For example, communication interface 3915 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 3915 sends and receives electrical, electromagnetic, or optical signals that carry digital or analog data streams representing various types of information across network link 3916 to network 3950. Network link 3916 can be connected to network 3950 via a switch, gateway, hub, router, or other networking device.

In various aspects, system 3901 can communicate, e.g., via network 3950, with a data processing system 3904, which can include the same types of components as system 3901 but is not required to be identical thereto. Systems 3901, 3904 can be communicatively connected via the network 3950. Each system 3901, 3904 can execute computer program instructions to operate measurement systems or capture measurements as described herein, or to communicate measurement data, e.g., via network 3950.

Processor 3986 can send messages and receive data, including program code, through network 3950, network link 3916, and communication interface 3915. For example, a server can store requested code for an application program (e.g., a JAVA applet) on a tangible non-volatile computer-readable storage medium to which it is connected. The server can retrieve the code from the medium and transmit it through network 3950 to communication interface 3915. The received code can be executed by processor 3986 as it is received, or stored in data storage system 3940 for later execution.

Data storage system 3940 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 3986 can transfer data (using appropriate components of peripheral system 3920), whether volatile or nonvolatile; removable or fixed; electronic, magnetic, optical, chemical, mechanical, or otherwise. Example processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 3940 can be a tangible non-transitory computer-readable storage medium, i.e., a non-transitory device or article of manufacture that participates in storing instructions that can be provided to processor 3986 for execution.

In an example, data storage system 3940 includes code memory 3941, e.g., a RAM, and disk 3943, e.g., a tangible computer-readable rotational storage device or medium such as a hard drive or solid-state drive (SSD). Computer program instructions are read into code memory 3941 from disk 3943. Processor 3986 then executes one or more sequences of the computer program instructions loaded into code memory 3941, as a result performing process steps described herein. In this way, processor 3986 carries out a computer implemented process. For example, steps of methods described herein, blocks of the flowchart illustrations or block diagrams herein, and combinations of those, can be implemented by computer program instructions. Code memory 3941 can also store data, or can store only code.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 3986 (and possibly also other processors), and that, when loaded into processor 3986, cause functions, acts, or operational steps of various aspects herein to be performed by processor 3986 (or other processor). Computer program code for carrying out operations for various aspects described herein may be written in any combination of one or more programming language(s), and can be loaded from disk 3943 into code memory 3941 for execution. The program code may execute, e.g., entirely on processor 3986, partly on processor 3986 and partly on a remote computer connected to network 3950, or entirely on the remote computer.

Example 2: Experimental Results of Various Bias Voltages

An experiment was performed to measure PE characteristics, in cps by mV, at bias voltages from 27 V-29 V, by 0.5 V. As bias voltage increased, a given mV level produced higher CPS. The five tested curves showed generally the same shape (a double waterfall), but shifted to the right (+mV) and slightly up (+cps) as bias voltage increased.

An experiment was performed to measure photo bleaching, indicated as the cps of the spectral peak as a function of accumulated exposure in mJ. The observed photo-bleaching occurs over a period of time, as the exposure accumulates. In the tested example, cps peaked at 23 kcps at <10 mJ of exposure, and declined to 2.6 kcps after about 280 mJ of exposure.

An experiment was performed to determine the amount or extent of photo bleaching using normal and reverse scans. In the illustrated example, measurements were collected from short wavelengths to long wavelengths (normal scan), 420 nm-670 nm. Subsequently, measurements were collected from long wavelengths to short (reverse scan). The difference between the two measurements at a given wavelength indicates the photo-bleaching at that wavelength. In some examples, the reverse scan can be performed before the normal scan. In the tested example, the normal scan peaked at (446 nm, 110 kcps). The corresponding peak on the reverse scan was at around 55 kcps. The curve shapes were generally the same.

An experiment was performed to measure spectra of a multi-ion discharge lamp in cps as a function of wavelength from 400-700 nm using techniques described herein. The measurements showed strong peaks at ~430 nm and ~540 nm. Techniques described herein can additionally or alternatively be used to measure other types of lamps, e.g., to test conformance of standard lamps or other sources to corresponding illuminants.

The experimental data covered more than three orders of magnitude (from below $10^3$ cps to above $10^6$ cps). Accordingly, some prior schemes having at most three orders of magnitude of dynamic range would not be able to effectively measure the lamp to provide the experimental data. Moreover, some prior lamp-characterization systems provide results in arbitrary units. As discussed above, counts measured by some example detectors described herein can be readily converted to physical units. This can make the collected data applicable to a wider range of uses than data provided by some prior schemes.

An experiment was performed to measure spectra using techniques described herein, in cps as a function of wavelength. A tungsten-halogen light source was measured without a filter, and found to have broadband emission over the range 400-700 nm. Two filters were measured: "525BPA" and "525BPB". The wide dynamic range (cps as high as $~1.6 \times 10^7$) and possibility to report results in physical units permit characterizing filters more accurately than in some prior schemes. This can permit improving the quality of data from flow cytometry, since filter characteristics can significantly affect cytometric results.

An experiment was performed to measure spectra (log scale) of various colors of physical test targets: Semi-transparent sky blue; Largely opaque violet; Semi-transparent red; Semi-transparent pink; Semi-transparent orange; Semi-transparent yellow; Semi-transparent green; Semi-transparent blue.

The physical test targets were plastic POST-IT flags of different colors. The measurements were able to span more than four orders of magnitude, from a system baseline of $~10^4$ cps to a peak measurement $~1.2 \times 10^8$ cps. This is much more dynamic range than some prior schemes.

Figure 26B:
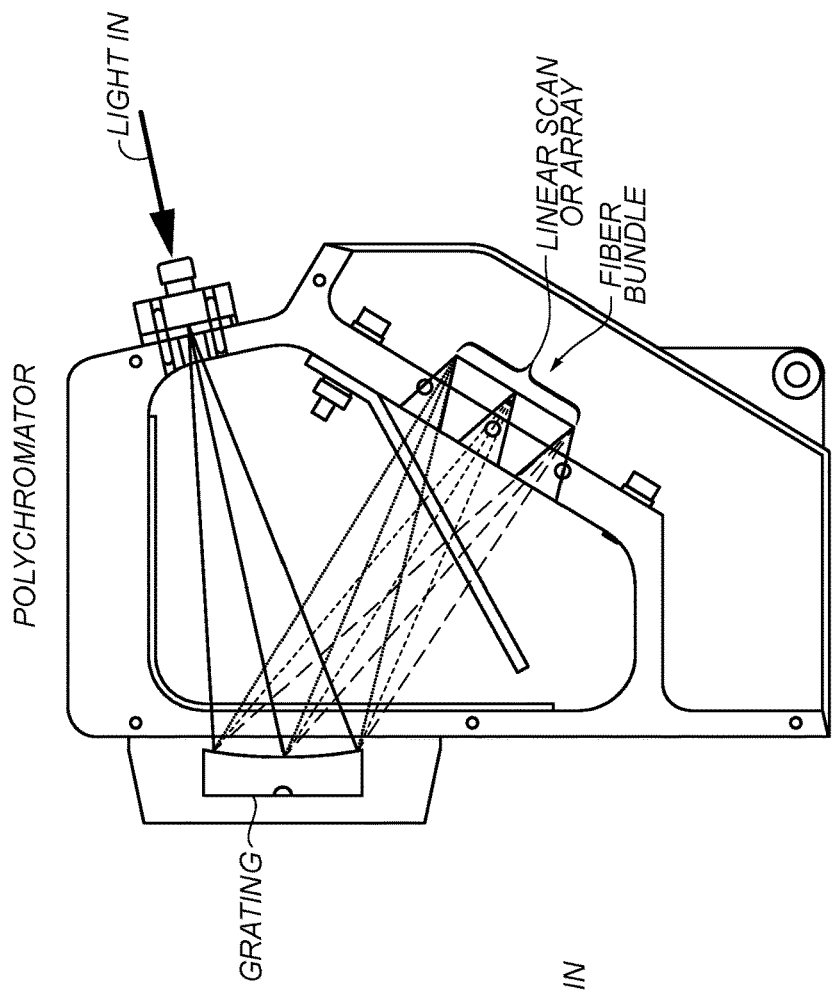
FIG. 26B shows an elevational cross-section of an example polychromator.
Figure 26A:
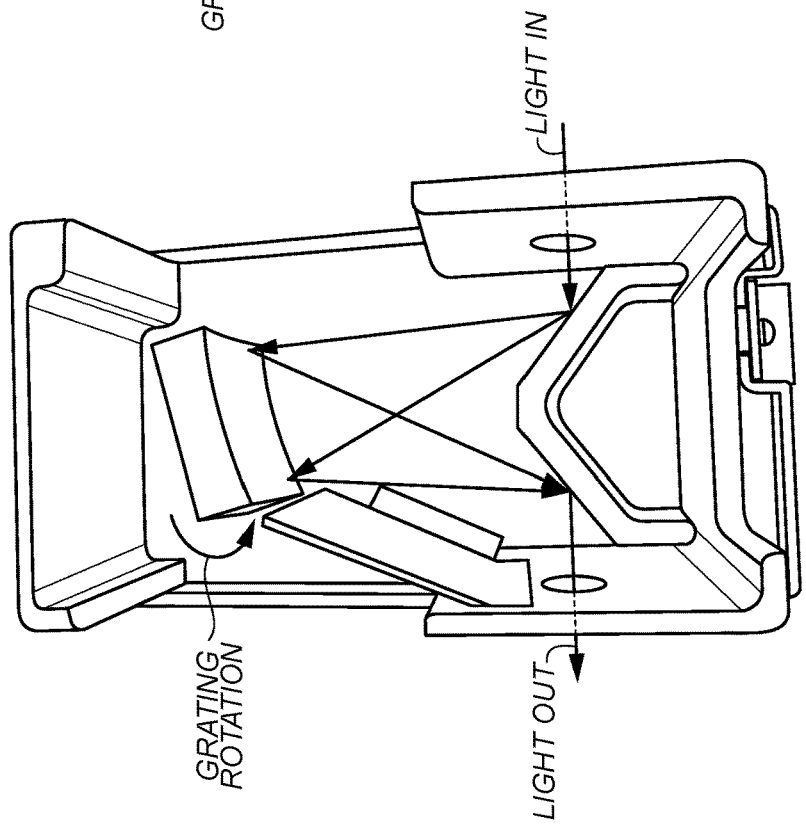
FIG. 26A shows a perspective of components of an example motorized monochromator.

FIG. 26A shows a perspective of an example motorized monochromator. Example monochromators are described herein with reference to FIGS. 17, 19, and 21.

FIG. 26B shows an elevational cross-section of an example polychromator. The polychromator can, e.g., disperse incoming light across to a fiber-optic cable bundle, e.g., as in FIG. 21 or 22. Additionally or alternatively, the polychromator can include or be connected to a motion system (e.g., a linear stage) that translates a fiber or fiber bundle across the spectrum spatially distributed by the grating.

Figure 27B:
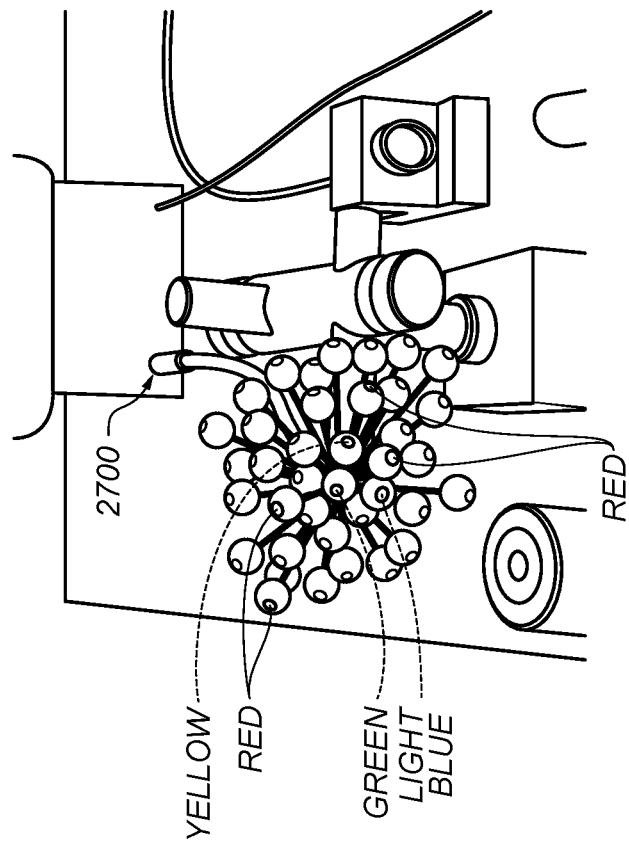
FIG. 27B shows output fibers fed by a polychromator.
Figure 27A:
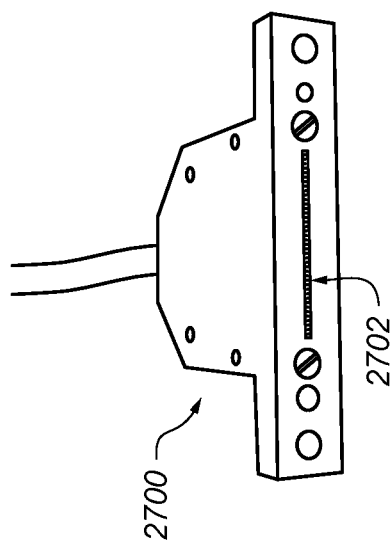
FIG. 27A shows an example linear fiber array and connector.

FIG. 27A shows an example 42-channel ("42CH") linear fiber array connector 2700. The illustrated connector includes a bundle 2702 of 42 optical fibers arranged along a line.

FIG. 27B shows output fibers fed by a polychromator such as that shown in FIG. 26. Connector 2700 can connect to the polychromator and carry the output fibers in bundle 2702. As noted by the color labels, different output fibers are carrying different wavelengths of output light.

Figure 28:
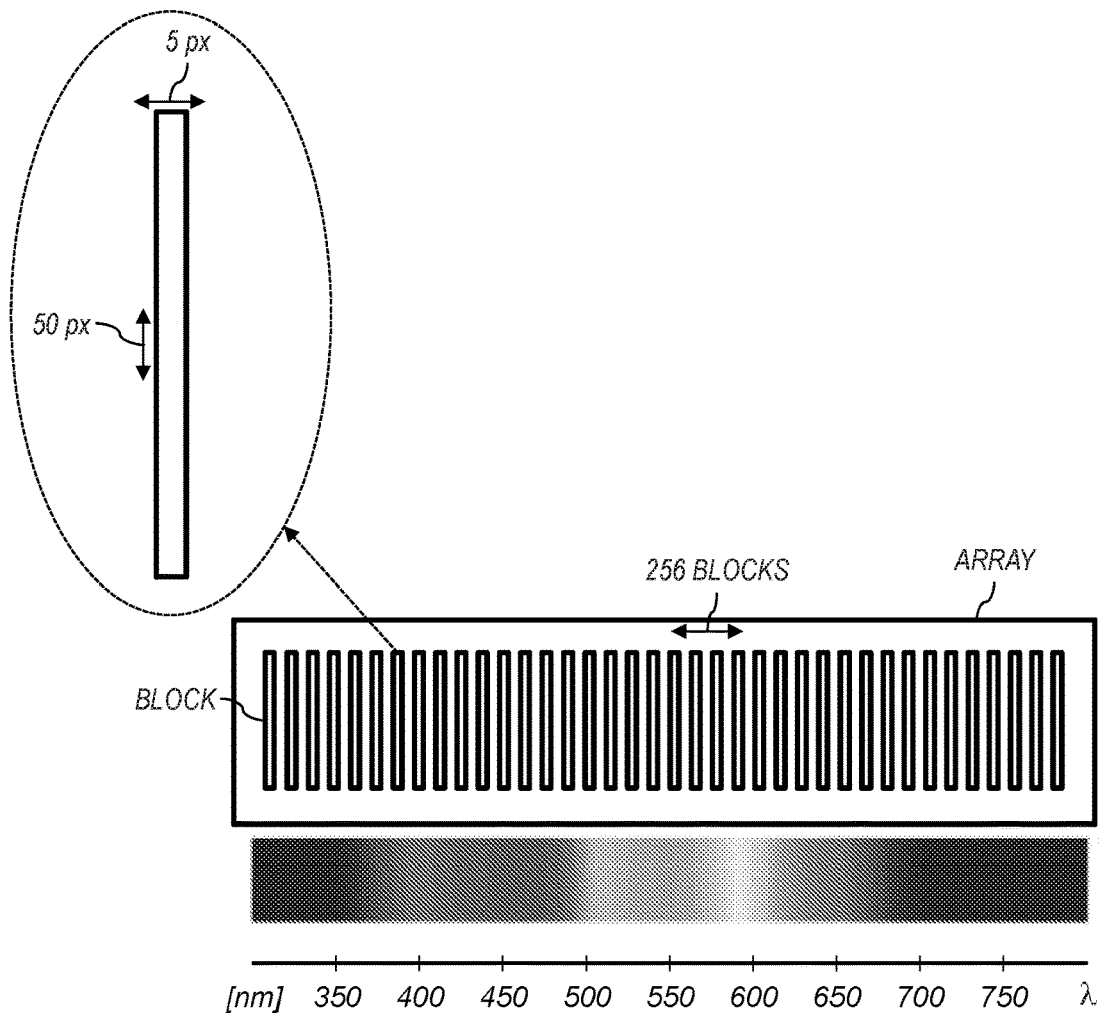
FIG. 28 shows an example SiPM linear array.

FIG. 28 shows an example SiPM linear array configured for high-speed (e.g., µs) single-photon spectrum detection. The array can be used as a photon sensor or optical detector in various configurations herein, e.g., FIG. 1, 9, 17, 18, 20, 24, or 25. As shown, the array includes multiple blocks of SiPM pixels (e.g., 250 pixels each, as 5 px×50 px). Each SiPM pixel can include a PD and a resistor, e.g., as discussed herein with reference to FIGS. 2A, 3A, 3B, 4A, or 11A-11C. Each block of pixels extends substantially along an axis that is substantially not parallel with (e.g., is substantially perpendicular to, or is at least 40° from) a direction (horizontal) across which the spectrum is spread. Multiple blocks are arranged along the spectrum-spread direction (e.g., 256 blocks for a 256-channel array). Any number of blocks, or of pixels per block, can be used. In the illustrated example, the array is or includes a monolithic SiPM array. In some examples, electronics, e.g., as in FIGS. 4A, 5, 7, 9, 10A-10B, 13, or 14, can be integrated within a die or package holding the SiPM array. In some examples, multiple array or electronics dice can be integrated within a package. The illustrated array has 256 blocks (shown as strips extending vertically), each corresponding to one output channel. The blocks are packed together horizontally. Each illustrated block can have a width of 100 µm, for a total array width of ~25.6 mm. Each block can be, e.g., 1 mm long. Each block can include 250 pixels, e.g., arranged in five rows of 50 pixels each (as shown in the inset). In some examples, the blocks can be separate blocks, e.g., spaced apart or abutted. In some examples, the blocks can be portions of an area sensor having a regular 2-D array of SiPM pixels. In some examples, the linear array can comprise an area sensor.

In some examples, the dark count of a SiPM sensor is proportional to sensor area. Therefore, using small blocks (e.g., 1.0×0.1 mm as shown) can reduce the dark current (e.g., to one-tenth that of a 1×1 mm sensor). Cooling, filtering, or other techniques herein can further reduce the dark count.

Dark-count rate (DCR) is the lower limit of sensitivity and largely determines the dynamic range of photon counting. A cause of high dark counts is thermal noise in p-n junctions. Thermal electrons are amplified in a similar manner to incident photons. Unlike photo current noise (thermal noise, shot noise, amp noise, and so on), the dark count can easily be subtracted from the evaluated count rate. A Peltier cooler or other cooling unit can be arranged proximal to the SiPMs or other SSPDs and configured to cool the SSPDs to reduce dark count. Other examples of coolers include forced-air ventilation coolers, e.g., cooling heatsinks applied to the SiPMs; liquid-cooling systems; or cooling systems using dry ice or other compounds with freezing temperatures below 0° C., either in direct contact with the SSPDs to be cooled or arranged so that the vapor from those compounds is brought into thermal contact with the SSPDs to be cooled.

A 1 $mm^2$ SiPM sensor was tested. At temperatures higher than 25° C., the DCR was over 100 kcps, but was reduced to 2 kcps at −10° C. Various examples provide a DCR<1 kcps by cooling the sensor below −20° C. Experimental evidence showed that a DCR of 100 cps was attained by dry-ice cooling at −50° C. A counting range from 1 kcps to 1 Gcps provides a six-orders-of-magnitude dynamic range with theoretical linearity in the digital environment. Temperature control also provides improved data accuracy, stability, and reproducibility. The measured value of DCR at 4° C. was 5 kcps, the standard deviation per second, r, was 10 to 50 cps, and the coefficient of variation was 0.2-1.0%, respectively.

Figure 29:
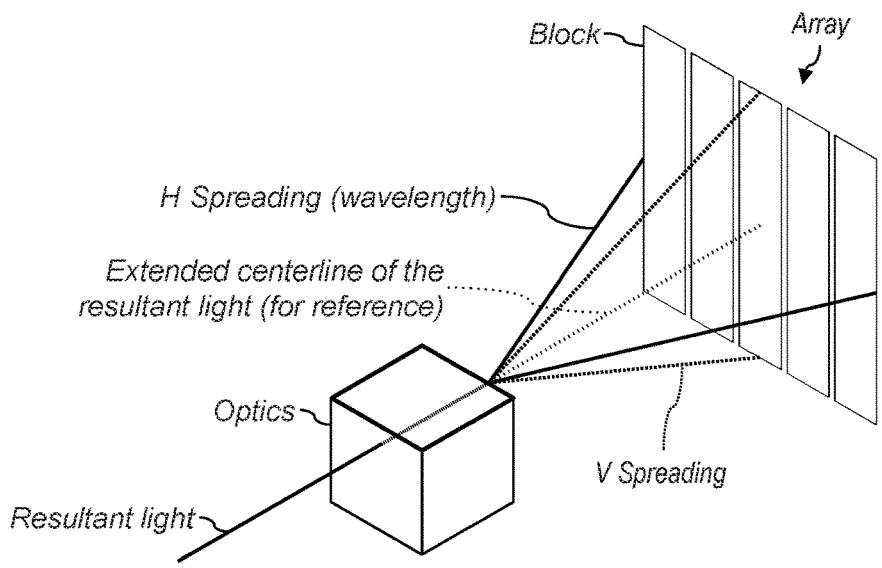
FIG. 29 shows components of an example optical system and array.

FIG. 29 shows an isometric view of an example optical system and array. Resultant light is shown for clarity of explanation as a collimated beam, although this is not required. The illustrated optics collect resultant light and spread the light over the array (five blocks are shown, but any number can be used). The optics causes different wavelength bands of light to strike each block ("H spreading"). For a particular block, the optics can spread the light within the corresponding wavelength band across the block to increase sensitivity or dynamic range of the detection system ("V spreading"). In some examples, H and V spreading can be performed by separate optics, e.g., a beam expander for V spreading followed by a grating for H spreading. In some examples, only H spreading is performed (e.g., for beams already substantially as wide as the blocks are long). V spreading can additionally or alternatively be performed by directing the beam onto the sensor at an angle other than normal to the sensor, e.g., from below or above in the illustrated configuration, to expand the width of the beam as projected on the sensor.

Accordingly, the optics can be configured to spread out different wavelengths of the resultant light along the same direction the blocks are spread out (horizontal, as illustrated) and to spread out light within a particular wavelength along a second direction substantially different from that direction (vertical, as illustrated), e.g., a direction perpendicular to or more than 40° from that direction. The illustrated optics can include at least one slit, grating, beam shaper, beam expander, prism, mirror, or lens, in any combination. In an example, optics includes a spectral discriminator, e.g., a grating or prism, to perform the H spreading, followed by a slit or a lens arrangement to perform the V spreading. The illustrated orientation, and the terms "H" and "V," are not limiting; other orientations or spatial arrangements can be used.

In some examples, the optics can include a toroidal mirror grating for the H spreading. Additionally or alternatively, the optics can include a plurality of dichroic mirrors configured to reflect respective wavelengths to respective blocks or groups of blocks. Additionally or alternatively, the optics can include prism(s).

Figure 30:
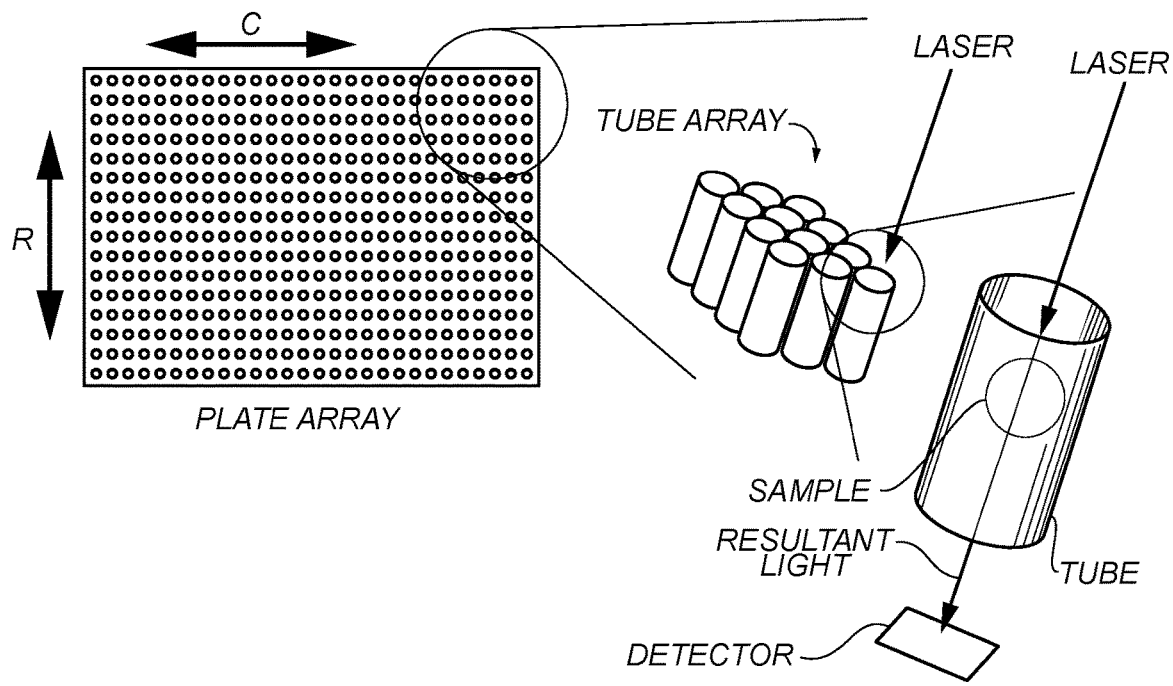
FIG. 30 shows an example system for high-throughput sample measurement.

FIG. 30 shows an example system for high-throughput sample measurement or analysis. Insets are indicated using dash-dot lines. A plate array, e.g., a substantially transparent microwell plate, can hold a plurality of samples, e.g., fluidic samples. In some examples, e.g., as discussed herein with reference to FIG. 20, the plate can include open tubes, and samples can be held in the tubes by capillary action. A laser beam or other incident light can be directed into each tube, e.g., successively in a raster scan across the plate. Additionally or alternatively, multiple wells can be illuminated at once with respective laser beams or other incident light, e.g., from multiple light sources or from one source split, e.g., using partially-silvered mirrors, diffraction gratings, or other optical elements, into multiple beams.

Resultant light from the sample, e.g., fluorescent light or other light as in FIG. 1, 17, 18, 20, 23, or 24, can travel out of the indicated tube (e.g., microwell), e.g., substantially in the direction of travel of the laser or other incident light. This can reduce crosstalk between wells. Other directions of resultant-light travel can additionally or alternatively be used. A detector, e.g., as in FIG. 1, 17, 18, 20, 21, 23, 24, 25, 28, or 29, can detect the resultant light. One tube at a time can be measured, or multiple tubes can be measured concurrently using multiple detectors.

In the illustrated example, the system has R rows of wells and C columns of wells. In some examples, the system is configured with a detector for each row, or for each column, and an irradiation system configured to provide incident light to each tube in a column, or each tube in a row, respectively. This can permit measuring an entire row or an entire column at once, which can increase throughput.

Figure 31:
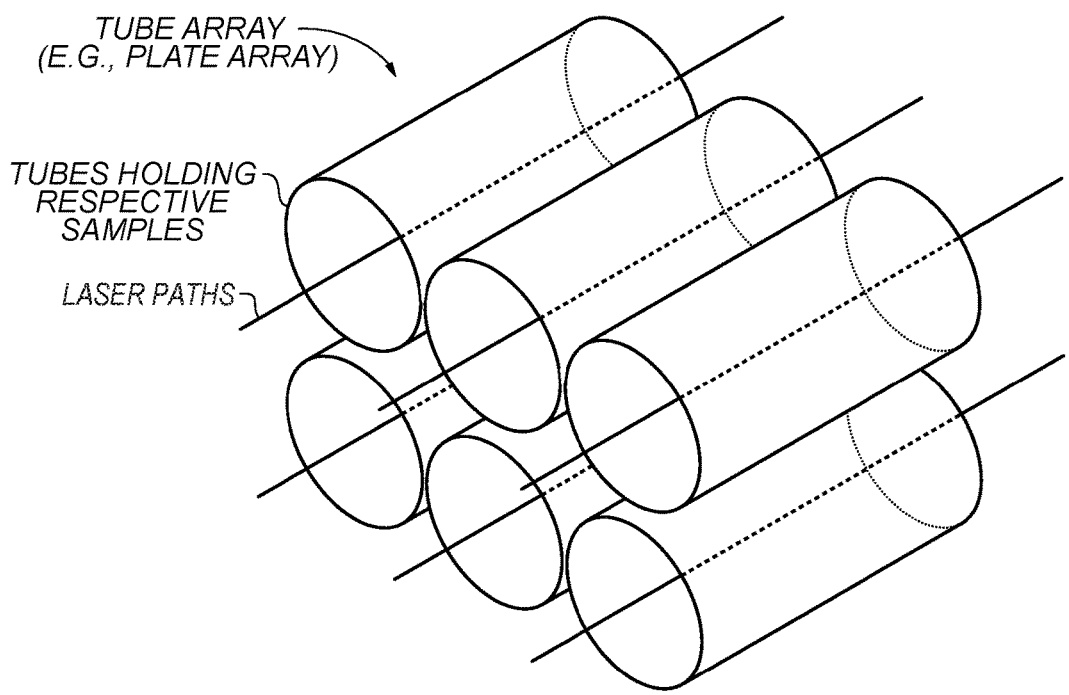
FIG. 31 is an isometric view of tubes in a portion of a plate array such as that in FIG. 30.

FIG. 31 is an isometric view of tubes in a portion of a plate array such as that in FIG. 30. Illustrated are six tubes and, for each, a respective path of the laser beam or other incident light.

Example 3: System Integrating Solid-State Silicon Microelectromechanical System

Figure 32:
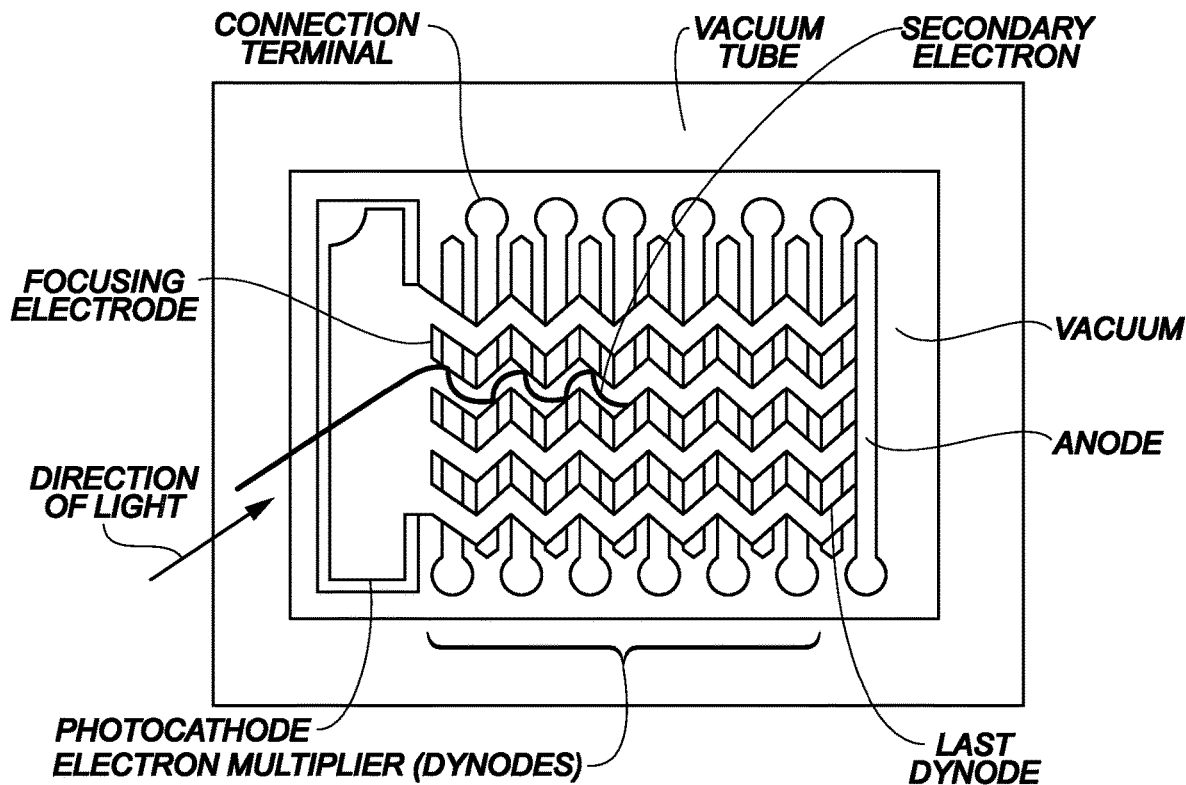
FIG. 32 shows a plan view of an example silicon microelectromechanical system (MEMS) photomultiplier (PM).

FIG. 32 shows a plan view of an example solid-state silicon microelectromechanical system (MEMS) photomultiplier tube (PMT), e.g., sold by HAMAMATSU. The illustrated SSPMT is an example of an SSPD, and can be used instead of or in addition to SiPMs in measurement systems described herein. Unlike a conventional PMT with metal dynode structure, the micro-PMT dynode is made by a Si MEMS process, which accurately produces a small and thin structure. When a photon pulse from a micro-PMT is amplified by a high-speed preamp, it is possible to obtain a photon pulse of 4-5 ns. Example pulse waveforms from such micro-PMTs show lower noise and distortion than some prior PMTs from smaller input capacitance owing to short distance and small area. In addition, a small photocathode area (e.g., 1×3 mm) can achieve very low dark-count rates at room temperature. According to the velocity distribution of cascade electrons, the photon pulse for the PMT can show a continuous photoelectron (PE) level. The combination of low dark count and narrower pulse width can provide a photon detection system with a wider dynamic range. Some PMTs provide gain and dynamic range control on the outputs for both photocurrent and photon mode, permitting calibrating the detected value to the absolute power level for each measurement condition. In some examples, the output from the SSPMT is a current, and an external transimpedance amplifier (TIA) is used to provide a voltage-based photon signal. In some examples, the SSPMT includes or is packaged with a TIA (e.g., in a system-in-package or system-on-chip configuration) and so can produce a voltage-based photon signal. In various examples such as those shown in FIGS. 1, 17, 18, 20, 21A-24, or 26A-34, in order to collect fluorescence light and couple to the sensor, fiber- or aberration-free optics can be used.

In some examples, an SSPMT does not exhibit a significant quench or recharge time, unlike an SiPM. For example, there is no structure in some SSPMTs that is required to recharge after a pulse. Therefore, some examples that use an SSPMT and not an SiPM do not use differentiation circuitry such as that shown in FIGS. 4A and 5.

Figure 33:
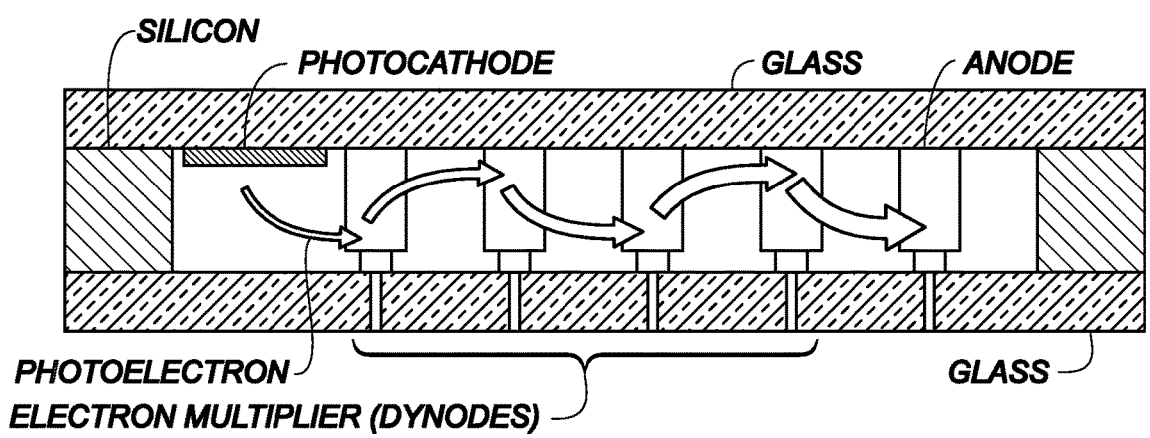
FIG. 33 shows an elevational cross-section of the PM of FIG. 32.

FIG. 33 shows an elevational cross-section of the PMT of FIG. 32. As shown, the PMT has glass covers on the top and the bottom. In some examples, incoming light may reflect off both the top and the bottom of a glass layer due to the difference in indices of refraction between the outside air, the glass, and the inside environment of the PMT (e.g., vacuum or neutral gas). Similarly, light may reflect off both sides of a protective layer (e.g., ~3 μm thick) over an Si base used in a SiPM (e.g., FIG. 2C). This can produce interferometric effects that affect SSPD output. Therefore, in some examples, the protective layer, glass, or other layer(s) through which light travels have anti-reflective (AR) coatings or surface structures, e.g., with one or more layers. In some examples, at least one surface of at least one layer in a SiPM or SSPMT has a metamaterial coating or structure, e.g., a surface nanostructure, configured to reduce reflection at that surface.

Figure 34:
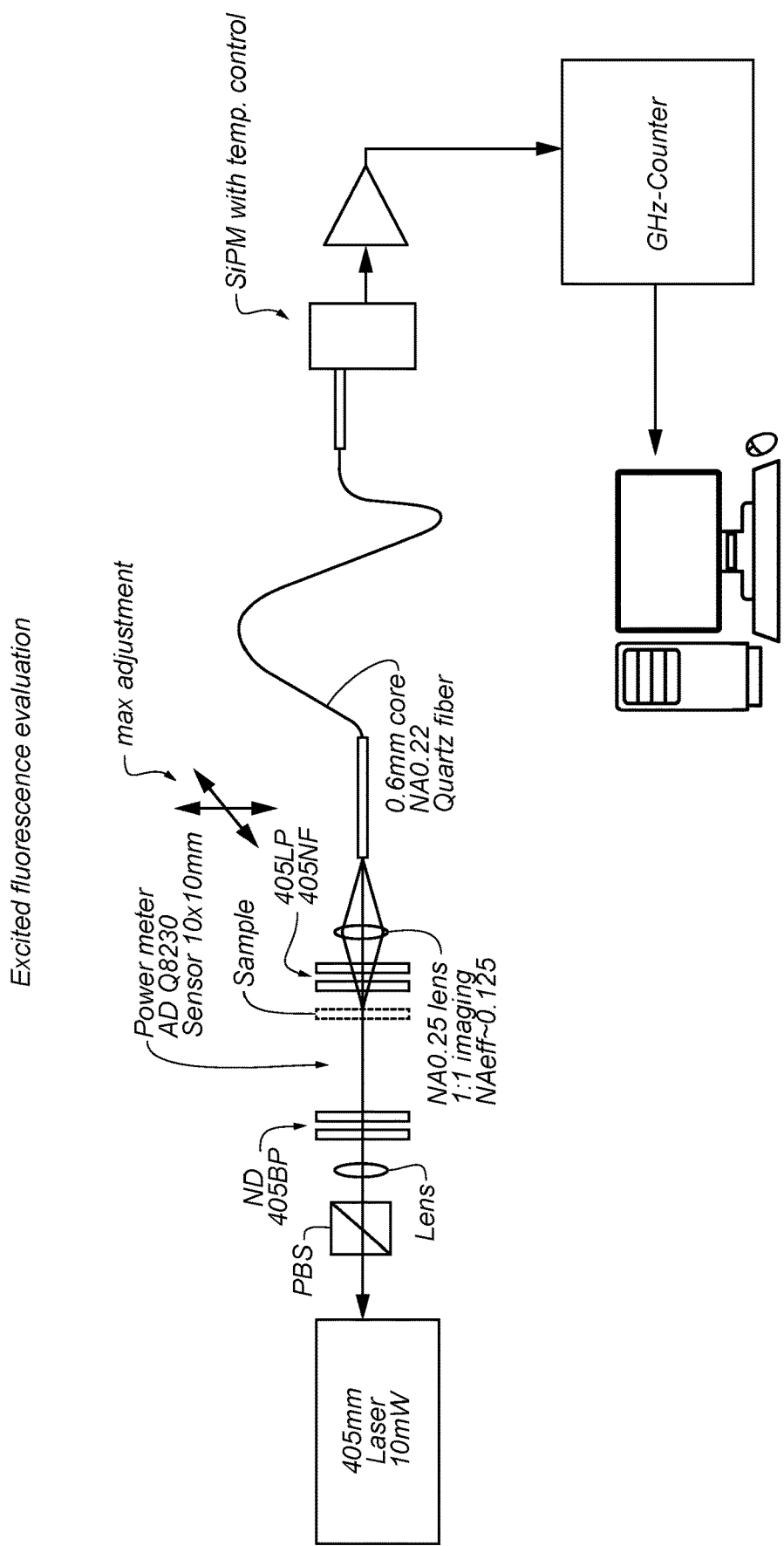
FIG. 34 shows an example photon-counting measurement system, e.g., using a PM.

FIG. 34 shows an example photon-counting measurement system, e.g., using SSPMTs such as shown in FIGS. 32 and 33. The illustrated components and parameters are illustrative and not limiting. In the case of 10 kcps photons at 405 nm, the intensity is approximately 5 fW. This is roughly 1000 times higher sensitivity than is obtained with a conventional photocurrent approach. Various examples of photon counting can distinguish each photocurrent noise cause, permitting more accurate cellular analysis, e.g., of basic material in flow cytometry and biology. Some examples include optical or other components such as described herein with reference to FIG. 1. Similar to FIG. 1, incident light from the laser reaches the sample, and resultant light from the sample is focused by the collection lens into the optical fiber. The optical fiber carries the resultant light (e.g., broadband) to a spectro unit (motor-driven, as shown, or other examples such as those in FIG. 1). A photon sensor, e.g., an SSPMT or other SSPD, measures the resultant light at various wavelengths. The illustrated example shows an amplifier, e.g., a TIA, that amplifies the photon signal. Other example spectral discriminators and photon sensors are described herein with reference to Table 1.

FIG. 34 shows autofluorescence (AFL) evaluation optics in a tested example. An excitation wavelength of 405 nm is the shortest wavelength in the visible region with excitation energy that provides a full visible spectrum longer than the laser wavelength. A laser spot 100 μm in diameter illuminates the sample behind a bandpass filter to remove stimulated spontaneous emission in the laser beam. Excited fluorescence photons are collected by an NA-0.125 lens and coupled to an NA-0.22 optical fiber through a 405-nm notch filter and a long-pass filter to remove excitation photons. Detection occurs at 420-900 nm and count is given as total number of photoelectrons (PEs) without detection-efficiency correction. Assuming that excited fluorescence is emitting uniformly to any solid angle, the total number of emitted photons is estimated as 1000 times the measured PE number because of lens collection efficiency (1/250) and sensor PDE (1/4).

Excited autofluorescence intensity is roughly proportional to illuminating power and sample thickness under fixed optics. In order to compare autofluorescence, an excitation coefficient k is defined as the detected PE number per μW illumination for a 1-mm sample thickness (PEcps/μW mm).

Interestingly, quartz, glass, and many materials show AFL and photobleaching. An experiment was performed to check the excitation coefficient before and after photobleaching. Photobleaching is difficult to observe with the noncoherent light source in a conventional fluorescence spectrometer. Lasers can provide very high illumination intensity, over $10^6$ J/m$^2$, which is not proportional to total illumination energy (J). Measurement is first dark count, system AFL, and dry vial for liquid, and finally the sample to calculate a count only for that sample.

As an example, an excitation coefficient of 1000 cps/µW mm means that the total number of emitted photon is estimated as 1 Mcps (1 k×1 kcps) under measurement conditions. A photon measurement of 1 Mcps represents about 1 pW of incident flux captured by the sensor. Illumination at 405 nm/1 µW contains 2.04 Gigaphotons. This equals 1 Mcps/2 Gcps, ~1/2000; it takes 2000 illuminating photons to produce a single emitted photon. Using a measured excitation coefficient, it is possible to estimate the AFL from the illumination level. A material with k=1000 cps/µW mm emits 1 k×1 kcps=1 Mcps, ~1 pW AFL under 1 mW illumination. Several material-evaluation results are shown in Table 3. Table 3 shows the measured excitation coefficient per 1 µW/405 nm exposure and 1-mm sample thickness for basic materials in flow cytometry. Measurements were taken with conditions 405 nm, 1 µW, 100 µm spot, and NA 0.125.

TABLE 3

| Material | Excitation coefficient k (cps/uW mm) | Remark |
|---|---|---|
| Flow cell quartz | 3500-1500 | Photobleach before/after |
| Highest grade quartz | 700-300 | Photobleach before/after |
| Distilled water | 250 | Tube trapping |
| Sheath | 1120 | Tube trapping |
| Clean polymer bead 1 pm in water | 2210 | Tube trapping |
| Clean silica bead 1 pm in water | 10,700 | Tube trapping |
| Y-G highlighter | 1,180,000 | Tube trapping |
| Slide glass borosilicate | 4700 | 1 mm thick |
| Cover glass borosilicate | 3200 (530) | 0.17 mm thick |

Many materials for flow cytometry exhibit autofluorescence, e.g., distilled water, sheath, or clean beads. Yellow-Green dye diluted in water for flow check in a cytometer has a count of 1.2 Mcps/µW mm, meaning roughly one emitted photon for every two excitation photons in the illuminated volume. In order to reduce the influence of AFL from the tube, a trapping method involving illumination along the coaxial direction for liquid-sample evaluation can be used, as discussed herein with reference to FIG. 20.

Figure 35:
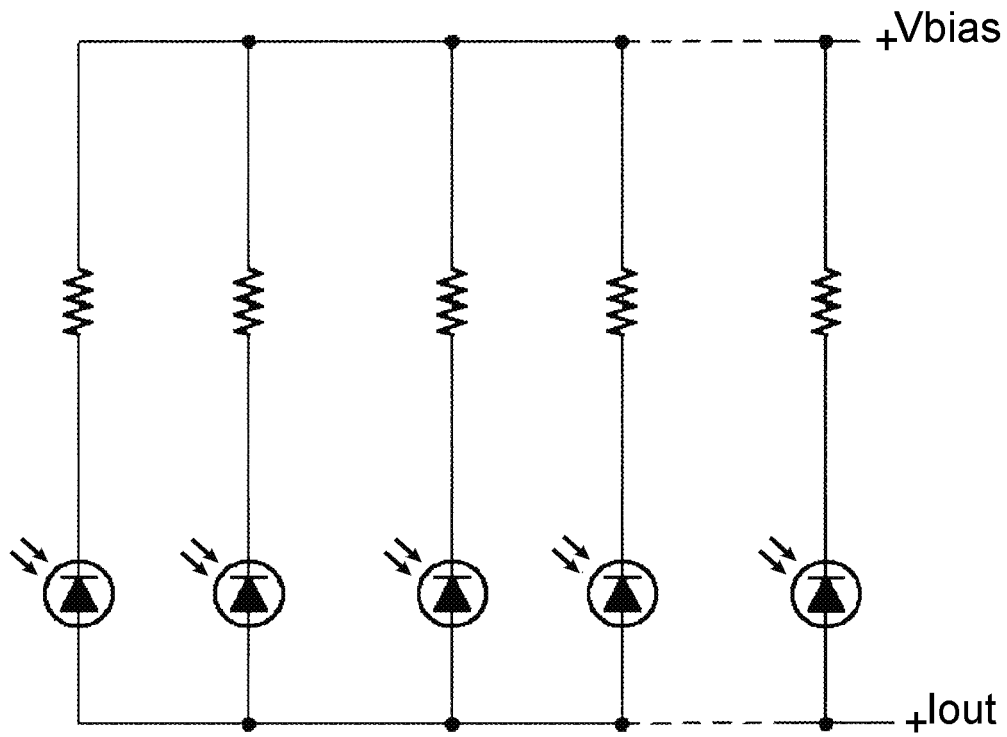
FIG. 35 shows circuitry of an example silicon photomultiplier.
Figure 36:
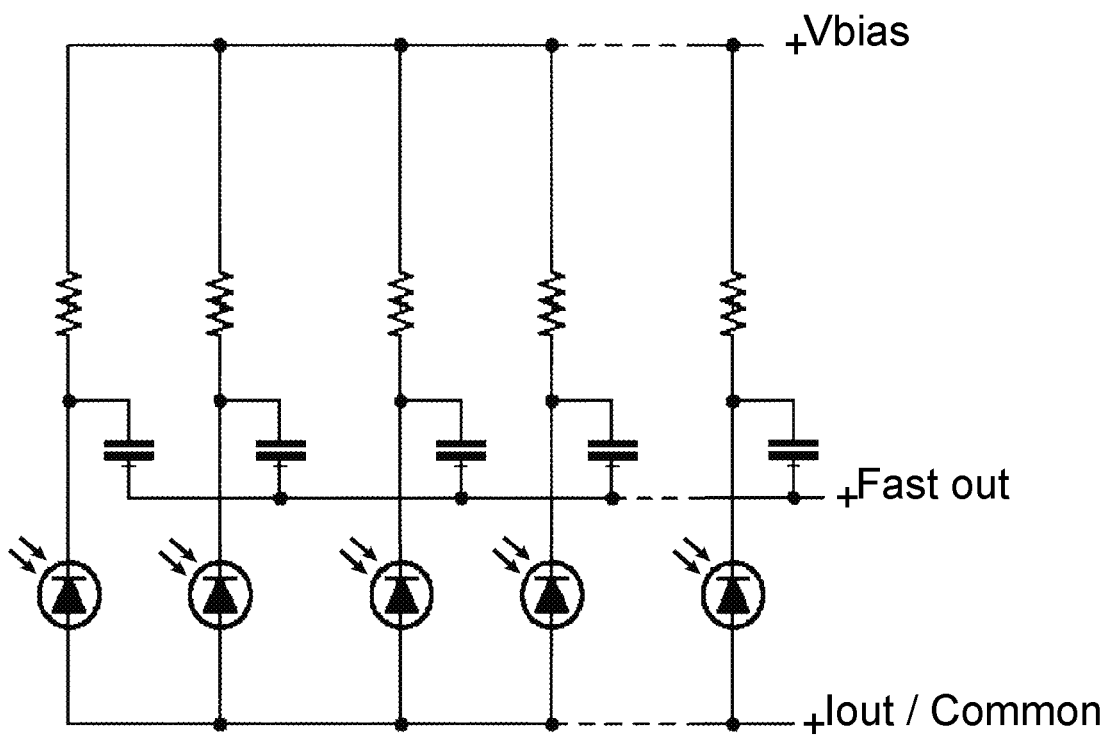
FIG. 36 shows circuitry of an example silicon photomultiplier including a fast readout electrode.

FIG. 35 shows a silicon photomultiplier in which the anodes of an array of photodiodes are connected to a common ground electrode and the cathodes of the array are connected via current limiting resistors to a common bias electrode for applying a bias voltage across the diodes.

FIG. 36 shows an example SiPM in which a third electrode is capacitively coupled to each photodiode cathode to provide a fast readout of the avalanche signals from the photodiodes. When the photodiode emits a current pulse, part of the resulting change in voltage at the cathode will be coupled via mutual capacitance into the third electrode. Using a third electrode for readout avoids the compromised transient performance resulting from the relatively large RC time constant associated with the biasing circuit.

In the illustrated example, the quench resistors and the fast-readout capacitors are connected to the respective cathodes of the photodiodes. In other examples, the quench resistors and the fast-readout capacitors are connected to the respective anodes of the photodiodes. The illustrated example shows a 1-D arrangement of photodiodes. However, the same circuit can be used in a 2-D array such as that of FIG. 3A or 11A by, e.g., wiring all the cathodes in each row together, and to all the cathodes in the other rows (and likewise for the anodes and the fast output electrodes). In some examples, a 2-D array can be segmented, e.g., into multiple groups of rows, the photodiode circuitry in each group connecting to a single cathode and a single anode, and the groups having respective, different cathodes and respective, different anodes.

In some examples, the readout electrode is insulated by Silicon Oxide or another dielectric from all the elements of the SiPM structure but has weak capacitive coupling to each photocell. Such capacitive coupling provides fast, partial (1-10% or so) injection of the signal charge (which is of the order of 0.15 pC/photocell) when the photocell is firing. The capacitance of the third electrode toward other electrodes of the SiPM stays rather low, of the order of 10% of total SiPM capacitance. To implement this electrode, a transparent conductor (for example very thin gold, or a transparent conducting oxide such as Indium Tin Oxide) or a grid-like structure comprising a non-transparent conductor may be used. The third electrode may be galvanically isolated from the first and second electrode. The signal in the third electrode may be induced electrostatically. The third electrode may be coupled to a cathode of the photodiode, for example via a capacitive coupling. The signal in the third electrode may be induced by capacitive coupling between the third electrode and the photodiode cathodes. The capacitance of the third electrode with the photodiode cathodes may be between 2% and 20% of the total silicon photomultiplier capacitance. The capacitance of the third electrode with the photodiode cathodes may be approximately 10%.

Figure 37:
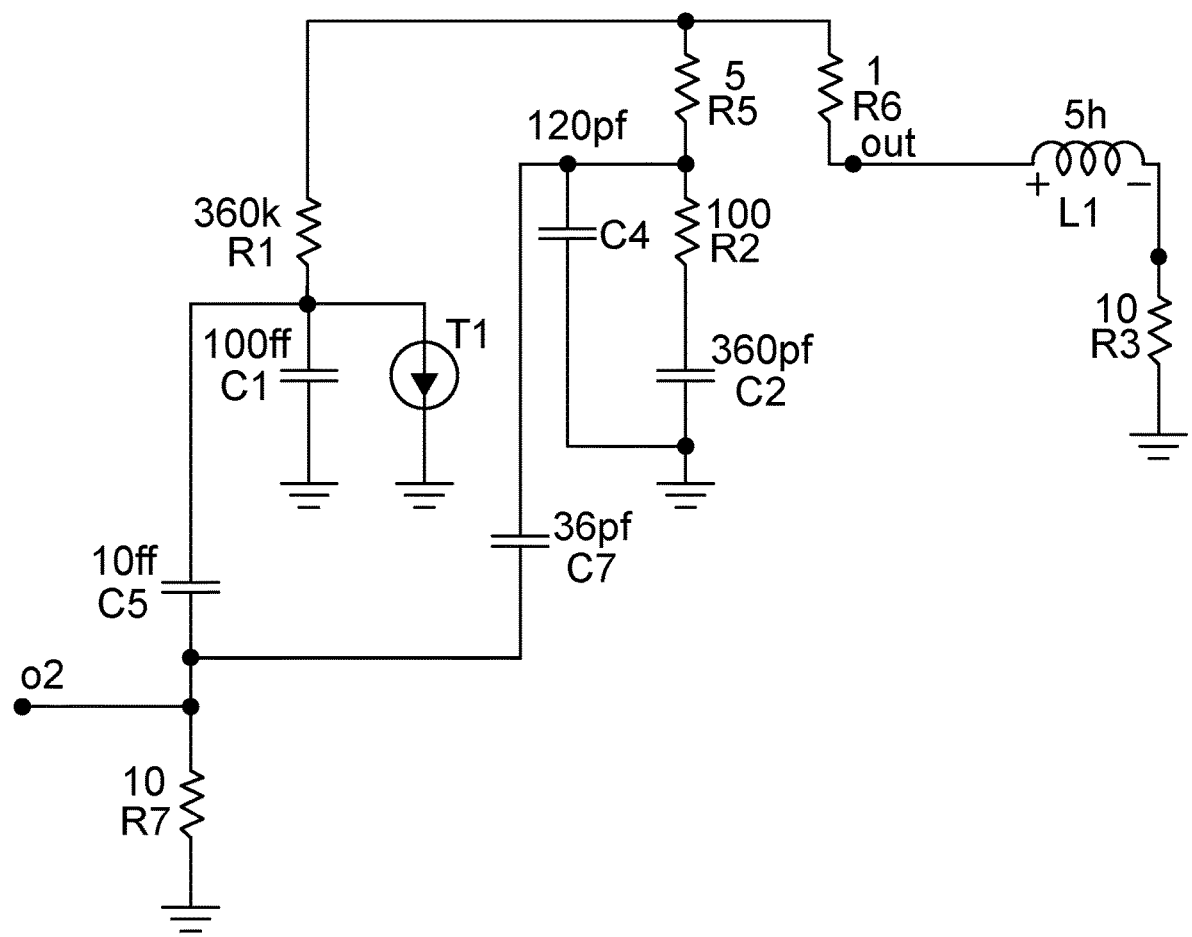
FIG. 37 shows an equivalent circuit illustrating characteristics of the photomultiplier of FIG. 36.

FIG. 37 shows an equivalent circuit showing a manner of operation of various aspects such as that shown in FIG. 36. The current source I1 represents the avalanche current of the diode, C1 the capacitance of the photodiode and C5 the capacitance between the third electrode and the photodiode. The remaining network represents a biasing and readout circuit. In the illustrated example, the current through R7 simulates the readout, unlike some prior schemes using R3. The current through R7 can respond more quickly in both rise and fall than the current through R3. Various examples include reading the output signal from the third electrode using a wideband amplifier with low input impedance. The wideband amplifier may have a bandwidth greater than 200 MHz and may have an input impedance of less than 200 ohms. Various examples include reading the output signal from the third electrode using a current integrating charge amplifier to provide an output proportional to the number of photodiodes firing within a period of time of interest.

Figure 38:
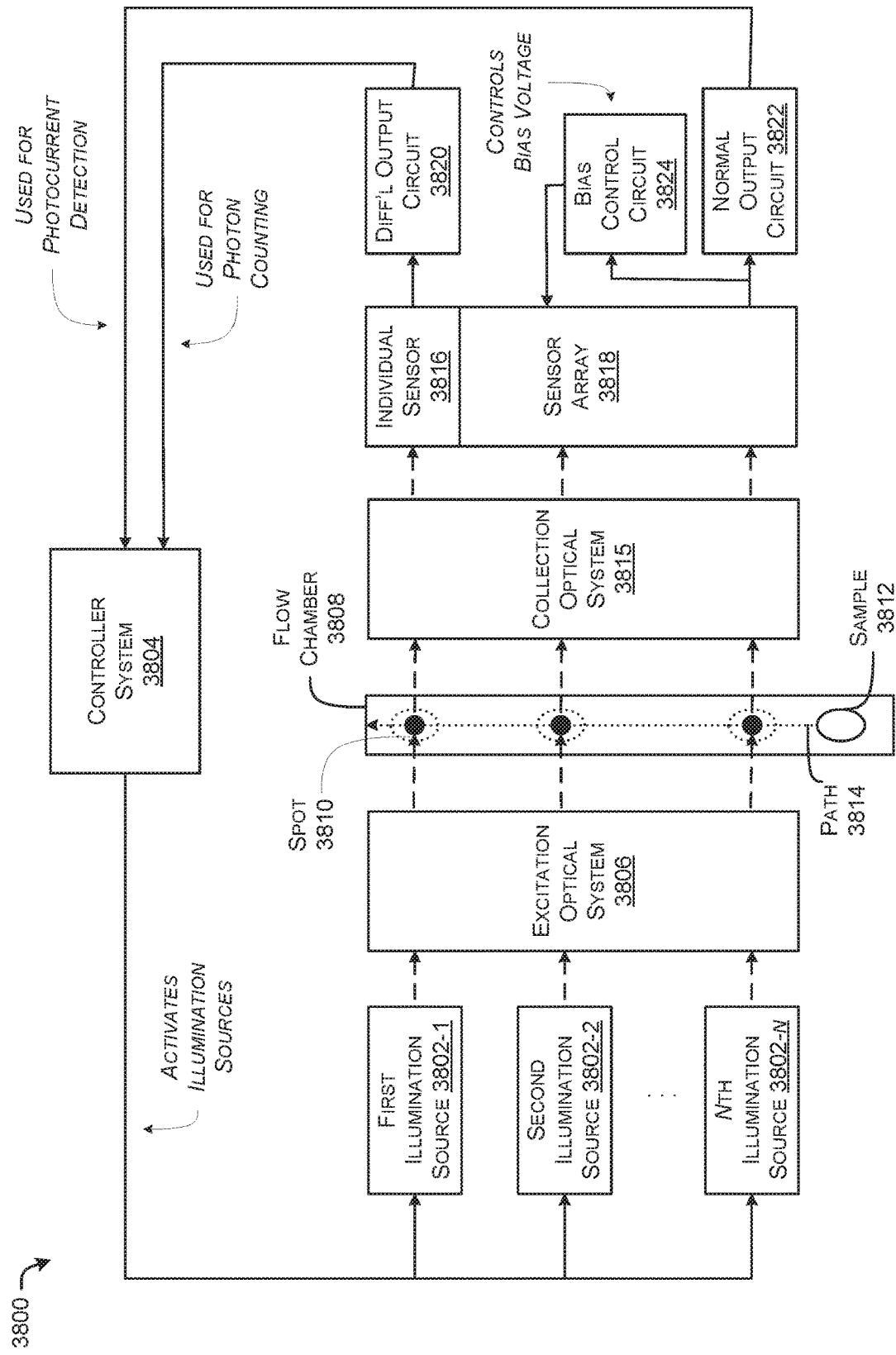
FIG. 38 illustrates an example system 3800 that can be utilized to perform photon counting and/or multi-spot spectroscopy.

Example(s) 4: Systems for Performing Photon Counting and Multi-Spot Spectroscopy FIG. 38 illustrates an example system 3800 that can be utilized to perform photon counting and/or multi-spot spectroscopy. In the example illustrated in FIG. 38, dashed lines may represent electromagnetic radiation, dotted lines may represent physical movement, and solid lines may represent analog and/or digital electrical signaling. The example system 3800 may correspond to a flow cytometry system, in some implementations.

The example system 3800 may include first to nth illumination sources 3802-1 to 3802-n, wherein n is a positive integer. Some examples of the illumination sources include laser sources. Any one of the illumination sources 3802-1 to 3802-n may be configured to emit electromagnetic radiation, such as light. For instance, the illumination sources 3802-1 to 3802-n may emit respective beams of excitation light. In some cases in which there are multiple illumination sources 3802-1 to 3802-n, the illumination sources 3802-1 to 3802-n may emit electromagnetic radiation with different wavelengths.

In various implementations, a controller system 3804 may be configured to consecutively activate the illumination sources 3802-1 to 3802-n. At least some of the illumination sources 3802-1 to 3802-n may be deactivated at an example point in time. Accordingly, power used to activate the illumination sources 3802-1 to 3802-n may be conserved. Various techniques used to activate the illumination sources 3802-1 to 3802-n will be described in further detail below.

The excitation light emitted by the illumination sources 3802-1 to 3802-n may be input into an excitation optical system 3806. The excitation optical system 3806 may include at least one of a lens or a mirror configured to project the excitation light onto n number of locations onto a flow chamber 3808. For instance, the excitation optical system 3806 may be configured to direct the respective beams from the illumination sources 3802-1 to 3802-n to intersect a longitudinal axis of the flow chamber 3808. In some implementations, the excitation optical system 3806 can be at least partially integrated with the flow chamber 3808. The excitation optical system 3806 may project the n excitation beams emitted from the n illumination sources 3802-1 to 3802-n onto n respective spots 3810 in a sensing region of the flow chamber 3808. When n is greater than 1, multiple spots 3810 may be projected with excitation light. In some cases, the spots 3810 can be spaced apart from each other by no more than 100 um, 50 um, or some other similar distance. In some implementations, the farthest distance that separates any of the spots 3810 is no more than 500 um, 200 um, or some other distance. The spots 3810 may be spaced apart from each other, and may not overlap.

A sample 3812 to be analyzed may be flowed through the flow chamber 3808 along a path 3814. In various implementations, the flow chamber 3808 may be part of a flow system that moves the sample 3812 along the path 3814. For example, the flow system may hydrodynamically focus the sample 3812 onto the path 3814 and to move the sample 3812 along the path at a known velocity. For instance, the flow system may include various microfluidic devices configured to focus the sample 3812 along the path 3814. In some cases, multiple samples in addition to the sample 3812 can flow through the flow chamber 3808 at least approximately along the sample path 3814 and/or a plane including the path 3814. The path 3814 may at least partially intersect the sensing region of the flow chamber 3808.

As the sample 3812 moves along the path 3814, the sample 3812 may consecutively encounter the excitation light from the illumination sources 3802-1 to 3802-n and/or the excitation optical system 3806. That is, the path 3814 may intersect the spots 3810 projected in or onto the flow chamber 3808. When the sample 3812 encounters one of the spots 3810 (i.e., any one of the excitation beams), the sample 3812 may emit fluorescent light. The fluorescent light may include at least one photon.

In various implementations, a collection optical system 3815 may receive the fluorescent light emitted by the sample 3812. The collection optical system 3815 may include at least one lens, mirror, or a spectral disperser that can be used to manipulate the fluorescent light emitted by the sample 3812. The collection optical system 3815 may be configured to project the fluorescent light onto one or more individual sensors 3816 in a sensor array 3818. In some cases, a spectral disperser in the collection optical system 3815 may be configured to project a different range of wavelengths onto each individual sensor 3816 in the sensor array 3818, such that the individual sensors 3816 can receive a different range of wavelengths. Although FIG. 38 illustrates only a single individual sensor 3816 in the sensor array 3818, the sensor array 3818 may include multiple individual sensors 3816.

Furthermore, although FIG. 38 illustrates that the collection optical system 3815 is located in a direction with respect to the flow chamber 3808 that is parallel to the direction at which the excitation optical system 3806 emits the excitation light, implementations are not limited thereto. In some cases, a first part of the collection optical system 3815 can be configured to receive pass-through light from the excitation light. In some cases, the positions of the spots 3810, phase differences, and the like, can be derived using sensors (e.g., split photodiodes) configured to receive the pass-through light from the excitation light. In some cases, the collection optical system 3815 can receive fluorescent light emitted from the sample 3812 independent of the pass-through light used to excite the sample 3812.

The individual sensor (also referred to as a "sensor element") 3816 may be configured to output an electrical signal in response to receiving one or more photons of the fluorescent light emitted by the sample 3812 and/or manipulated by the collection optical system 3815. The individual sensor 3816 may output the electrical signal into a differential output circuit 3820. The differential output circuit 3820 may, in some implementations, include an analog circuit that includes at least one differentiating element. The differential output circuit 3820 may, in some cases, include an analog to digital converter. The output of the differential output circuit 3820 may be input into the controller system 3804. The output of the differential output circuit 3820 may be used by the controller system 3804 to count photons emitted from the sample 3812 and received by the individual sensor 3816 and/or the sensor array 3818. In some cases described herein, single photon counting can be performed using the output of the differential output circuit 3820. In implementations in which the sensor array 3818 includes m individual sensors 3816, wherein m is a positive integer, the system 3800 may include up to m differential output circuits 3820 corresponding to respective individual sensors 3816.

The sensor array 3818 may be configured to output an electrical signal in response to any of the individual (optical) sensors 3816 receiving the fluorescent light emitted by the sample 3812 and/or manipulated by the collection optical system 3815. The electrical signal output by the sensor array 3818 may be received by a normal output circuit 3822. The normal output circuit 3822 may include at least one of an analog circuit, a digital circuit, or an analog to digital converter. An output of the normal output circuit 3822 can be fed into the controller system 3804. In various implementations, the controller system 3804 can be configured to identify a photocurrent of the fluorescent light emitted by the sample 3812 and received by the sensor array 3818 using the output of the normal output circuit 3822.

The system 3800 may further include a bias control circuit 3824 configured to supply a bias voltage to the sensor array 3818. In various implementations, the bias voltage may be sufficient to operate the individual sensors 3816 in the sensor array 3818 in Geiger mode while they are configured to detect the light emitted from the sample 3812. The bias control circuit 3824 may be further configured to adjust the bias voltage based on the electrical signal output by the sensor array 3818. The bias control circuit 3824 can adjust the bias voltage in order to prevent electrical saturation of the sensor array 3818 while still maximizing sensitivity of the individual sensors 3816 to photons emitted by the sample 3812.

In various implementations, the controller system 3804 can utilize the output of the normal output circuit 3822 and/or the differential output circuit 3820 to identify a photon count and/or photocurrent of the light emitted from the sample 3812. In some cases, the control system 3804 can use the differential output circuit 3820 to generate a photon burst signal. The photon burst signal can be used to self-gate the photocurrent signal and/or normal output circuit 3822.

Although not illustrated, in some cases, an additional one or more sensors can be configured to receive excitation light from the emission sources 3802-1 to 3802-$n$ that has passed through the flow chamber 3808. These sensor(s) may include at least one split photodiode. The controller system 3804 may receive an output from the sensor(s) and use the output to selectively activate the illumination sources 3802-1. For example, the controller system 3804 can identify that the sample 3812 has encountered at least one of the spots 3810 produced by at least one of the illumination sources 3802-1 to 3802-$n$, using the output from the sensor(s), or alternatively, using the output from the differential output circuit 3820 and/or the output from the normal output circuit 3822. The controller system 3804 can activate a subsequent illumination source among the illumination sources 3802-1 to 3802-$n$ at a time that the sample 3812 is expected to encounter the spot 3810 corresponding to the subsequent illumination source. Accordingly, the sample 3812 may encounter all of the spots 3810 without requiring constant activation of all of the illumination sources 3802-1 to 3802-$n$. The system 3800 can thereby perform multi-spot spectroscopy while conserving energy.

Example(s) 5: Optical Systems, Methods, and Devices

Various implementations of the present disclosure include, or otherwise utilize, optical systems, methods, and devices. Examples of optical systems, methods, and devices are described herein. According to various instances, an optical system can include an optical system comprising various optical elements that are configured to generate and to direct light to a sensing volume (e.g., emission sources and/or an excitation optical system) as well as to direct and receive light from at least one sample in the sensing volume (e.g., a collection optical system). In the illumination system, light can be used as excitation light to cause fluorescence of at least one sample in the sensing volume, according to some implementations. In some examples, multiple beams of light can be projected onto the sensing volume, thereby supporting multi-spot detection. In the capture system, light that has been reflected and/or generated by the sample(s) in the sensing volume can be detected for further processing by a detection system. In some examples, light from multiple spots can be detected in order to analyze the sample(s) in the sensing volume.

In various implementations, the optical system may include at least one illumination source. In some cases, the optical system may include at least two illumination sources. The illumination source(s) may be narrow-band illumination source(s). Examples of narrow-band illumination source(s) include lasers, such as laser diodes and DPSS lasers. The beams may be comprised of electromagnetic radiation, such as visible light, Infrared (IR) light, Ultraviolet (UV) light, or electromagnetic radiation with some other frequency. In implementations in which multiple illumination sources are utilized, the illumination sources can provide multiple beams of excitation light onto a sensing area. The multiple illumination sources may, in some cases, enable multi-spot detection.

The optical system can include at least one lens (also referred to as a "lens element"). In some implementations, the optical system can include at least one concave lens. For example, the concave lens can have at least one concave face. In some cases, the concave lens can have one flat face. The concave lens can be spherical or aspherical, in various examples. According to various examples, the system can include at least one convex lens. At least one face of the convex lens may be convex and aspherical.

The optical system can include at least one fiber (also referred to as an "optical fiber"). In some cases, the fiber(s) can be coupled to (and receive light from and/or output light to) a fiber coupling. In some cases, the at least one lens may manipulate light originating from a sensing area or region (e.g., a flow chamber) onto a plane, which may be referred to as an "imaging plane." The fiber coupling and/or the at least one fiber may be substantially disposed at the imaging plane. Accordingly, the fiber(s) may be configured to receive, and to propagate, the resultant light from the lens(es) and/or to emit, and to propagate, light onto the lens(es). In various cases, light output by the lens(es) and through the fiber(s) is projected onto an image area of the imaging plane. In some cases, a core of a single fiber may contain the image area. That is, the image area may be projected into a core of the single fiber.

The optical system may include at least one spectral disperser. Various examples of spectral dispersers can include spectro units, motorized monochromators, diffraction gratings, gratings or the like. A spectral disperser may be, in some cases, a motorized monochromator configured to spectrally disperse light one wavelength at a time. In some examples, a spectral disperser may be a grating-based polychromator configured to spectrally disperse light multiple wavelengths at a time. In some cases, a spectral disperser may be housed by a disperser mount. In some cases, the disperser mount is configured to physically couple a spectral disperser to at least one fiber. For example, the fiber(s) may be coupled between the fiber coupling and the spectral disperser. A fiber may be configured to propagate light, such that the intensity of the light is substantially spatially uniform across the core of the optical fiber (e.g., dispersion within the fiber as the light travels down the fiber). For example, the intensity of the light may vary no more than ±10%, ±25%, or some other percentage.

According to some instances, the optical system may include at least one direction structure (also referred to as an "optical director") configured to direct at least one beam from at least one illumination source to a sensing volume (or sensing area) and/or at least one beam from the sensing volume to at least one sensor. The sensing volume may include, or otherwise hold, a sample of interest. For instance, the sensing volume may be part of a flow chamber. The direction structure can include at least one mirror, such as a dichroic mirror. In some cases, the direction structure can include an aspherical mirror, a spherical mirror, or both. The direction structure may direct the beam(s) from the illumination source(s) along at least one respective beam path. The direction structure may (optionally, along with a spectral disperser) direct the beam(s) to intersect a longitudinal axis (e.g., +Y in FIG. 38) of the sensing volume. In implementations in which multiple beams are directed by the direction structure, the direction structure may cause the multiple beams to intersect the longitudinal axis at respective spots that are spaced-apart from each other along the longitudinal axis. A direction structure may be configured to propagate a beam along its beam path, in various cases.

In some cases, the optical system may include at least one optical shifter (also referred to as a "shifter" or "X-Y shifter"). A single shifter may be disposed along a single path of a beam emitted from a single illumination source. The shifter may emit light to at least a portion of a direction structure, in some cases.

In various examples of multi-spot projection, multiple beams of light may be emitted onto a longitudinal axis of a sensing volume. The multiple beams may intersect the longitudinal axis at different spots or locations, which may be spaced apart from each other. The sensing volume may be part of a flow chamber, in some implementations. Samples flowing through the flow chamber, such as particles, may be hydrodynamically aligned with the longitudinal axis of the flow chamber. Accordingly, each one of the multiple beams of light may intersect with a flow path of a sample flowing through the sensing region.

Figure 39:
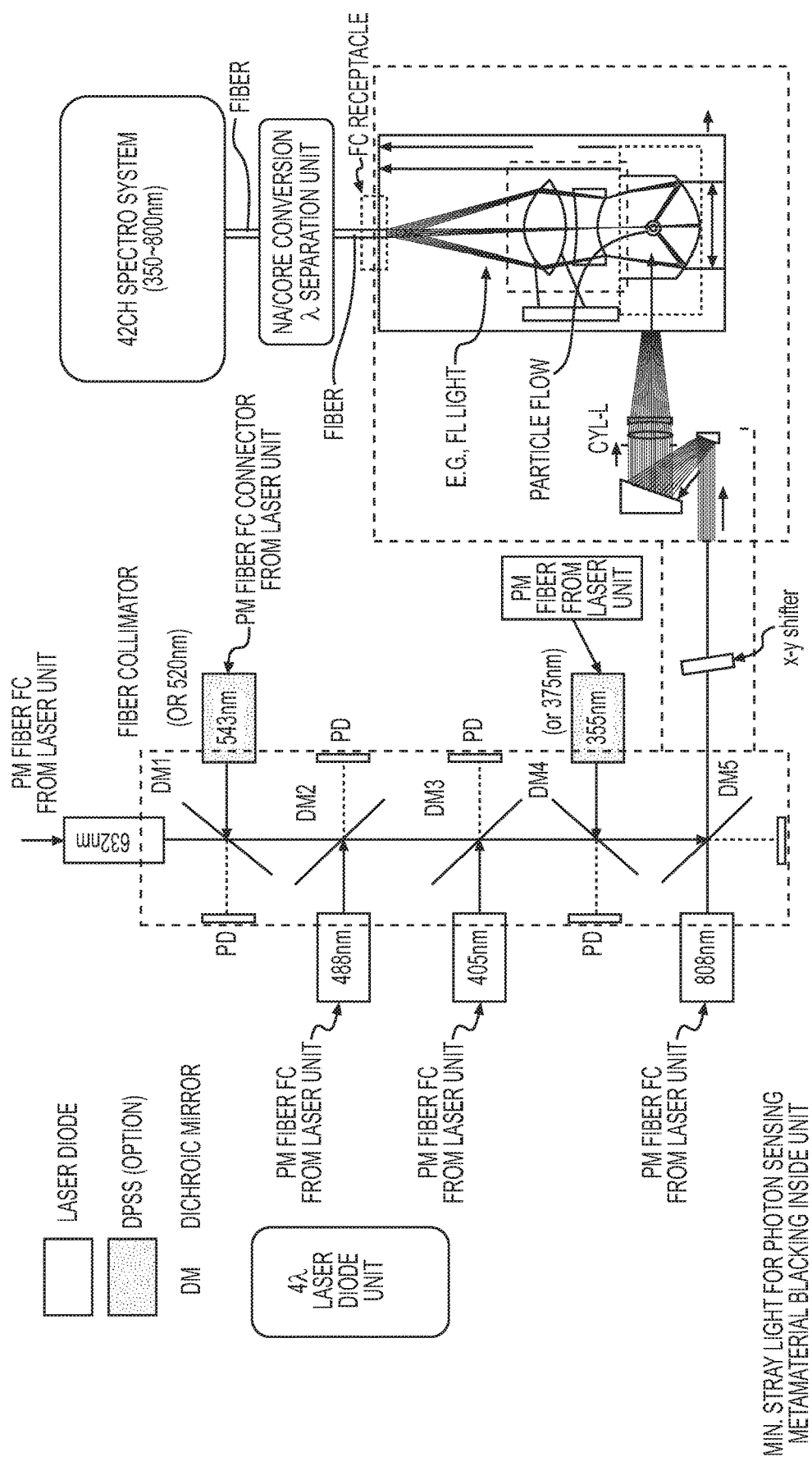
FIG. 39 illustrates an example optical system with multiple illumination sources.

FIG. 39 illustrates an example optical system with multiple illumination sources. As illustrated, multiple illumination sources (e.g., lasers) can emit respective beams of excitation light. The illumination sources can include at least one laser diode or DPSS laser. In some cases, the beams emitted by the illumination sources have different wavelengths. In a particular implementation, the illumination sources can emit beams of light having wavelengths of 355 nm, 405 nm, 488 nm, 543 nm, 632 nm, and 808 nm, although implementations are not limited to those wavelengths of light. The beams of excitation light can be directed using multiple dichroic mirrors, as well as an x-y shifter (which can enable fine alignment of spots at which the beams of excitation light intersect a longitudinal axis of a sensing volume of a flow channel). In some cases, the dichroic mirrors and/or x-y shifter can collectively comprise a structure arranged to direct the respective beams from each of the illumination sources along respective beam paths. The optical system may be configured to direct the beams of excitation light onto a longitudinal axis of the sensing volume at different positions, which may be spaced apart or may otherwise not overlap. In various implementations, each of the beams of excitation light may intersect a flow path of a sample moving through the sensing volume.

Figure 40:
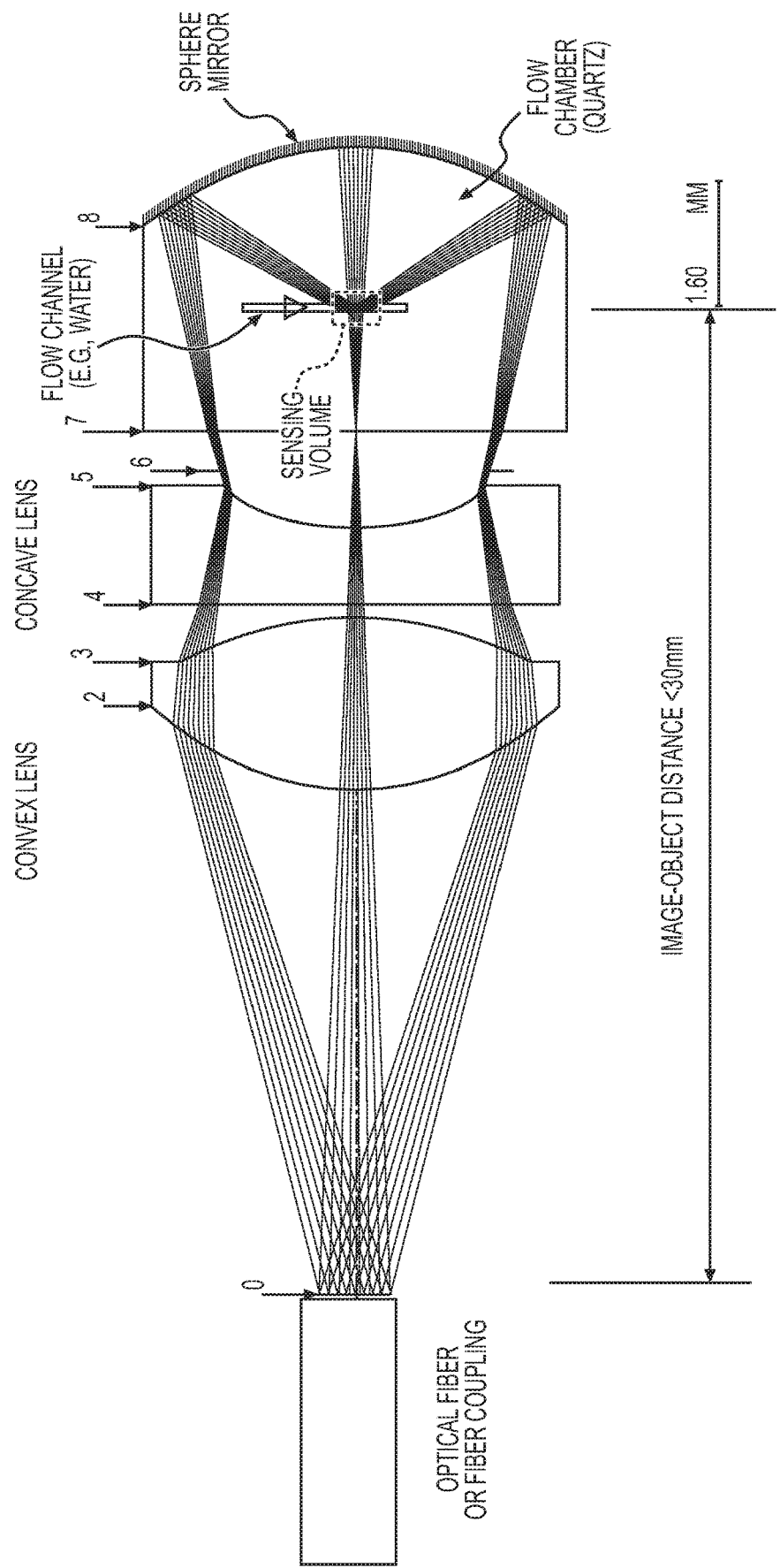
FIG. 40 illustrates an example of at least a portion of an optical system used to capture light from a sensing volume.

FIG. 40 illustrates an example of at least a portion of an optical system used to capture light from a sensing volume. In various implementations, a sensing volume may emit light to be captured. In some cases, a sample (which may be flowing through the sensing volume) may emit the light to be captured. In some cases, the sensing volume may be part of a flow system including a flow chamber, which may at least partially comprise a solid, transparent material (e.g., glass, quartz, or the like) encasing a flow channel comprising a transparent fluid (e.g., water). The light may be emitted onto a direction structure, such as a sphere mirror, which may direct the light onto at least two lenses arranged in series. In the example illustrated in FIG. 40, the light may enter a concave face of a concave lens, be emitted from the concave lens to a convex lens, and be emitted from the convex lens to an optical fiber and/or fiber coupling structure.

In various implementations, the flow chamber and the lenses can be integrated, which may increase collection efficiency of the light emitted from the sensing volume by the optical fiber. In some examples, the optical system can include catadioptric immersion optics, which can be integrated with the flow chamber. For example, the flow chamber may include at least one mirror that can direct light emitted from the sensing volume. In some instances, the optical system (including the flow chamber) used to direct light emitted from the sensing volume can have a numerical aperture (NA)>1.0 and a Magnification (M)<4, 5, 6, or some other magnification. For instance, the optical system may capture light from the sensing volume with an M<6 and an NA<1.25. By integrating the flow chamber and the rest of the collection optics into a single connected structure, in various cases, the fiber may be stably aligned with a sample flow in the sensing volume. According to some examples, the optical system used to direct the light emitted from the sensing volume may support a detection system with a relatively wide spectral range (e.g., 350 to 800 nanometers). The capturing system may be relatively compact and have high efficiency coupling to a single fiber, in some examples. In various cases, refractive and reflective optics may be enabled by a flow immersion lens and/or a flow immersion mirror.

The example illustrated in FIG. 40 can enable a design target of ⅓ collection of emitted light from a sensing region. In some particular examples, the convex lens may include glass with a NIKON optical glass code of "NIG4786," the concave lens may include glass with a NIKON optical glass code of "NIGS5742," the flow chamber can include quartz, and the carrier fluid carrying water. In an experimental example, a collection efficiency of 33% was achieved using these materials at a maximum angle degree of 70 degrees. In the experimental example, a maximum distance between the mirror incorporated into the flow chamber and the imaging plane was 14.62 mm. An object-image distance (e.g., a distance between the sample and the image plane) of less than 30 mm was achieved. Accordingly, various implementations of the present disclosure can correspond to an optical system with a relatively small size.

Figure 41A:
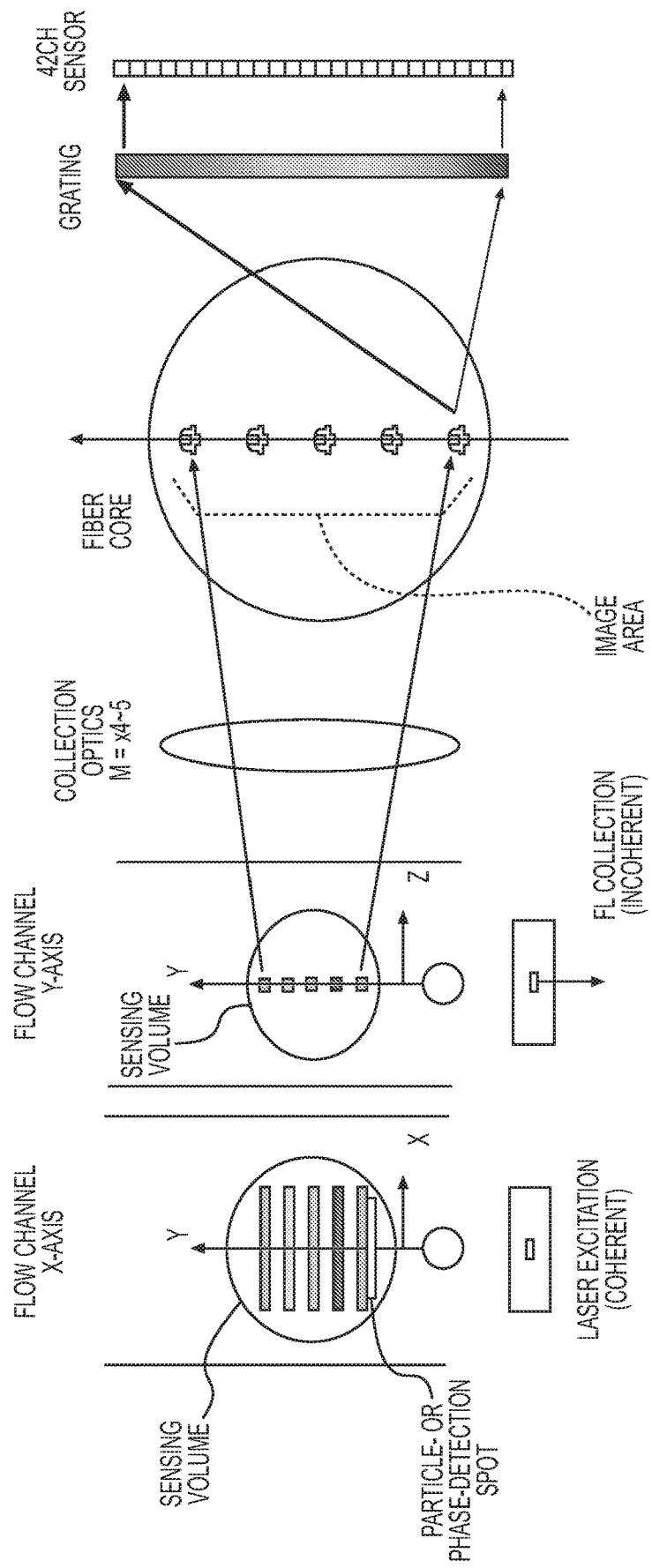
FIG. 41A illustrates an example of collection optics utilized by various implementations of the present disclosure.

FIG. 41A illustrates an example of collection optics utilized by various implementations of the present disclosure. In the example illustrated in FIG. 41A, a sample may flow through a flow chamber in a Y direction, such that the flow path of the sample may extend in the Y direction. An optical system may emit multiple beams of excitation light onto the flow path of the sample. Accordingly, the sample may be consecutively illuminated by the multiple beams of excitation light as the sample flows through the flow chamber.

Once the sample encounters each beam of excitation light, the sample may emit light that can be collected by a collection optical system. The collection optical system may include collection optics, which may manipulate the emitted light for further processing. Although the excitation light may be coherent, the light emitted from the sample may be incoherent. The light emitted by the sample may be magnified using collection optics (e.g., at least one mirror and/or at least one lens). For instance, the collection optics may have an M=4 to 5.

The collection optics may emit the magnified light into a core of a fiber, such as a single fiber. Thus, the fiber core may receive multiple light patterns emitted by the particle due to encounters with the multiple excitation beams. For example, if five excitation beams are used to illuminate the particle along the particle's path, five patterns may be provided onto the core of the fiber, which may respectively correspond to the five excitation beams. Each pattern may be associated with a spectral disperser, such as a grating. Each grating may receive and manipulate a pattern from the fiber core. The manipulated pattern may be emitted from the grating onto a sensor array (e.g., a 42 channel sensor array). In various implementations, a single sensor array may correspond to a single excitation beam. Accordingly, in some implementations of multi-spot detection, multiple sensor arrays can be utilized to sense light emitted from samples excited by multiple excitation beams.

Figure 41B:
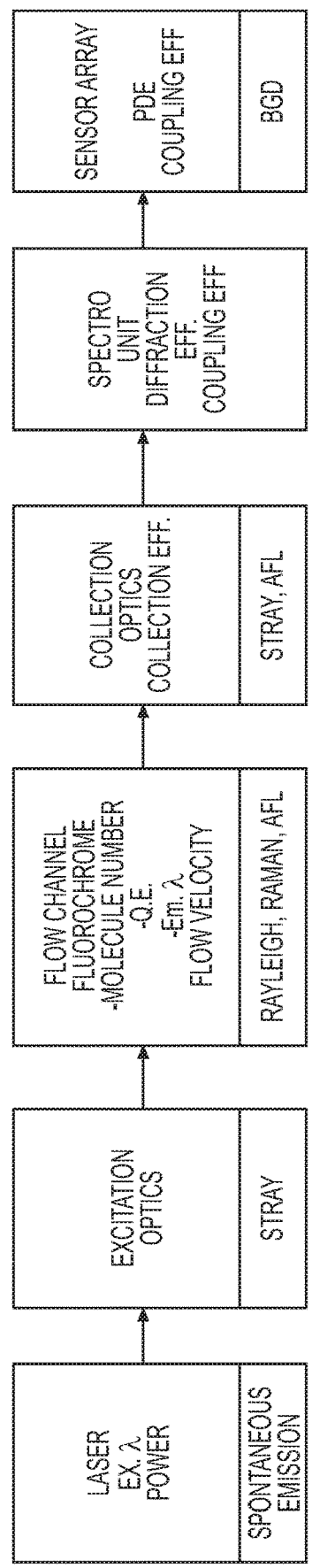
FIG. 41B is a diagram illustrating an example flow of light through an optical system. Excitation light can be emitted by one or more lasers, manipulated by excitation optics, and projected into a flow channel.

FIG. 41B is a diagram illustrating an example flow of light through an optical system. Excitation light can be emitted by one or more lasers, manipulated by excitation optics, and projected into a flow channel. Collection optics may receive light from the flow channel, a spectro unit (e.g., a spectral disperser) can manipulate the light from the collection optics, and the light can be projected onto a sensor array for further processing.

Figure 42:
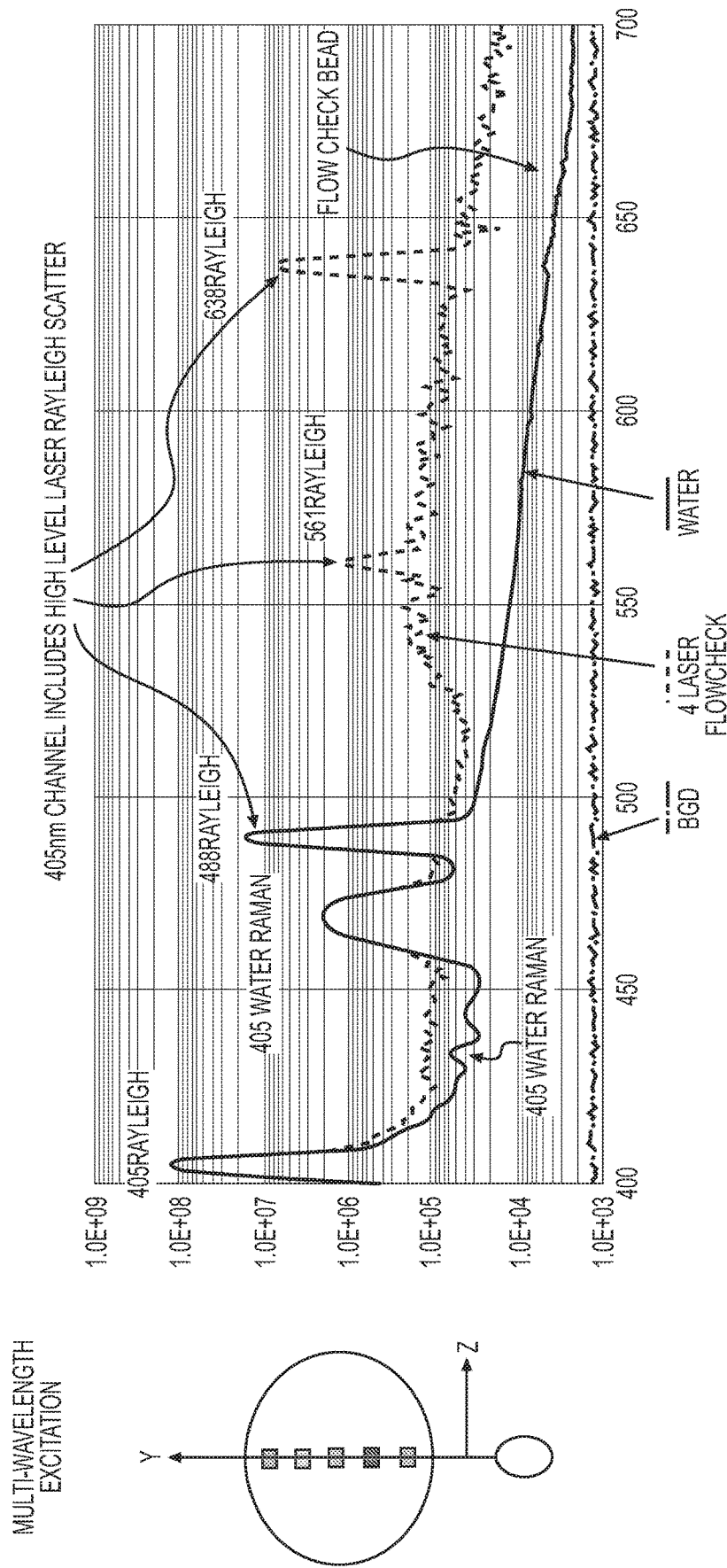
FIG. 42 illustrates an example of Raman and Rayleigh scatter from light collected from an optical system using multiple emission sources at different wavelengths.

FIG. 42 illustrates an example of Raman and Rayleigh scatter from light collected from an optical system using multiple emission sources at different wavelengths. As illustrated, a 405 nm emission source can correspond to high level laser Rayleigh scatter, according to some implementations. However, a system using excitation beams of 405 nm, 488 nm, 561 nm, and 638 nm can be used to successfully perform multi-spot detection samples in an example flow chamber.

Figure 43:
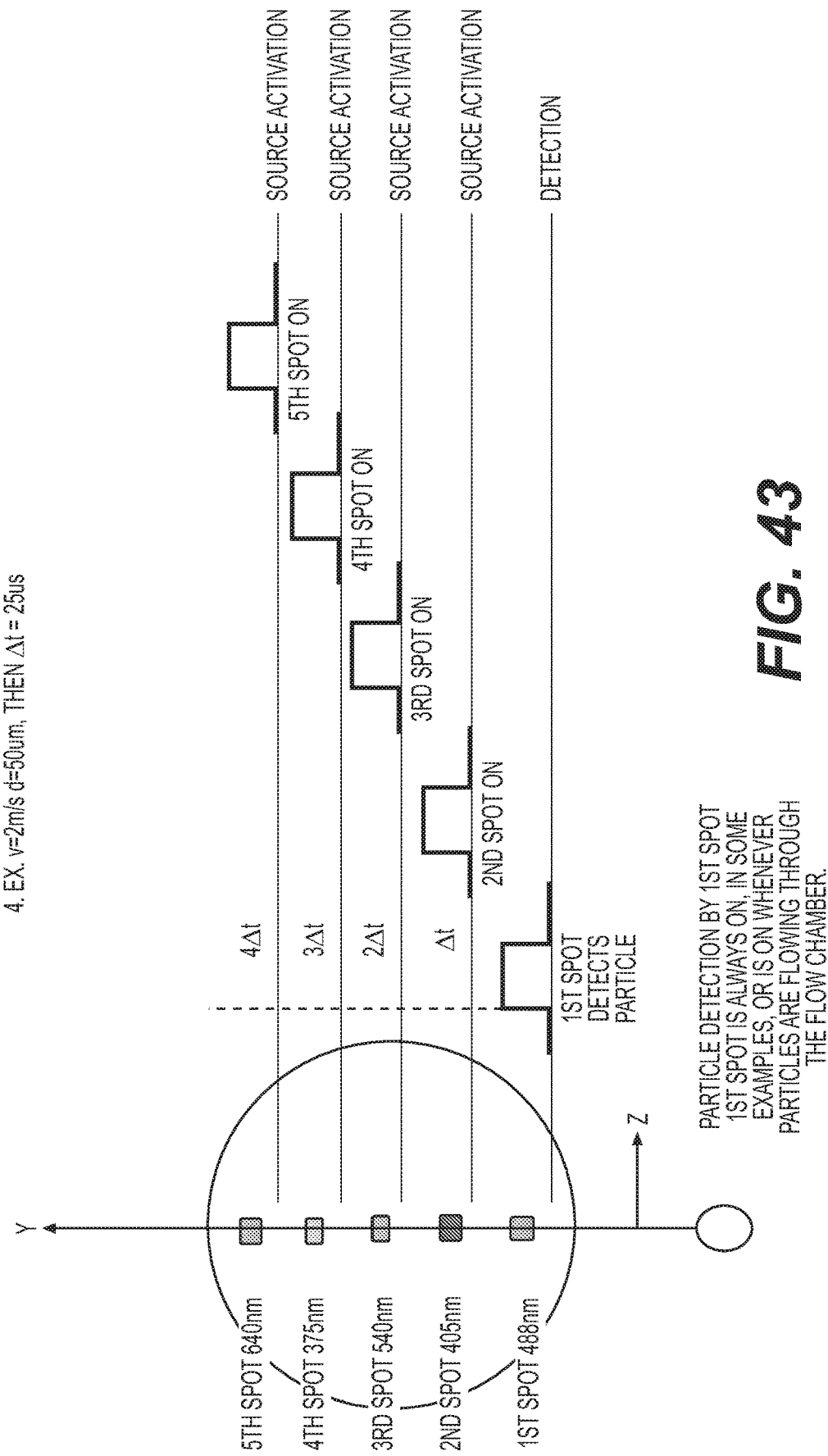
FIG. 43 illustrates an example of excitation timing for five emission sources in an example system.

FIG. 43 illustrates an example of excitation timing for five emission sources in an example system. A sample may flow through a flow chamber at a flow velocity of v. A distance between adjacent spots produced by the emission sources may be d. Both v and d may be known based on the design of the flow system and/or the excitation optical system. Accordingly, when the sample is detected as it traverses a first spot, the second spot immediately downstream of the first spot may be activated at a time period=d/v after the sample is detected at the first spot. Thus, the time period may be substantially predetermined. A controller system may activate the emission sources using this timing mechanism.

Example(s) 6: Detection Systems, Methods, and Devices

Various implementations of the present disclosure include detection systems, methods, and devices for detecting light emitted from samples to be analyzed. According to some cases, various optical systems can be used to input light signals onto one or more elements that can sense the light signals. Various example detection systems can convert the light signals into electrical signals that can be used to calculate an amount of photons emitted from the samples. For instance, example detection systems may include one or more sensors (e.g., sensor elements), a sensor array, and/or various circuits (e.g., a differential output circuit, normal output circuit, and/or bias control circuit). In some implementations, single-photon-sensing can be achieved using various detection systems described herein.

An example detection system may include one or more sensor elements. Implementations of sensor elements (also referred to as "sensors" or "optical sensors") are described above. In various implementations, multiple sensor elements can be arranged into a sensor array. FIG. 41A, for example, illustrates an example of a sensor array utilized to receive light emitted from a sample upon being excited by a single excitation beam. In various implementations of multi-spot detection, an example detection system can utilize multiple sensor arrays to capture light emitted by the sample upon being excited by multiple excitation beams, respectively.

A detection system may include one or more photodiodes (PDs). In some cases, a PD can be part of at least one sensor element. In some cases, a PD can include a single PD and/or an array of Si avalanche PDs that are connected to a single electrical node. In some cases, the example detection system can include one or more quench resistors.

The detection system may include at least one differentiator. Examples of differentiators (also referred to as "differentiating elements") or the like, are described above. In various implementations, a differentiating element may include at least one circuit element that serves as a high-pass electrical filter, such as a capacitor.

The detection system can include at least one amplifier. Examples of amplifiers utilized in implementations described the present disclosure include various buffers, high pass sections, preamps, transimpedance amplifiers (TIA), a preamp, or the like. In some examples, a differentiator may be fed by a preamp. The preamp may be connected between one or more quench resistors and the differentiator. In some examples, the preamp may be a high-speed preamp. In various implementations, at least some of an induced photo electron charge is generated at a PD and fed through a differentiator and/or an amplifier. The differentiator and/or amplifier may be configured such that no more than 10% of the photo electron charge is absorbed by the differentiator. The detection system may include a low-pass filter. In some cases, the detection system may include at least one readout electrode. Readout electrodes can comprise any circuit element and/or connection between circuit elements described herein.

In some cases, the detection system may include at least one drive circuit. In various implementations, a drive circuit may be configured to operate one or more sensor elements in a Geiger mode (also referred to as a "photon counting-mode"). The detection system may include at least one photocurrent detector.

Figure 44:
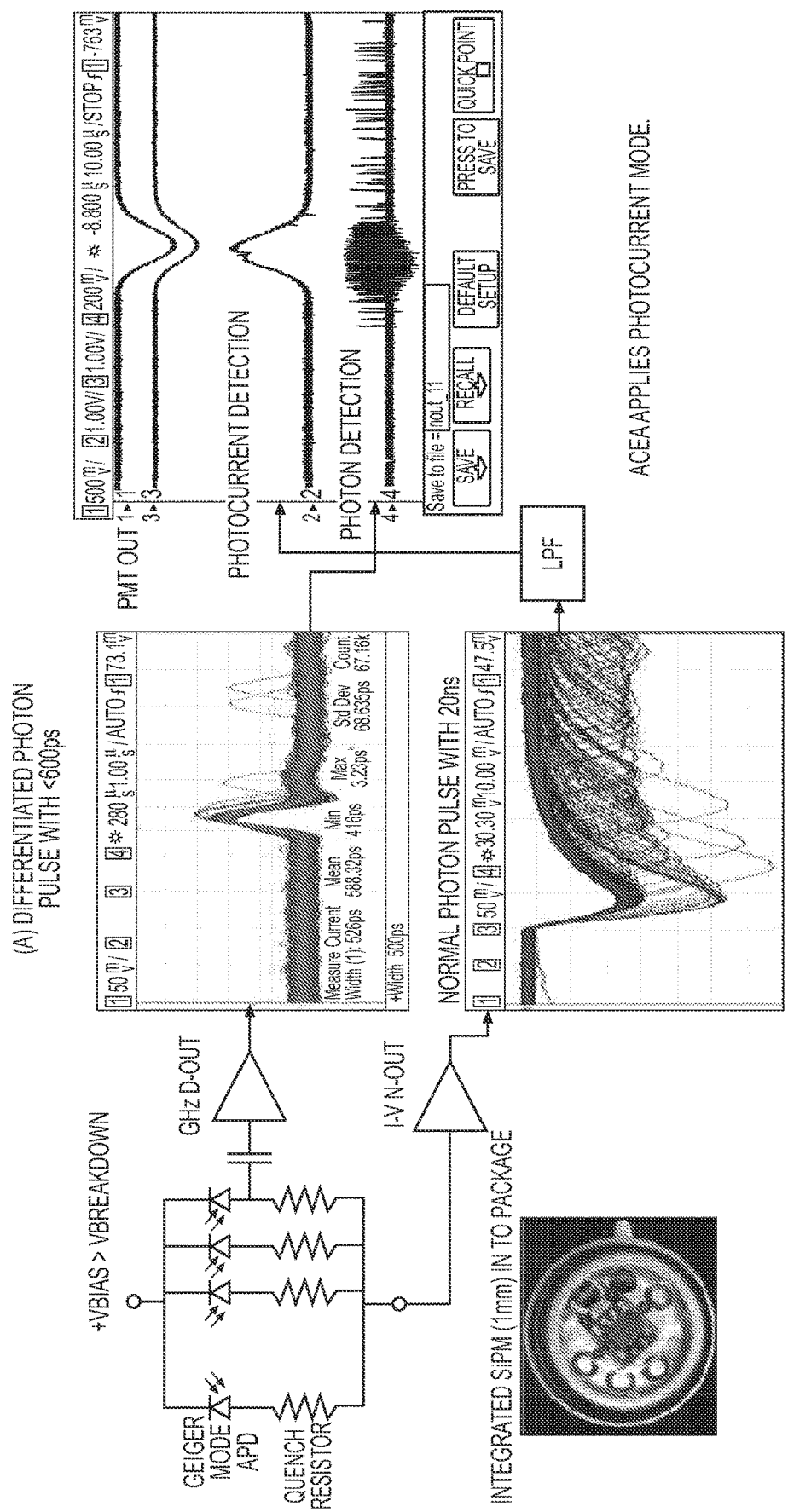
FIG. 44 illustrates an example of a detection system that can perform simultaneous and/or concurrent detection of photocurrents and photon streams emitted by one or more samples being analyzed.

FIGS. 44 to 54 illustrate various examples related to detection systems, as disclosed herein. FIG. 44 illustrates an example of a detection system that can perform simultaneous and/or concurrent detection of photocurrents and photon streams emitted by one or more samples being analyzed. The detection system may include a sensor array, differential output circuit, and a normal output circuit. The detection system may include an array of sensor elements. Each sensor element may include a PD and a quench resistor. The sensor elements may be connected to each other in parallel. For instance, the sensor elements may be each connected to at least one common electrical node. A drive circuit may impose a bias voltage across each one of the sensor elements. The bias voltage may be greater than a breakdown voltage of the PDs in the sensor elements. Accordingly, the PDs in the sensor elements may be operating in Geiger mode.

The detection system may include at least two types of outputs: a "normal output" and a "differential output." The normal output may correspond to a normal output circuit connected between the array of sensor elements and ground. In the example illustrated in FIG. 44, a resistor may be connected between the ground and the normal output circuit. In various implementations, the normal output circuit can receive a single signal representing outputs of all of the sensor elements in the sensor array. The normal output circuit can include at least one low pass filter. In some cases, the normal output circuit can include an inverter connected, in series, to the low pass filter. The normal output circuit may, in various implementations, output an electrical signal (e.g., a current and/or voltage) that correlates to a total photocurrent of all light received by the sensor elements in the sensor array.

In various implementations, each sensor element may be connected to a respective differential output circuit. An example differential output circuit may include a differentiating element. In the example illustrated in FIG. 44, the differentiating element may be a capacitor. In some cases, the differential output circuit may include an inverter connected, in series, to the differentiating element. Unlike the normal output circuit, the differential output circuit may selectively output an electrical signal (e.g., a current and/or a voltage) that correlates to a single light signal received by a single PD associated with the differential output circuit. This electrical signal can be referred to as a "photon pulse" or "photon burst," and can be detected using a controller system, in some cases. In some implementations disclosed herein, the differential output can output a detectable signal for a single photon received by a single PD in a single sensor element.

Using both the normal output and differential outputs, simultaneous and/or concurrent detection of light from a sensing volume can be performed. In some examples, photocurrent (e.g., from the normal output) and photon signals (e.g., from the differential outputs) can be detected simultaneously using Geiger-mode detection. Using various signal processing mechanisms described herein, light received by individual sensing elements can be detected with high speed and high sensitivity, thereby enabling accurate single-photon detection.

In some examples, the induced photo electron charge output by a photodiode is divided: 10% to the differential amp; >90% normal output. In other examples, the charge is divided in different ways. In some examples, a capacitor (differentiating element) in each pixel is co-designed with a capacitor (differentiating element) fed by the common electrode so that 2-3% of the charge of an avalanche pulse will be absorbed by the per-pixel capacitor. This can permit detecting photon pulses while still maintaining dynamic range of the system and narrow pulse widths.

Figure 45:
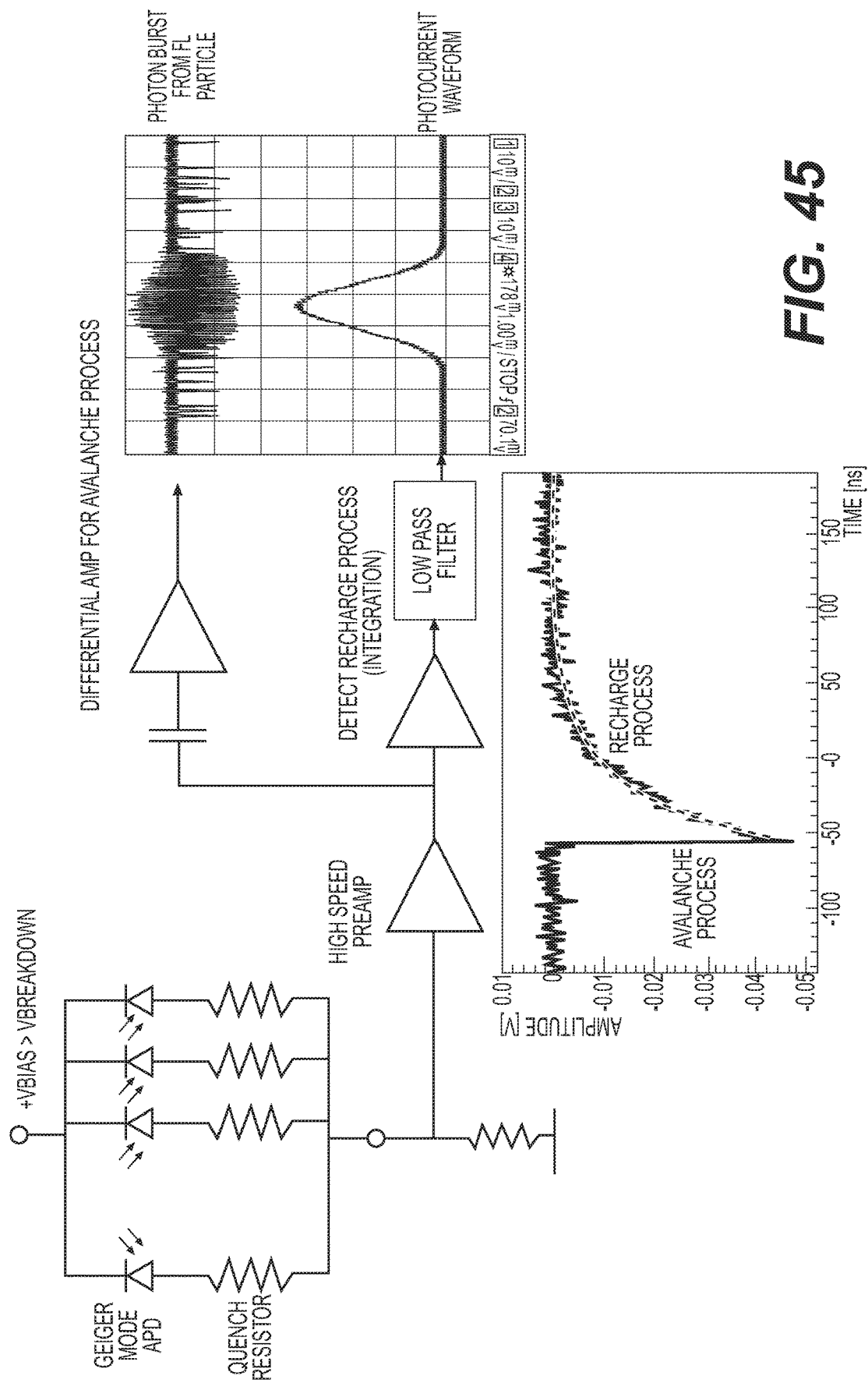
FIG. 45 illustrates an example of a normal output circuit.

FIG. 45 illustrates an example of a normal output circuit. The example illustrated in FIG. 45 differs by the introduction of a high-speed preamplifier (also referred to as a "preamp") that is connected, in series, between the sensor array and the inverter. In addition, the example illustrated in FIG. 45 includes a differential amplifier, which may include a differentiating element (e.g., a capacitor, a high-pass filter, or the like) connected in series to another inverter. Each one of the differential amplifier and the first inverter may be connected to an output of the high-speed preamp. In various implementations, an output of the differentiating element utilized in the normal output circuit can be compared to the output of the low pass filter in the normal output circuit, using various signal processing techniques. By analyzing both signals (using, e.g., signal processing by a processor or other controller system), the sensitivity of detecting the photocurrent by the normal output circuit can be enhanced.

Figure 46:
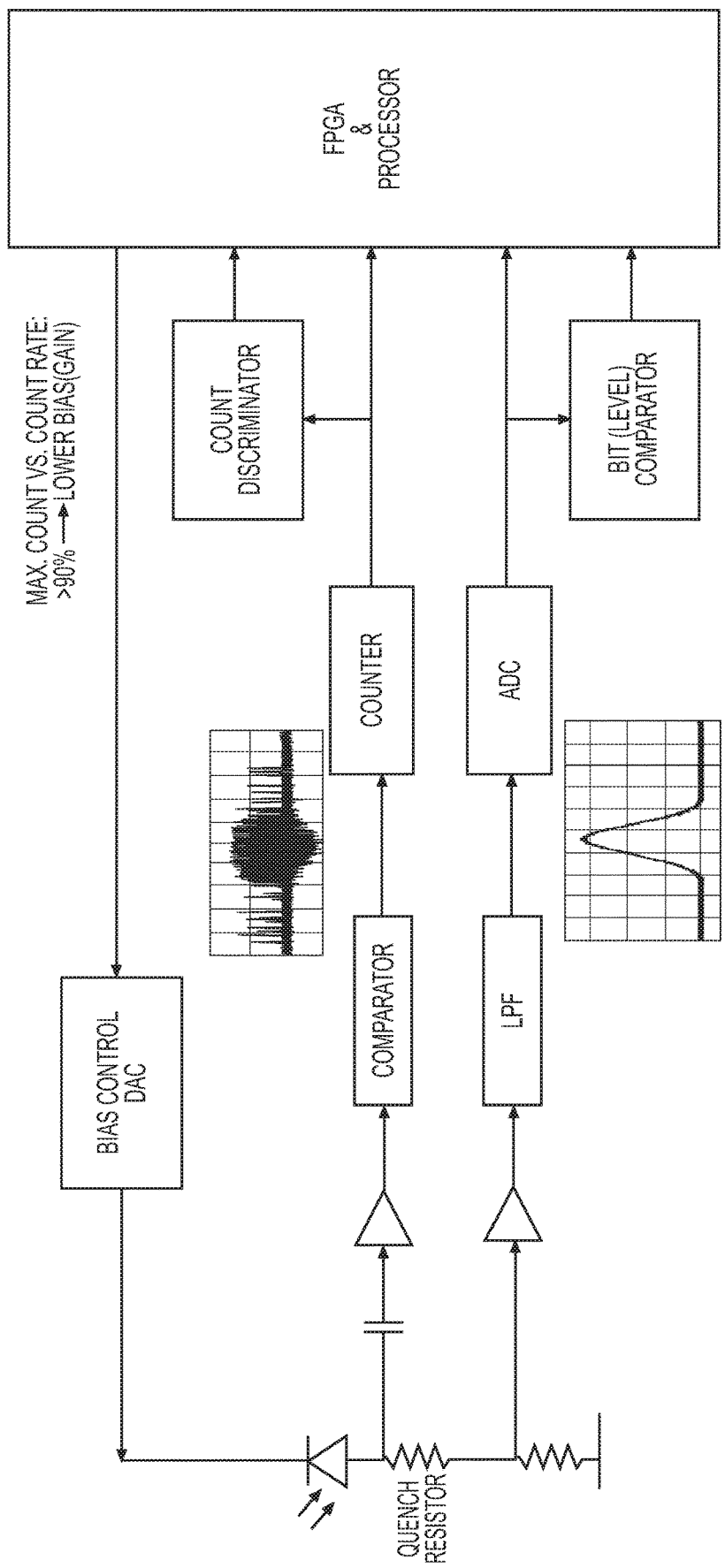
FIG. 46 illustrates an example of at least a portion of a detection system that can effectively perform bias control for saturation and sensitivity.

FIG. 46 illustrates an example of at least a portion of a detection system that can effectively perform bias control for saturation and sensitivity. For example, FIG. 46 can represent a bias control circuit. Although FIG. 46 illustrates an example of a detection system including a single sensing element with a single PD, one having ordinary skill in the art would recognize how to adapt the bias control elements of FIG. 46 to a sensor array including multiple differentiating circuits and multiple sensing elements. In various implementations, the circuit elements for performing bias control may be at least a portion of a drive circuit.

In various elements, an output of a differentiating circuit can be fed into a comparator. An output of the comparator can be output into a counter. In various implementations, the output of the counter can be directly input into an FPGA and/or processor. In addition, the output of the counter can be fed into a count discriminator. An output of the count discriminator may also be input into the FPGA and/or the processor for further analysis.

In addition, an output of a low pass filter of a normal circuit can be input into an analog to digital converter. The output of the analog to digital converter may be fed into the FPGA and/or the processor. In addition, the output of the analog to digital converter may be input into a bit (level) comparator. An output of the bit comparator may be further input into the FPGA and/or processor.

Based at least in part on the output of the counter, the count discriminator, the analog to digital converter, and the bit comparator, the FPGA and/or processor may output a signal to a bias control digital to analog converter, which may output and/or adjust the bias voltage applied to the sensing element (and, in some examples, multiple sensing elements in an array). For example, if a count rate of the photons is greater than a threshold percentage (e.g., 90%) of a maximum count rate, then a lower bias voltage may be applied to the sensing element. In some cases, if the peak level of photocurrent is greater than a threshold percentage (e.g., 90%) of the full range of the analog to digital converter, then a lower bias voltage may be applied to the sensing element. Further, in some implementations, if the peak level of photocurrent is less than a threshold percentage (e.g., 10%) of the full range of the analog to digital converter, than a higher bias voltage may be applied to the sensing element. Accordingly, the bias voltage may be controlled in order to prevent saturation and to improve sensitivity of the detection system.

FIGS. 47A to 47C illustrates example systems that can be used to perform phase differential particle detection and/or to sense spot positioning. In various implementations described herein, an emission source may emit a beam that can be used to excite a sample in a sensing region, and the sample may output a light signal in response to receiving the excitation beam. In addition, a pass-through (e.g., on-axis) laser scatter can be utilized to perform phase differential detection. Using various methods, a single particle can be detected with high speed and higher sensitivity than implementations in which the light signal emitted from the sample is sensed without the pass-through laser scatter. Further, the positions of spots produced by the emission sources can be monitored.

FIG. 47A illustrates a general overview of optics utilized in differential particle detection. As illustrated, an illumination source can illuminate a sample in an X direction (e.g., from left to right in FIG. 47A). The sample may be flowing through a flow chamber in a Y direction (e.g., out of the page in FIG. 47A). In various implementations, at least two detection systems can be used to sense the sample flowing through the flow chamber. A first detection system can receive side-scatter light emitted from the sample in a Z direction (e.g., an upward direction in FIG. 47A). The first detection system may perform spectral signature and SSC detection of the sample. A second detection system may receive pass-through light from the illumination source and the light emitted from the sample in the X direction. In some implementations, the second detection system may perform FSC and phase differential detection. For instance, the second detection system can identify the positions of the spots. Using outputs from both the first detection system and the second detection system, the sample can be detected with relatively high speed and sensitivity.

FIG. 47B illustrates an example of a multi-split PD that can be utilized in differential particle detection. Split photodetectors, such as the example illustrated in FIG. 47B, can be placed in the path of illumination from an illumination source. A flow chamber may be placed in the path between the illumination source and the split photodetector. Accordingly, when a sample passes through the illumination source, the split photodetector can sense the position and/or the movement of the sample by monitoring the change in light received by the split photodetector from the illumination source. The change in illumination light sensed by the split photodetector can be indicated to a controller, which may be used to time activation of another illumination source in the system. Accordingly, multiple illumination sources can be efficiently and consecutively activated to illuminate a sample flowing through the flow chamber.

The example in FIG. 47B illustrates a four-split PD, but in some cases, other numbers of splits can be utilized. The four-split PD can include four separate PDs (A, B, C, and D) arranged in a matrix form. The outputs of the four separate PDs can be integrated (e.g., amplified) into a single output signal. For instance, the single output signal can be the difference between a sum of the outputs of PD A and PD B and a sum of the outputs of PD C and PD D (e.g., to monitor a position of the sample emitting light that is captured and/or blocked from the multi-split PD). In some cases, the single output signal can be the sum of the outputs of PD A, PD B, PD C, and PD D (e.g., to monitor a power of the light emitted from the sample and/or blocked from the multi-split PD). In some implementations, the flow direction of the sample (e.g., a particle) may be parallel to a direction pointing from PD C to PD A and/or from PD D to PD B. In various implementations, when the multi-split PD is utilized as a single PD in a circuit used to detect the position of the sample in a flow chamber, the sensitivity and speed of the detection circuit can be enhanced.

FIG. 47C illustrates an example circuit for combining the signals output by multiple photodiodes in a multi-split diode. As illustrated, an output of PD A can be connected, in series, to a first inverter. An output of PD B can be connected, in series, to a second inverter. The output of the first inverter and the output of the second inverter may be input into an op amp. The output of the op amp may be used as a combination of the outputs of PD A and PD B. In some cases, the op amp may be part of a circuit that subtracts the output of PD B from the output of PD A, which may be used to identify a spot.

In some examples, to detect push-pull or other positioning signals (e.g., phase differential signals), one wavelength spot is used (e.g., 488 nm or 808 nm). Accordingly, a single detector can be used, placed in the beam path of the illumination at that wavelength. This reduces the need for multiple sensors, while still permitting accurate position measurement. Power can also be measured on only a single illumination source's output.

Figure 48:
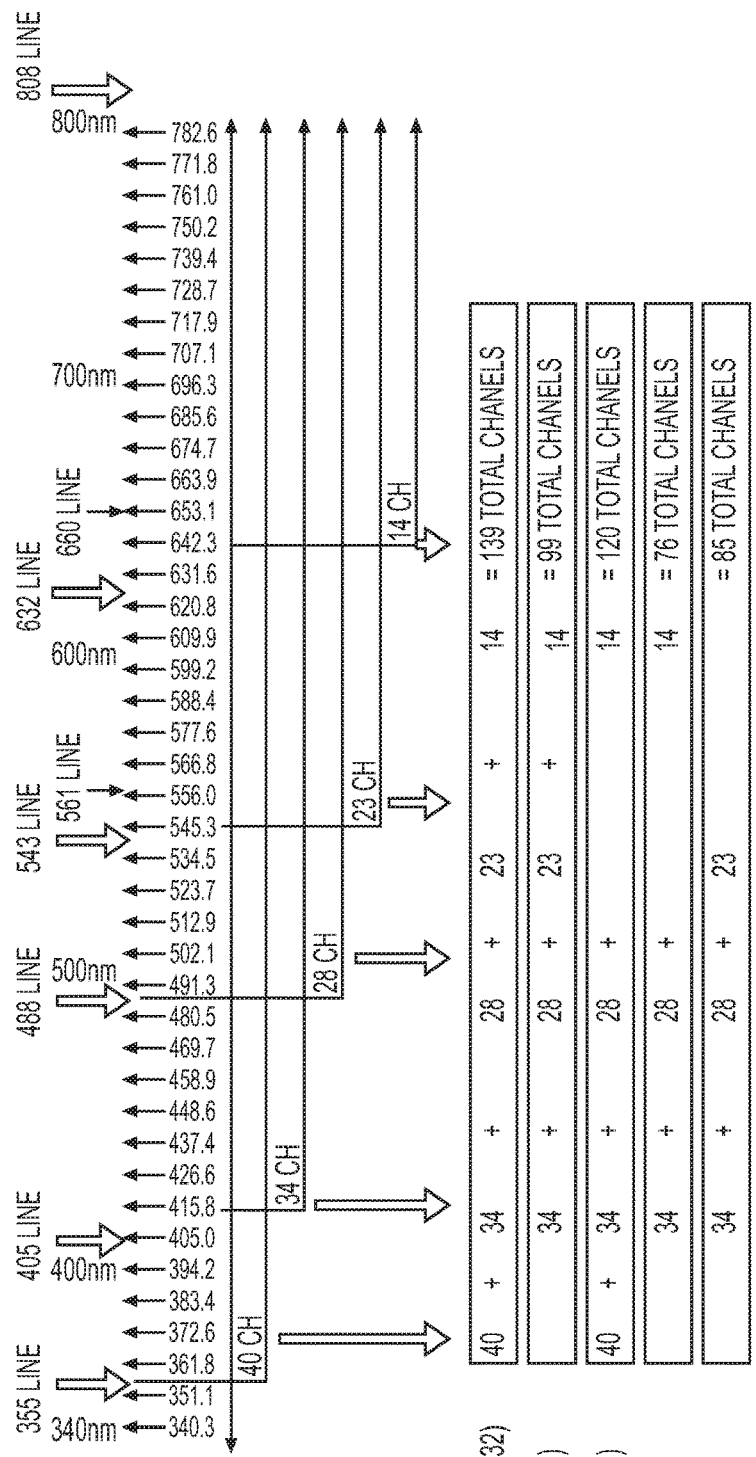
FIG. 48 illustrates an example spectral signature using various numbers of emission sources.

FIG. 48 illustrates an example spectral signature using various numbers of emission sources. The emission sources may produce light beams in wavelengths that range from 355 nm to 808 nm, in some cases. In some cases, five lasers may be used, emitting light in wavelengths of 488, 355, 405, 543, and 632. In some cases, a 375 nm laser diode is used instead of a 355 nm source. In some examples, a 520 nm laser diode is used instead of a 543 nm source.

Figure 49:
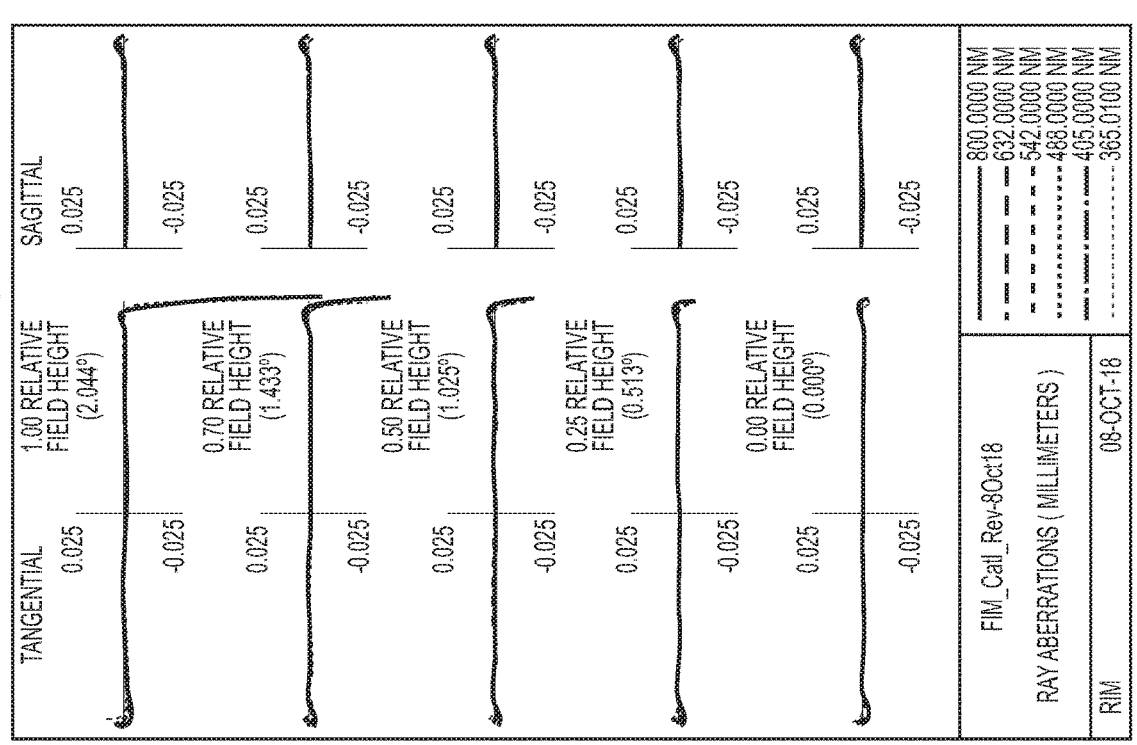
FIG. 49 illustrates an example of FIM performance using 800 nm wavelengths.
Figure 49:
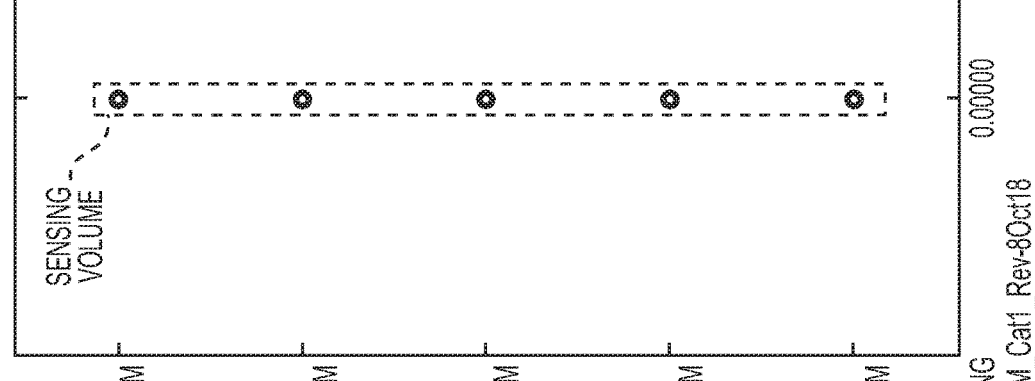
Figure 49:
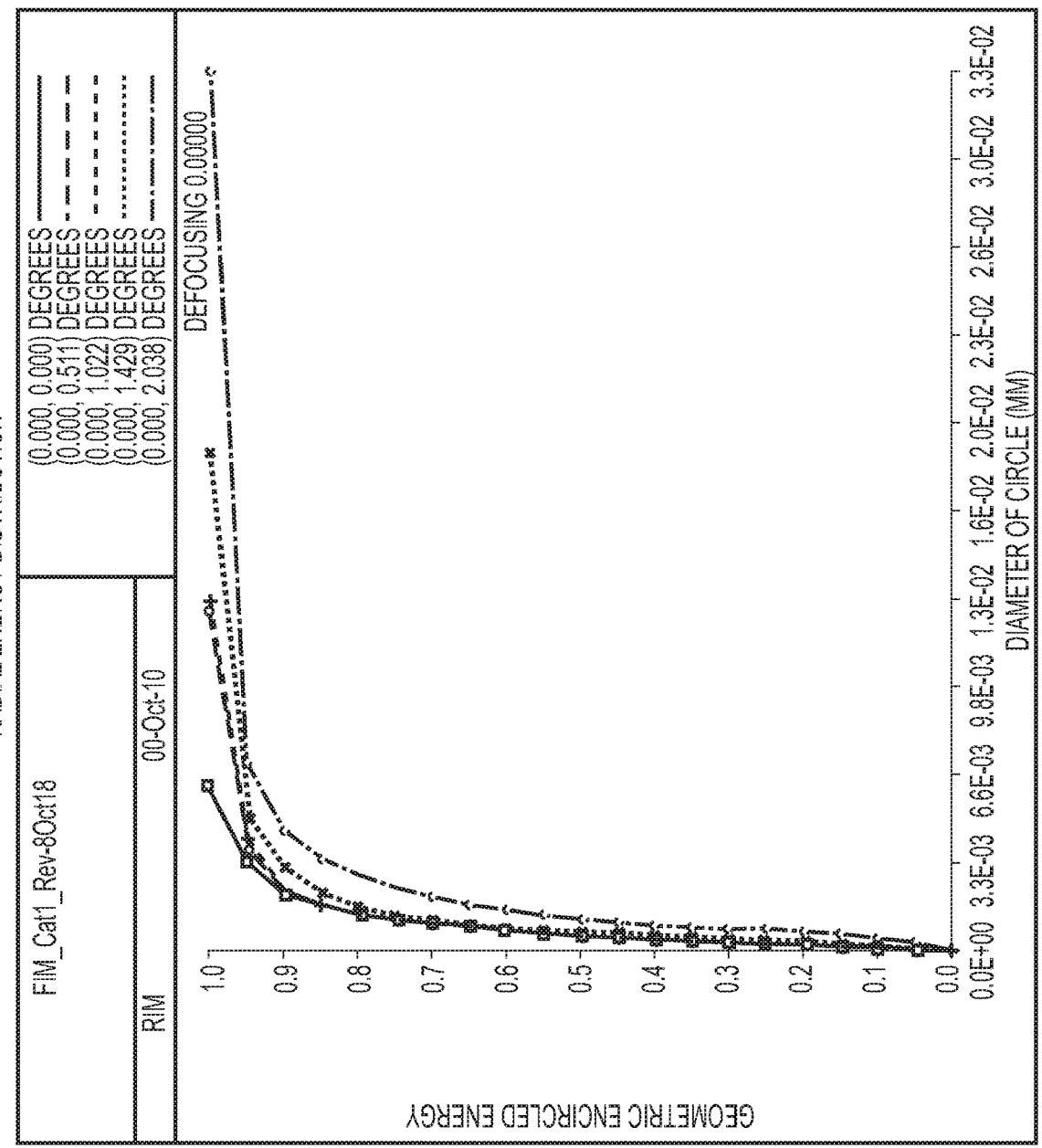

FIG. 49 illustrates an example of FIM performance using 800 nm wavelengths. As illustrated, illumination sources can generate excitation beams at different wavelengths, up to 800 nm in some cases. The excitation beams may intersect with a sensing area at various spots. When multiple illumination sources are used, multiple spots produced by the excitation beams can be spaced apart along a longitudinal axis. The longitudinal axis may be parallel to a flow direction and/or a path of a sample through a sensing region (e.g., a region of a flow chamber).

Figure 50:
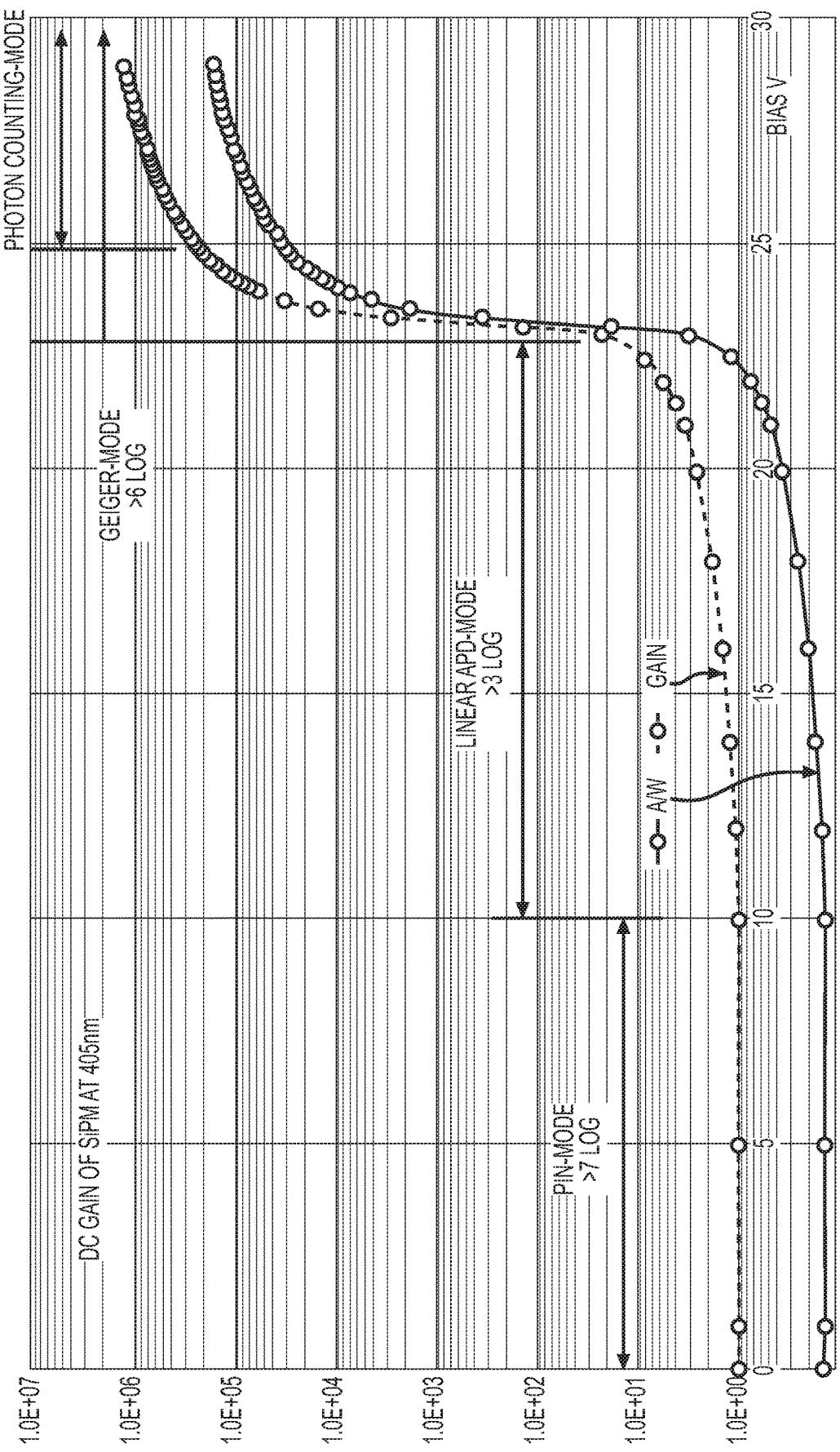
FIG. 50 illustrates an example of a wide dynamic range achievable using linear mode and/or Geiger mode in an implementation of a detection system.

FIG. 50 illustrates an example of a wide dynamic range achievable using linear mode and/or Geiger mode in an implementation of a detection system. A sensor array (e.g., including multiple PDs) can be switched from linear mode (e.g., non-Geiger mode) to Geiger mode by manipulating a bias voltage of the detection system. In some cases, the bias voltage can be changed via a bias control circuit based on incident power level of the sensor array. As illustrated in FIG. 50, the linear mode can be used to expand detection dynamic range over 16 decades. Because both Geiger mode and linear mode are sensitive to temperature, noise and stability of the detection system can be enhanced by cooling the sensor array. In various implementations, a sensor array can be switched between Geiger mode and linear mode in less than a microsecond.

Figure 51:
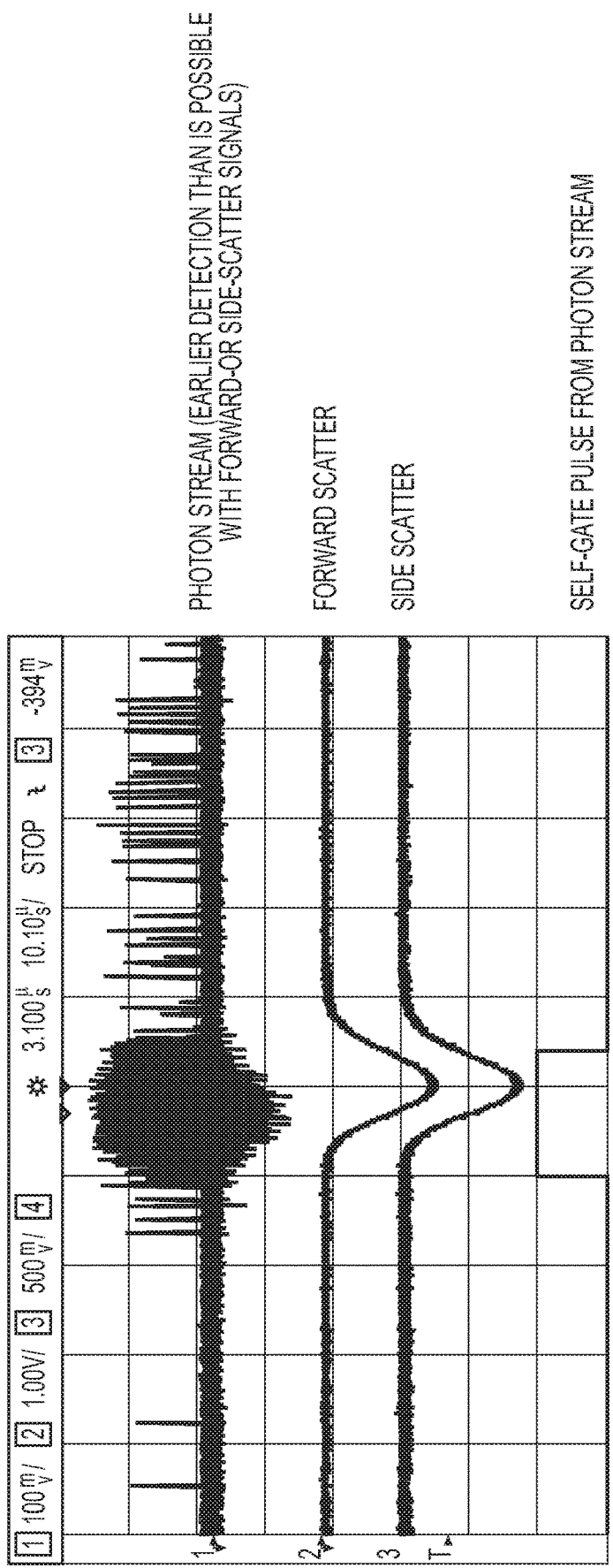
FIG. 51 illustrates an example of self-gating that can be performed by a detection system.

FIG. 51 illustrates an example of self-gating that can be performed by a detection system. In various implementations, detected background signals can be distinguished from signals emitted from the sample based on inter-photon intervals. Accordingly, the detection system can generate real-time gating signals corresponding to the sample pulse profile. In various implementations, individual fluorescence signals can be self-gated according to the self-gate signal generated by the photon stream, rather than an FSC and/or SSC. The fluorescence signal can detect samples as small as nanoparticles. Using the self-gating techniques described herein, it may be possible to apply spectral sorting with real-time detection. A time interval of the photon stream can recognize and/or detect a rise and fall timing of a Gaussian profile produced by the photon stream.

Figure 52:
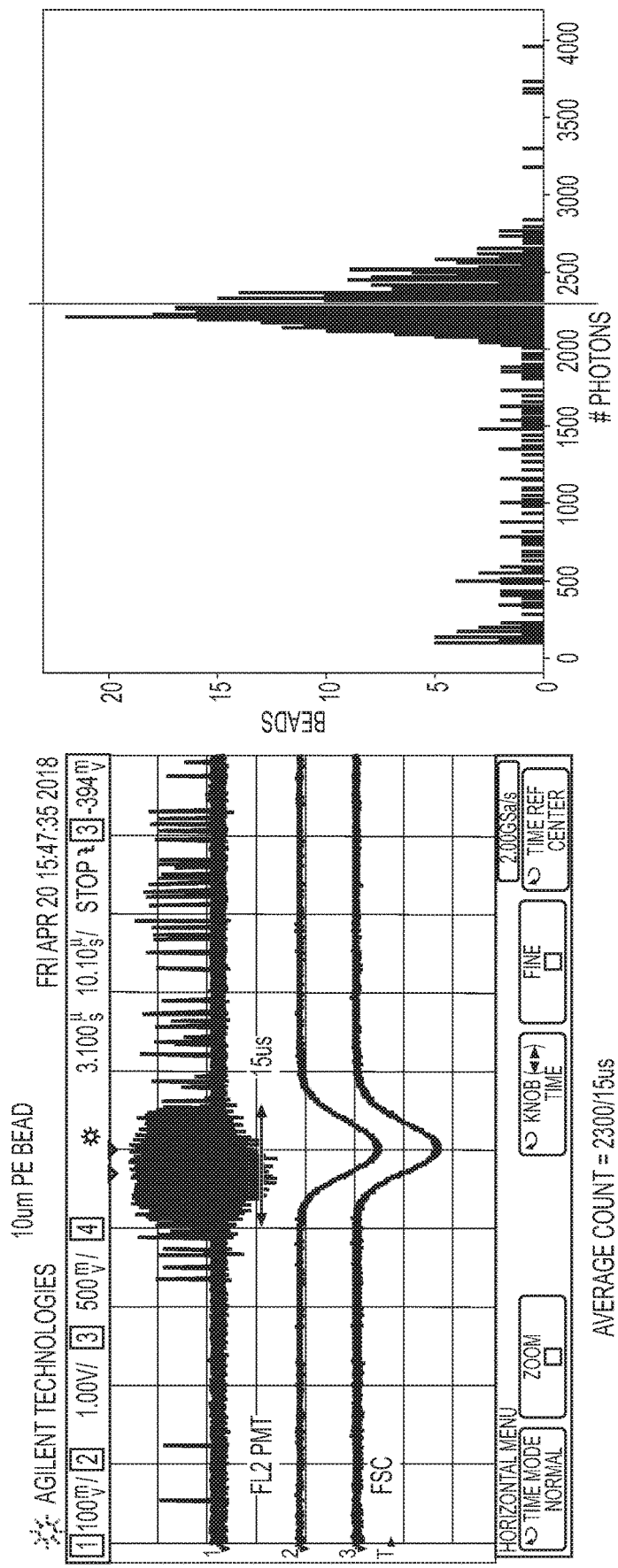
FIG. 52 illustrates an example photostream and an example photon count chart based on detections from an example system.

FIG. 52 illustrates an example photostream and an example photon count chart based on detections from an example system. In various implementations described herein, photon count can be measured from an individual particle as a quantitative value of emitted light (in Joules, e.g.). In various cases, a purely digital measurement of emitted light can be detected from an individual particle. A counter can be implemented using self-gated pulses (see, e.g., FIG. 51). Accordingly, a high speed counter can be implemented, which may illustrated fluorescence emission distribution of one or more particle samples being analyzed.

Figure 53:
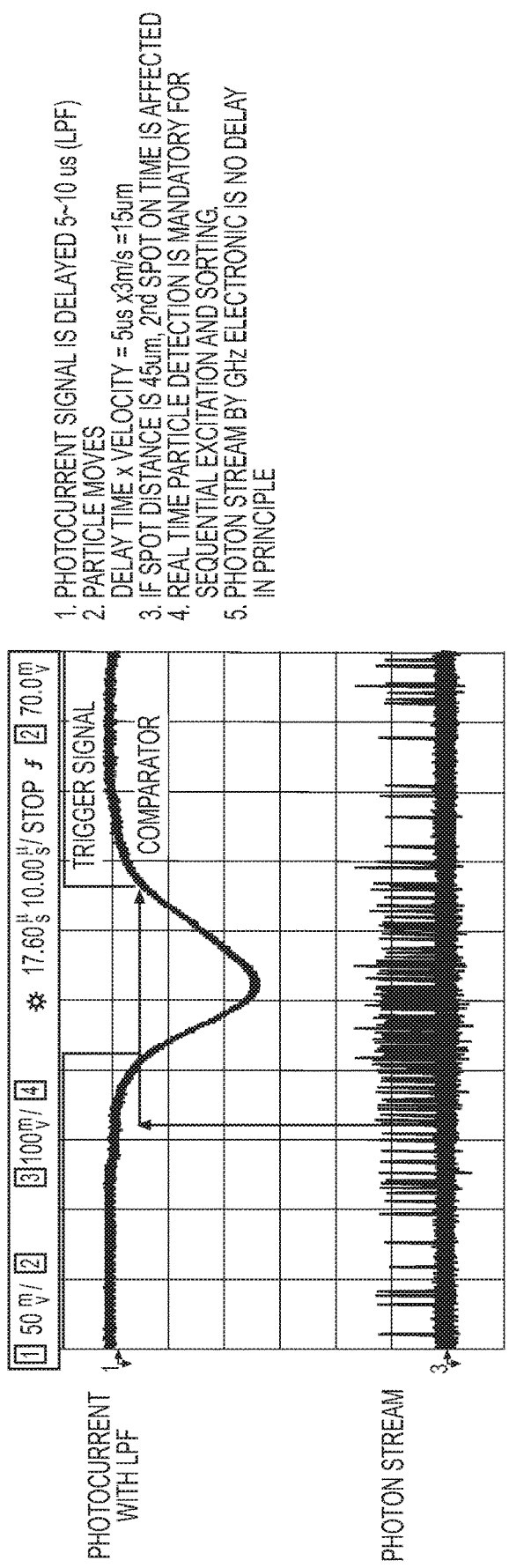
FIG. 53 illustrates an example of data generated showing photon stream particle detection and triggering achieved by an example system.

FIG. 53 illustrates an example of data generated showing photon stream particle detection and triggering achieved by an example system. FIG. 53 illustrates two graphs, one corresponding to photocurrent and one corresponding to photon stream. In some cases, the photocurrent graph represents a signal output by a normal output circuit. The photon stream can be generated (e.g., by a control system) based on multiple outputs from multiple differential output circuits associated with a sensor array. For example, each output of the differential output circuits can be binarized, added together, and then binarized again to generate the photon stream. The x-axis of each graph represents time. As illustrated, the example data illustrates that photocurrent (e.g., with a low pass filter) is delayed compared to the photon stream. The photocurrent signal can be delayed 5-10 us after the photon stream is initially detected. Accordingly, the detection of the photon stream can be used to self-gate the photocurrent. For instance, a number of photons detected per unit of time, which may be derived from the photon stream signal, can be used to rapidly identify when photons are being detected. In some examples, a controller system may generate an event signal by determining that a rate of the photon stream has exceeded a predetermined threshold such as 13.5%, 50%, or some other percentage of a measured peak rate. The event signal can be used to activate at least one circuit (e.g., a normal output circuit and/or phtotocurrent detector) used to generate a photocurrent signal. By self-gating the photocurrent detector using photon count over time, background signals can be discriminated from the photon stream signal.

Various implementations described herein can produce sensitive particle detection and enable sequential excitation. Sequential excitation, in particular, can have a number of applications in flow cytometry. In examples described herein, photon stream detection can have higher sensitivity and detect faster than systems performing photocurrent detection. In some examples, detected signals from a photon stream can be used to trigger a gate signal. Each photon stream can generate a gate signal, which can be used to trigger a circuit performing photocurrent detection. The emission timing to perform sequential excitation can be triggered using the photon stream. In an example method, a photon number per unit period can be achieved by monitoring a change in number of photons detected over a change in time. This photon number per unit period can be equivalent to a derivative of a Gaussian profile. Example methods can use trigger and gate signal generation to improve detection.

Example(s) 7: Flow Systems, Methods, and Devices

Various flow systems, methods, and devices may be utilized to physically arrange samples for analysis. In various implementations, samples may be particles. An example flow system may carry the particles in a fluid, such as water. In some cases, the particles can be arranged in a hydrodynamic planar flow and/or a single-file line of particles. Light can be directed to and received from the flow system via an optical system. In some cases, the flow system may be part of the optical system.

An example flow system may include a solid material and a fluid material (also referred to as a "carrier fluid") flowing through the solid material. In some instances, the solid material may be arranged into a pipe, channel, or some other structure that can support fluid flow. In some cases, the solid material comprises a microfluidic channel. The solid material and/or the fluid material may be at least partially optically transmissive. For instance, the solid material and/or the fluid material may be optically transmissive to at least one excitation beam emitted by an illumination source and/or light emitted from one or more samples in response to being illuminated with the excitation beam(s).

In some implementations, a flow system may include a flow cell. In various implementations, one or more samples can flow through an example flow chamber. In various cases, a flow chamber may be at least partly optically transmissive. For example, a flow chamber may be optically transmissive to at least one wavelength and/or wavelength range of electromagnetic radiation. For example, the flow chamber can be optically transmissive to at least one emission beam and/or at least one excitation beam.

The flow chamber may include a sensing volume. The sensing volume may be a volume upon which incident excitation light is projected. For example, an optical system can project at least one spot on the sensing volume of the flow chamber. The sensing volume may emit resultant light based on the incident excitation light, which may be sensed by the optical system and/or a detection system.

A flow system can include a carrier fluid that arranges multiple samples in a hydrodynamic planar flow and/or a single-file line. In some cases, multiple illumination beams can illuminate a sample as the sample flows through the flow system. For example, the multiple illumination beams may intersect the flow path of the sample at different points or spots. In other words, spots at which the multiple illumination beams intersect the flow path may be spaced apart along a longitudinal axis of the flow system (wherein the longitudinal axis is at least parallel to the flow path of the sample).

Example(s) 8: Support Systems, Methods, and Devices

Various systems (e.g., optical systems, detection systems, flow systems, or the like) described herein may be physically arranged on or within support systems. Various implementations of supports, as well as their corresponding systems, methods, and devices, are described above with reference to at least FIG. 3. In some implementations, a support may include a thermoelectric cooler, such as a Peltier cooler. The thermoelectric cooler may be affixed to and/or fabricated within the support.

Figure 54:
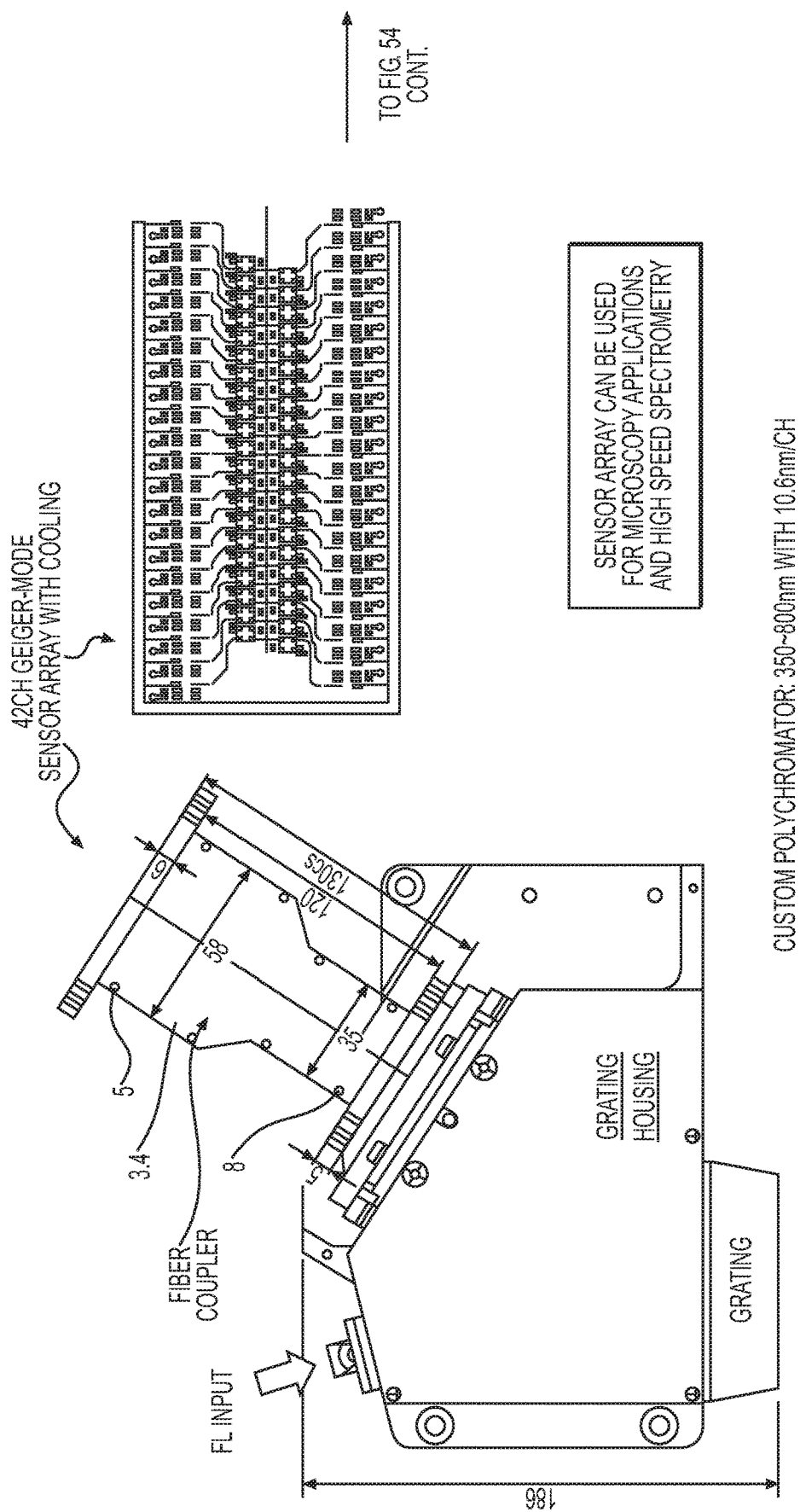
FIG. 54 illustrates an example system with sensor array and cooling system. The system can be used to support at least one optical and/or detection system.
Figure 54:
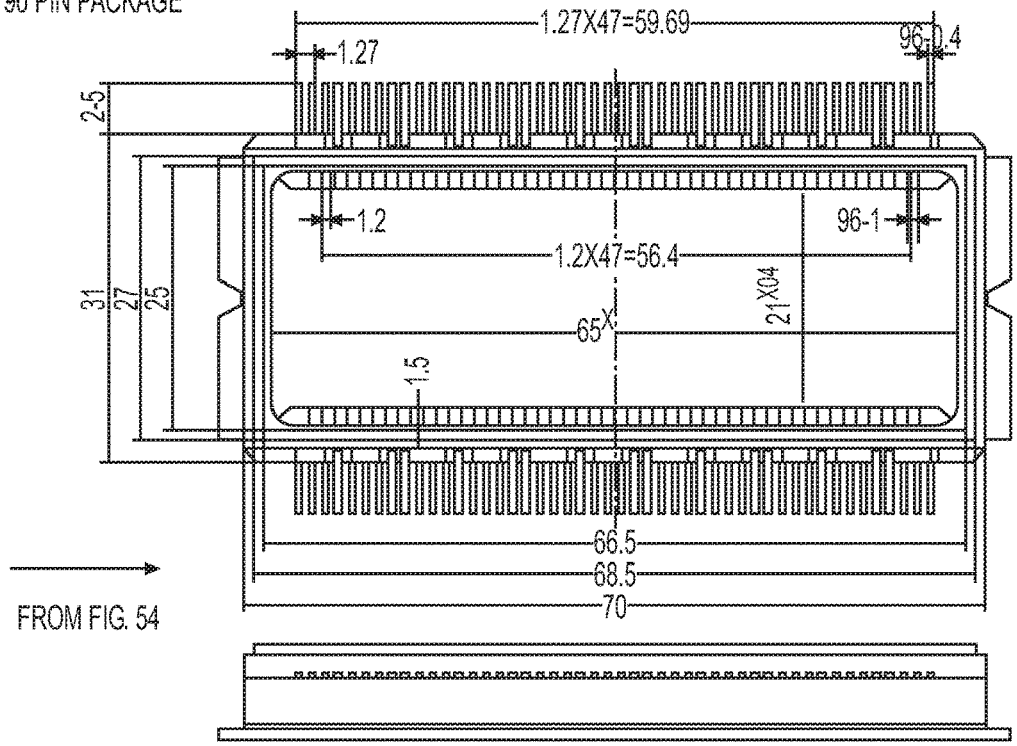
Figure 54:
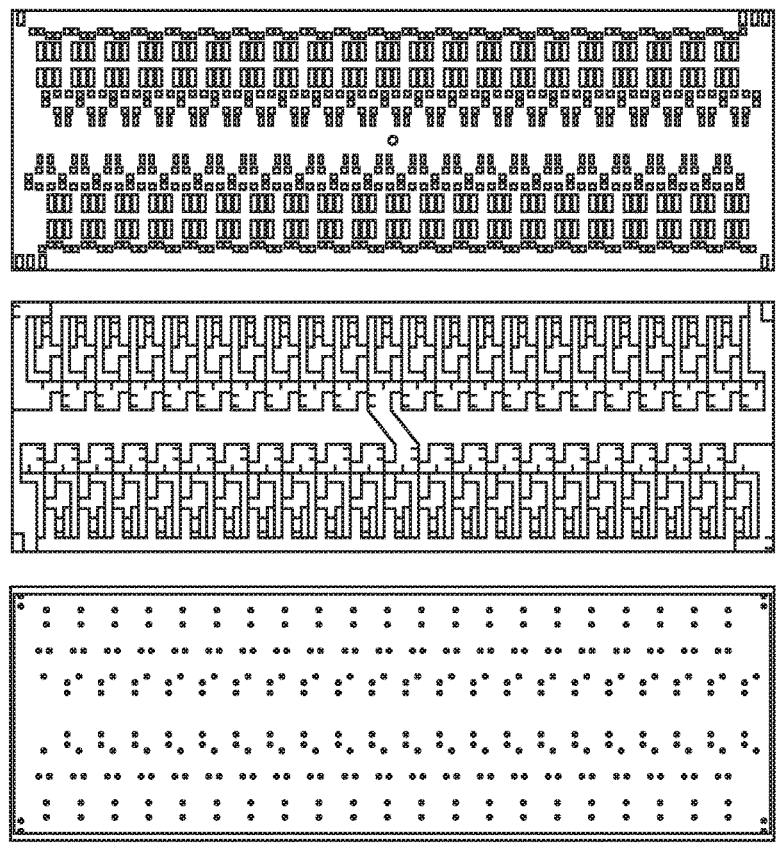

FIG. 54 illustrates an example system with sensor array and cooling system. The system can be used to support at least one optical and/or detection system. Because the cooling system can be integrated into the sensor array, the performance of the PDs in the sensor array can be improved. In various implementations described herein, a housing can support a detection system that can perform full spectral signature detection in UV to Near Infrared (NIR) (e.g. 350 to 800 nm). In an example, spectral bandwidth can be 10.6 nm. In some cases, a thermoelectric cooler and high speed preamp can be integrated into the sensor array package. A monolithic sensor array can integrate electronics used in various systems described herein.

FIG. 55 illustrates an example housing for an optical system. As illustrated, coaxial connections can be used to carry modulation signals to various emission sources (e.g., lasers). A rectangular header can be used to monitor analog output of the system. A DC power input can provide power to the emission sources of the system.

Example(s) 9: Controller Systems, Methods, and Devices

In various implementations, controller systems, methods, and devices can be configured to control emission sources, to control circuitry, and/or to process data based on received fluorescent signals from one or more samples.

Figure 56:
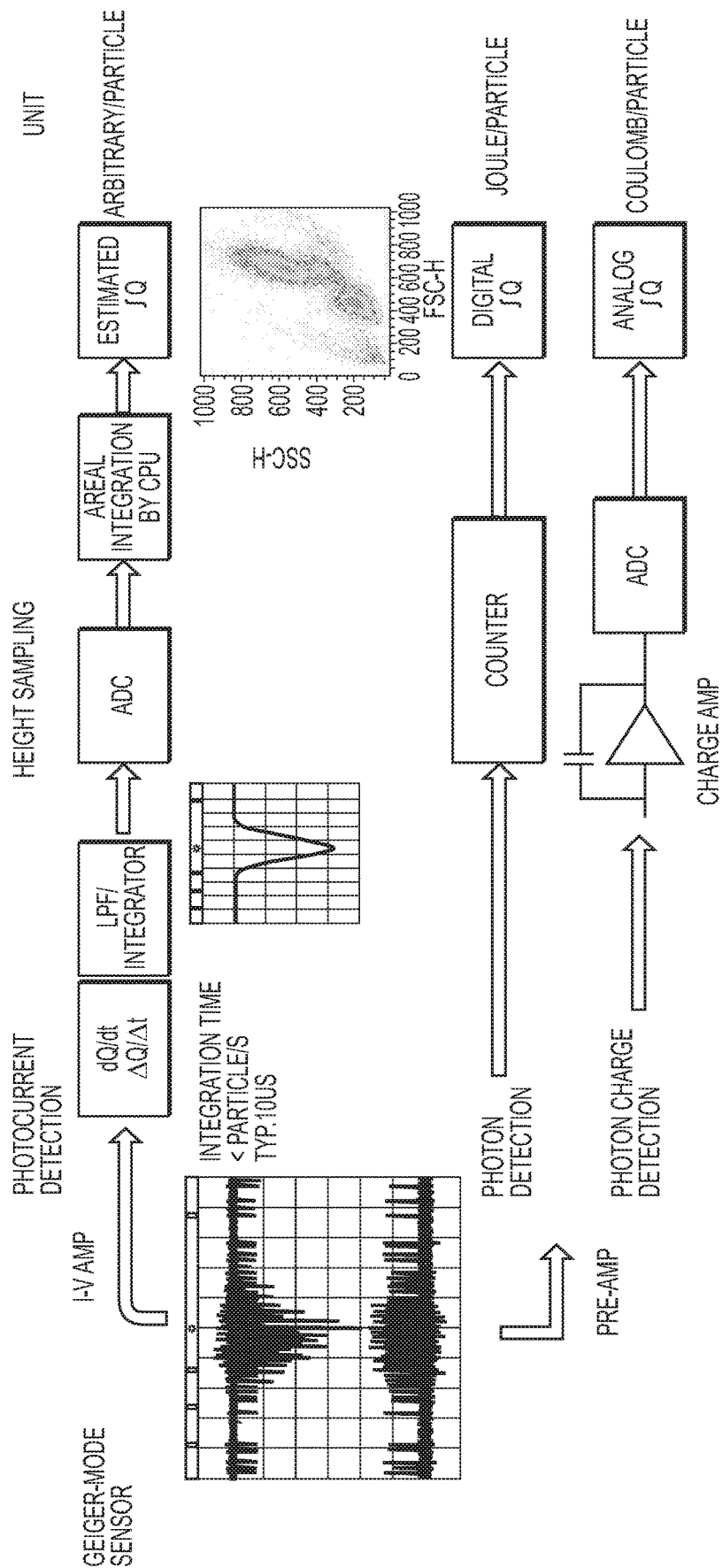
FIG. 56 illustrates a general diagram of example systems that can be used to detect photons and photocurrents emitted from samples.

FIG. 56 illustrates a general diagram of example systems that can be used to detect photons and photocurrents emitted from samples. As illustrated in FIG. 56, a first detection circuit can be used to detect photocurrent, a second detection circuit can be used to detect photon count, and a third detection current can be used to detect photon charge. In various implementations, the first detection circuit can be used to detect photocurrent of multiple photons, which may be detected by multiple sensing elements. In some examples, the first detection circuit can be utilized as a normal output circuit. According to some implementations, one or both of the second or third detection circuits can be used as a differentiating output circuit. In various implementations, a controller system can monitor photon count and photocurrent based on detected fluorescent signals generated by one or more detection systems.

Figure 57:
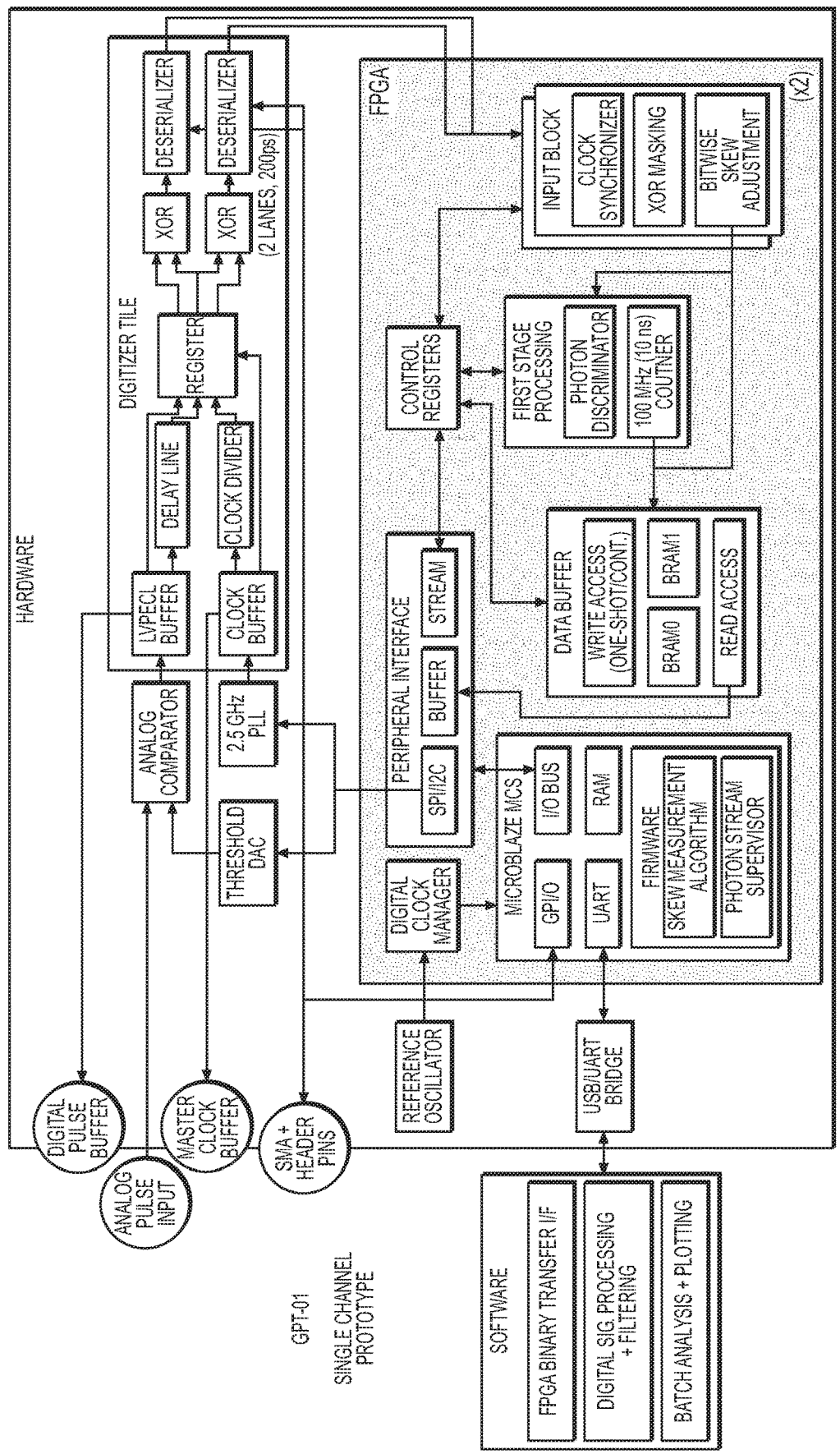
FIG. 57 illustrates an example digitizer that can be utilized by a controller system (e.g., an FPGA) according to various implementations described herein.

FIG. 57 illustrates an example digitizer that can be utilized by a controller system (e.g., an FPGA) according to various implementations described herein. In various implementations, the example digitizer can be configured to perform time addressing of various signals (e.g., photon stream and/or photocurrent) signals analyzed by the controller system.

In some examples, the FPGA or other controller runs at a fixed sampling interval. In each sampling interval, the FPGA determines whether a photon pulse is present an input. The FPGA increments a counter if the pulse is present, or stores an indication in a buffer that a pulse was present during that time period. In some examples, the FPGA determines a rate as a discrete derivative, moving average over the buffer, or other aggregation of counts or of times (e.g., sample indices) at which pulses were received.

Figure 58:
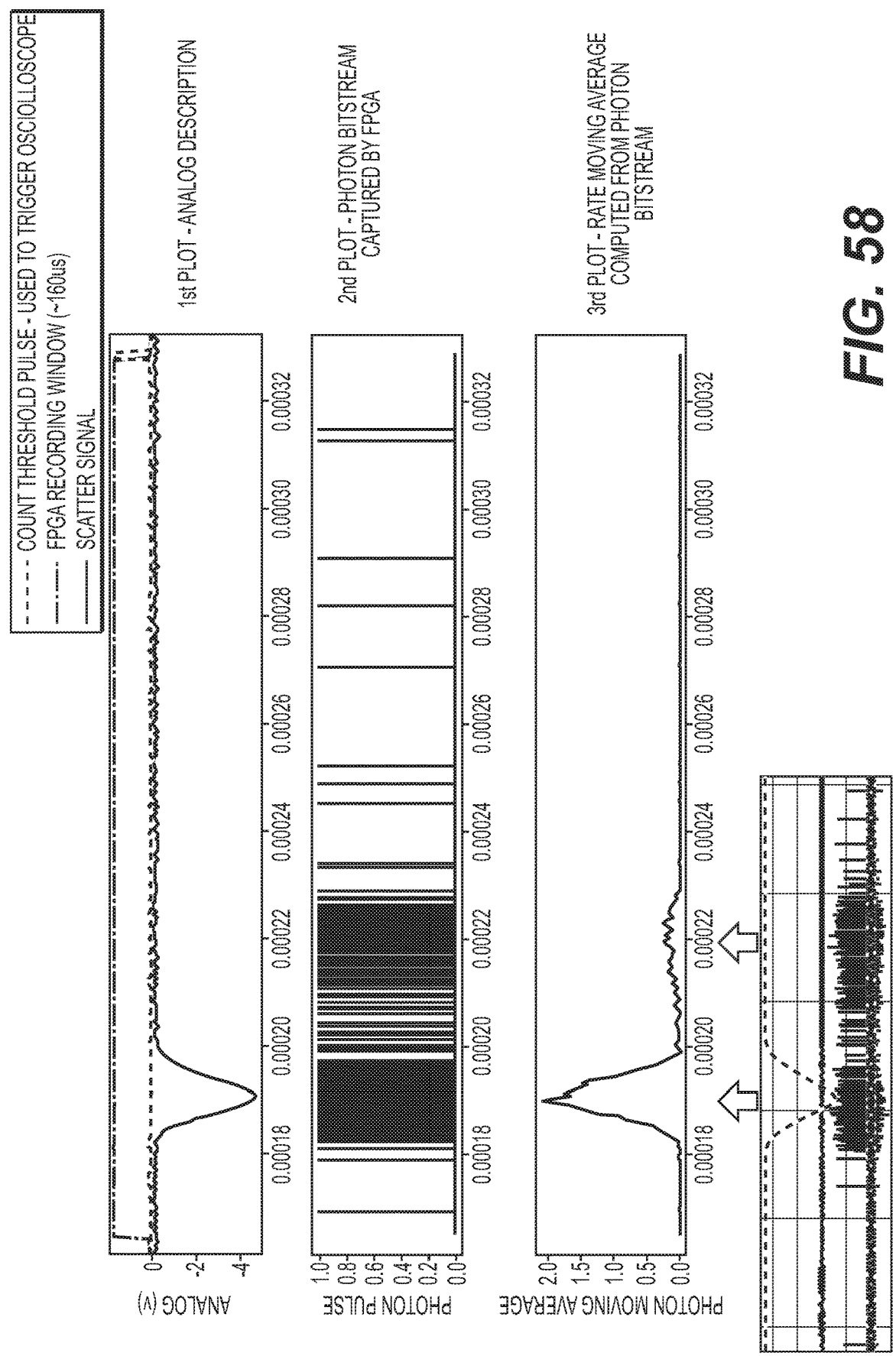
FIG. 58 illustrates an example of time addressing, which can be performed by a controller system in some cases.

FIG. 58 illustrates an example of time addressing, which can be performed by a controller system in some cases. In various implementations, individual time addressing can be used to analyze signal characteristics (e.g., output by a detection system) for background and/or sample-based signal. A time interval between time addresses can be used to enable gating and/or average pulse profiles of detected signals. In various implementations, an individual photon signal can be addressed with 100 ps resolution. The addresses can be stored in memory.

Example(s) 10: Experimental Examples

Figure 59:
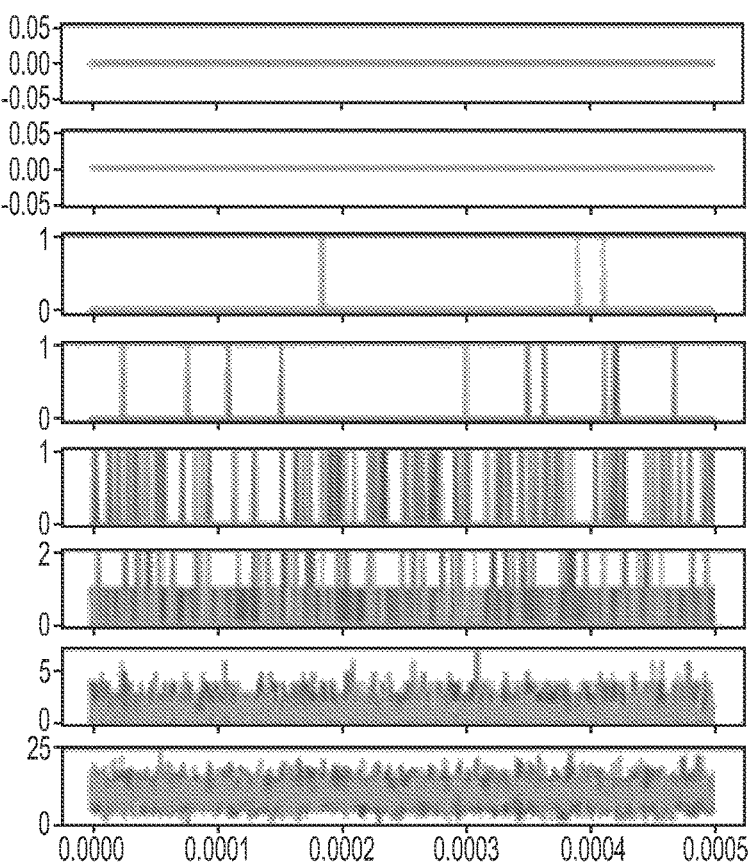
FIG. 59 for example, illustrates results of a simulated photon stream that can be used for photocurrent triggering at different thresholds.
Figure 59:
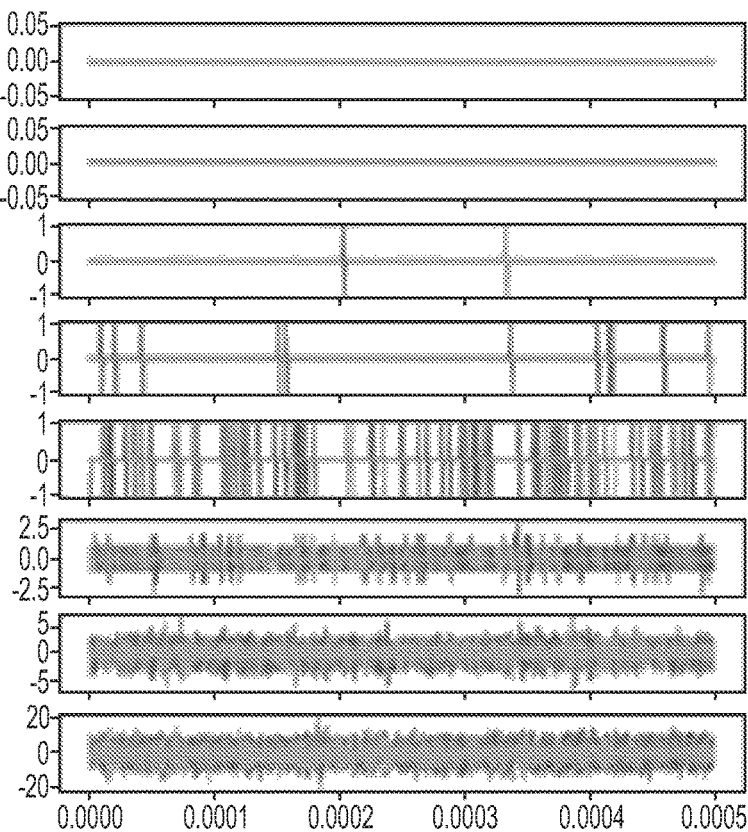
Figure 60:
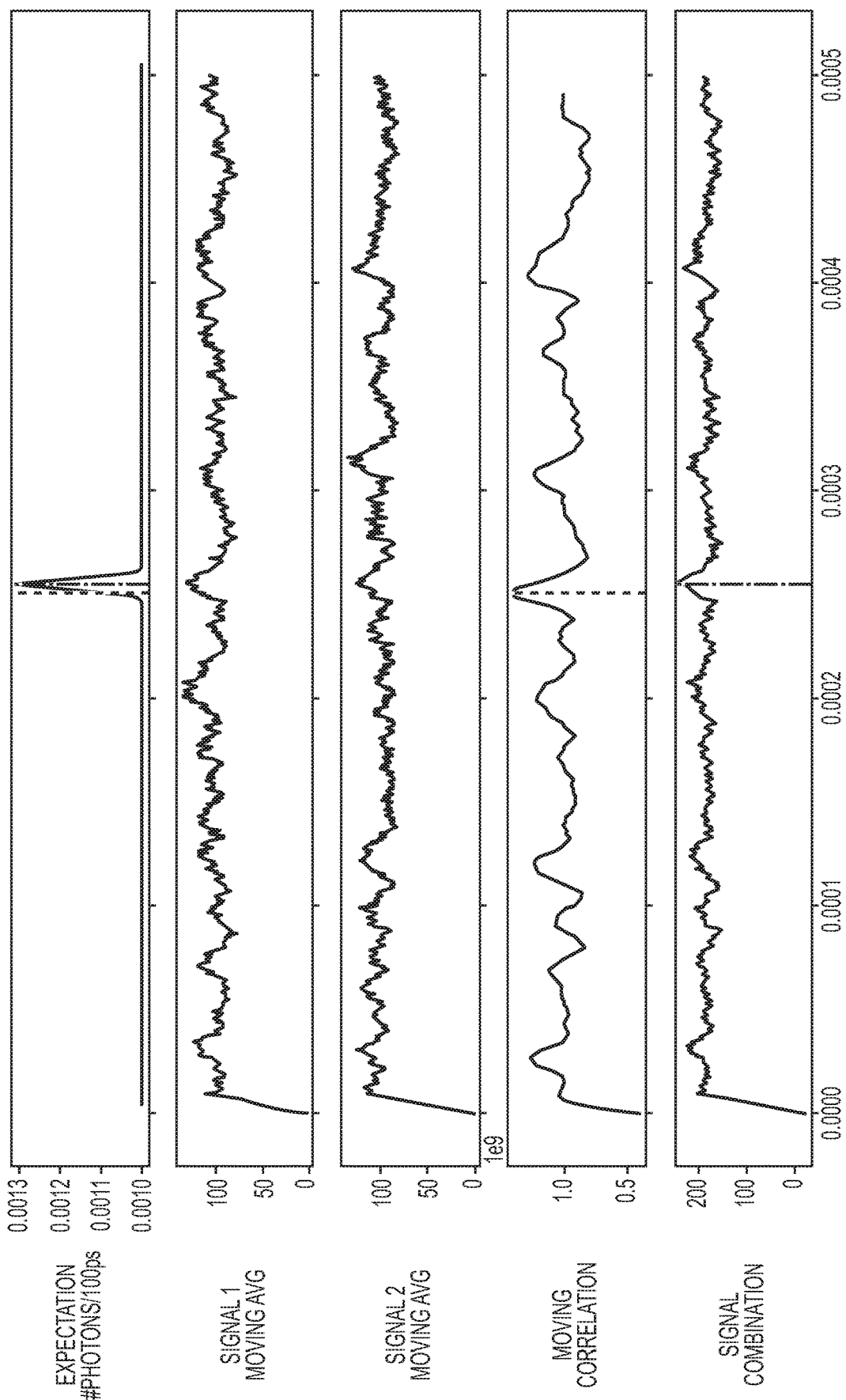
FIG. 60 illustrates an example of various correlation algorithms used to detect a single photon from a sample (e.g., a particle).

Various experimental examples were performed according to implementations of the present disclosure. The results of these examples are illustrated in FIGS. 59 and 60. FIG. 59 for example, illustrates results of a simulated photon stream that can be used for photocurrent triggering at different thresholds. For example, a threshold level based on raw count of a number of photons in a given time interval (e.g., 1 us) was utilized, a threshold level based on a raw count differential in a given time interval was utilized, a threshold based on a moving average of photon count over a given time interval (e.g., 10 ns) was utilized, and a threshold based on a differential of the moving average over a window (e.g., 1 us) was utilized. Each type of threshold to perform triggering resulted in acceptable filtering of background level photocurrent.

FIG. 60 illustrates an example of various correlation algorithms used to detect a single photon from a sample (e.g., a particle). In this example, a peak equivalent count may be smaller than the dark count (3 Mcp vs. 10 Mcps). In the single 10 ns photon pulse illustrated in FIG. 60, approximately only 20 photons were detected. Using the various correlation algorithms illustrated in FIG. 60, a single photon count pulse can be accurately measured.

Example Clauses

Various examples include one or more of, including any combination of any number of, the following example features.

A. A system, including: a support; two or more sensor elements mounted to the support, each sensor element electrically connected to a common electrical node.

AA. The system of clause A, wherein each sensor element includes: a respective quench resistor connected to a respective internal node; and a respective photodiode (PD) connected to the respective internal node.

AB. The system of clause A or AA, further including: a differentiating element fed by at least one of the photodiodes AC. The system of any one of clauses A to AB, further including: a first readout electrode fed by the common electrical node; and a second readout electrode fed by the differentiating element.

AD. The system of any one of clauses A to AC, wherein the common electrical node is connected to at least one of the quench resistors or at least one of the photodiodes.

AE. The system of any one of clauses A to AD, further including: a drive circuit configured to operate the sensor elements in a Geiger mode of operation; and a photocurrent detector fed by at least two of the sensor elements.

AF. The system of any one of clauses AA to AE, each sensor element further including a respective differentiating element having a first terminal and a second terminal, the first terminal electrically connected to both the respective quench resistor and the respective photodiode.

AG. The system of any one of clauses A to AF, further including a thermoelectric cooler mounted to the support.

AH. The system of any one of clauses A to AG, further including a spectral disperser configured to receive light and disperse the light spectrally across the two or more sensor elements.

B. A system, including: a support; a common electrical node; two or more sensor elements mounted to the support, each sensor element electrically connected to the common electrical node and including: a respective quench resistor connected to a respective internal node; and a respective photodiode (PD) connected to the respective internal node; a differentiating element fed by the common electrical node; a first readout electrode fed by the common electrical node; and a second readout electrode fed by the differentiating element; wherein the common electrical node is connected to at least one of the quench resistors or at least one of the photodiodes.

BA. The system of clause B, further including: a second electrical node; and an amplifier fed by the common electrical node and feeding the second electrical node; wherein the differentiating element is fed by the second electrical node.

BB. The system of clause BA, wherein the amplifier and the differentiating element are configured so that, of the induced photo electron charge generated at the PDs, at most ten percent is absorbed by the differentiating element.

BC. The system of any of clauses B to BB, further including a low-pass filter fed by the common electrical node and feeding the first readout electrode.

C. An optical system, including: a first lens element having a first concave face and a second face; a flow cell spaced apart from the first face of the first lens element and having: a flow chamber passing therethrough; and a mirror arranged opposite the flow chamber from the first lens element and configured to direct light leaving the flow chamber towards the first face of the first lens element; wherein at least one wall of the flow chamber is at least partly optically transmissive; and a second lens element arranged opposite the first lens element from the flow cell and spaced apart from the second face of the first lens element, the second lens element having a first aspherical convex face and a second aspherical convex face; wherein the flow cell, the first lens element, and the second lens element are configured to image resultant light originating from within the flow chamber onto an imaging plane opposite the second lens element from the first lens element.

CA. The system of clause C, further including a fiber coupling disposed substantially at the imaging plane and positioned to receive the imaged resultant light.

CB. The system of clause CA, further including an optical fiber coupled to the fiber coupling, wherein: the flow cell, the first lens element, and the second lens element are configured to image the resultant light from within a sensing volume of the flow chamber onto an image area of the imaging plane; and the fiber coupling is positioned to retain the optical fiber so that a core of the optical fiber substantially contains the image area.

CC. The system of clause CB, wherein: the optical fiber has a proximal end and a distal end; the proximal end is coupled to the fiber coupling; the system further includes a spectral disperser and a disperser mount; and the disperser mount is configured to retain the distal end in position to illuminate the spectral disperser.

CD. The system of clause CB or CC, wherein the optical fiber is configured to disperse light received at the proximal end so that illumination emitted from the distal end is substantially spatially uniform across the core of the optical fiber.

D. A system, including: at least two narrow-band illumination sources configured to provide respective beams; a flow chamber; a structure arranged to direct the respective beams from each of the narrow-band illumination sources along respective beam paths; and a second structure configured to direct the respective beams to intersect a longitudinal axis of the flow chamber at respective, spaced-apart locations.

DA. The system of clause D, further including an X Y shifter arranged along at least one of the respective beams optically upstream of the second structure.

DB. The system of clause D or DA, further including focusing optics configured to focus the spectrally-dispersed light into discrete, spaced-apart spots arranged along the longitudinal axis of the flow chamber.

E. A system, including: at least two narrow-band illumination sources, the at least two narrow-band illumination sources including a first source and a second source configured to provide respective beams; a flow chamber; an optical arrangement, wherein: the optical arrangement is configured to direct respective beams from each of the narrow-band illumination sources through respective, spaced-apart locations at respective, spaced-apart locations along a longitudinal axis of the flow chamber; and the optical arrangement is configured to direct a first beam from the first source along an illumination axis; an optical sensor configured to provide an output associated with incident light, the optical sensor arranged substantially on the illumination axis and optically downstream of the flow chamber from the first source; a controller configured to, in order: operate the first source; detect a variation in the output at a first time; enable the second source at a second time, the second time being substantially a predetermined time interval after the first time.

EA. The system according to clause E, wherein the output includes at least one of: a photocurrent, charge, or photon-count output from a photodiode or sensor element; a plurality of signals from a split photodiode; a plurality of signals from a position-sensitive photodetector; or a combination of either of the above pluralities of signals.

EB. The system of clause EA, further including: a photodiode; a differentiating element fed by the photodiode and configured to provide a photon signal; and a controller configured to count pulses of the photon signal.

EC. The system of clause EA or EB, further including components recited in any of clauses G to GC or I to IC.

ED. The system of any one of clauses E to EC, further including a flow system configured to move samples through the flow chamber in a flow direction at a flow rate, wherein: the location associated with the second source is downstream of the location associated with the first source along the flow direction; and the predetermined time interval substantially corresponds to the time required for a sample to move at the flow rate from the location associated with the first source to the location associated with the second source.

EE. The system of any one of clauses E to ED, the controller further configured to, before detecting the variation, disable the second source.

EF. The system of any one of clauses E to EE, the controller further configured to disable the second source upon expiration of a second predetermined time interval after enabling the second source.

F. A system, including: a narrow-band illumination source configured to provide respective beams; a flow chamber; a flow system configured to move samples through the flow chamber in a flow direction, an optical arrangement configured to direct a beam from the narrow-band illumination source through the flow chamber along an illumination axis; an optical sensor configured to provide an output associated with incident light, the optical sensor arranged substantially on the illumination axis and optically downstream of the flow chamber from the first source; a controller configured to, in order: operate the first source; detect a variation in the output from the optical sensor; and in response, provide an output indicative of detection of a sample.

FA. The system of clause F, wherein the output includes at least one of: a plurality of signals from a split photodiode; a plurality of signals from a position-sensitive photodetector; or a combination of either of the above pluralities of signals.

FB. The system of clause F or FA, wherein: the optical sensor includes a split photodiode; the system further includes: an optical director arranged optically upstream of the flow chamber along the beam and configured to adjust a spatial position of the beam with respect to the flow chamber; a second optical sensor arranged optically downstream of the flow chamber from the first source; and an element configured to direct at least some of the beam to the second optical sensor; and the controller is further configured to: adjust a power output of the narrow-band illumination source based at least in part on an output of the second optical sensor; and control the optical director based at least in part on the output of the optical sensor.

G. A system, including: a support; two or more sensor elements mounted to the support, each sensor element electrically connected to a common electrical node and including: a respective quench resistor connected to a respective internal node; and a respective photodiode (PD) connected to the respective internal node; a differentiating element fed by at least one of the sensor elements; a readout electrode fed by the differentiating element; a drive circuit configured to operate the sensor elements in a Geiger mode of operation; and a pulse counter connected to the readout electrode and configured to count pulses of electrical current from the differentiating element.

GA. The system of clause G, further including: the common electrical node electrically connected to the two or more sensor elements; a second readout electrode fed by the common electrical node; and a current detector fed by the second readout electrode; wherein the differentiating element is fed by at least one of the respective internal nodes.

GB. The system of clause G or GA, the pulse counter including a memory configured to store time information of the pulses of electrical current.

GC. The system of any one of clauses G to GB, further including: a second readout electrode fed by the common electrical node; and a detector configured to detect an electrical current on the second readout electrode.

H. A system, including: a narrow-band illumination source configured to provide respective beams; a sensor element including a quench resistor electrically in series with a photodiode (PD); a readout electrode fed by the sensor element; a measurement device connected to the readout electrode and configured to accept signals having levels within a predetermined range of signal levels; a drive circuit configured to apply a bias voltage across the sensor element; and a controller configured to: detect that signal(s) on the readout electrode meet a predetermined threshold criterion; and in response, cause the drive circuit to adjust the bias voltage so that the readout electrode carries signals within the predetermined range.

HA. The system of clause H, further including a thermoelectric cooler mechanically coupled to the sensor element.

I. A system, including: a support; a sensor element including a quench resistor electrically in series with a photodiode (PD); a differentiating element fed by the internal node; a drive circuit; and a pulse detector fed by the differentiating element at least partly via a first node and configured to determine a rate of pulses of electrical current on the first node.

IA. The system of clause I, further including a comparator fed by the differentiating element at least partly via a second node, wherein the comparator is configured to: receive a signal on the second node; determine that the signal meets predetermined acceptance criteria; and in response, feed a pulse of the pulses of electrical current to the first node.

IB. The system of clause I or IA, further including: an optical detector; and a controller configured to: initiate data capture using the optical detector in response to the rate meeting predetermined rate-based initiation criteria; and, subsequently, discontinue data capture using the optical detector in response to the rate meeting predetermined rate-based termination criteria.

IC. The system of any one of clauses I to IB, further including a controller configured to: determine that the rate of pulses meets predetermined rate-based initiation criterion; and in response, provide an event signal.

J. A system, including: a support; two or more sensor elements mounted to the support, each sensor element electrically connected to a common electrical node and including: a respective quench resistor connected to a respective internal node; a respective photodiode (PD) connected to the respective internal node; and a differentiating element connected to the respective internal node; one or more readout electrodes fed by the respective differentiating elements; a spectral disperser configured to spectrally disperse incoming light across the two or more sensor elements; a drive circuit configured to operate the sensor elements in a Geiger mode of operation; a pulse detector connected to at least a first readout electrode of the one or more readout electrodes and configured to determine a rate of pulses of electrical current output from at least one of the differentiating elements; and a controller configured to: initiate data capture in response to the rate meeting predetermined rate-based initiation criteria; and, subsequently, discontinue data capture in response to the rate meeting predetermined rate-based termination criteria, wherein the controller is further configured to count pulses from at least two of the differentiating elements during data capture.

JA. The system of clause J, wherein at least the controller does not use forward-scattered resultant light (FSC) in determining when to initiate or discontinue data capture; the controller does not use side-scattered resultant light (SSC) in determining when to initiate or discontinue data capture; or the controller uses neither FSC nor SSC in determining when to initiate or discontinue data capture.

K. Any one of clauses A to JA, further including an optical element configured to direct fluorescent light emitted from within the flow chamber to the photodiode(s).

L. Any one of clauses A to K, or any combination of, any clause herein, together with filtering, envelope-detection, or thresholding circuitry.

M. Any one of clauses A to L, or any combination of, any clause herein, further including operations including: measuring two different photon signals; determining a correlation between the two photon signals; and producing an output indicative of detection of a particle in response to the correlation meeting predetermined acceptance criteria.

Conclusion

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more data processing systems 3901, 3904 or processors 3986, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A silicon photomultiplier (SiPM) system, comprising:
    an SiPM array, comprising:
        a plurality of photosensors, each photosensor including a quench resistor coupled in series with a Geiger-mode avalanche photodiode (APD),
        a first electrode configured to provide an output signal of the SiPM array, the output signal comprising an amalgamation of the plurality of APD signals;
        a second electrode configured to provide a biasing voltage to each of the plurality of photosensors;
    a differentiator coupled to the first electrode and configured to differentiate the output signal of the SiPM array as a function of time to thereby amplify events in the output signal associated with incidence of photons thus enabling identification of two or more photons closely incident in time in range of nanoseconds, the differentiator configured to generate a differentiated signal from the output signal; and
    a pulse counting circuit coupled to the differentiator and configured to generate pulses associated with the differentiated signal.

2. The SiPM system according to claim 1, wherein the pulse counting circuit includes a buffer and a comparator with a threshold.

3. The SiPM system according to claim 2, wherein the threshold is an adaptive threshold based on an envelope of the photon signal.

4. The SiPM system according to claim 3, wherein the pulse counting circuit delays the photon signal so as to arrive concurrently at the comparator with the adaptive threshold.

5. The SiPM system according to claim 4, wherein the pulse counting circuit further includes a counter and memory configured to store time information of the photon signal corresponding to pulses counted by the pulse counting circuit.

6. The SiPM system according to claim 1, wherein the differentiator includes a resistor-capacitor (RC) high-pass filter.

7. The SiPM system according to claim 6, wherein the capacitor of the RC high- pass filter is coupled to the first electrode and the resistor of the RC high-pass filter couples the capacitor to ground, such that a node between the capacitor and the resistor provides output of the differentiator.

8. The SiPM system according to claim 6, wherein the differentiator further includes an amplifier configured to buffer the output of the differentiator.

9. A particle detection optical system, comprising:
    at least two narrow-band illumination sources, the at least two narrow-band illumination sources comprising a first source and a second source configured to provide respective beams;
    a flow chamber;
    an optical arrangement, wherein the optical arrangement is configured to direct respective beams from each of the at least two narrow-band illumination sources through respective spaced- apart locations disposed along a longitudinal axis of the flow chamber, wherein the optical arrangement is further configured to direct a first beam from a first source of the at least two narrow-band illumination sources along an illumination axis;

an optical sensor configured to provide an output signal associated with the first beam, the optical sensor arranged substantially on the illumination axis and optically positioned after the flow chamber; and a controller configured to:
operate the first source of the at least two narrow-band illumination sources, establish a baseline associated with the output signal,
detect a variation as compared to the baseline in the output signal at a first time, and enable the second source of the at least two narrow-band illumination sources at a second time, the second time being substantially a predetermined time interval after the first time;

the optical sensor includes a silicon photomultiplier (SiPM) array, comprising:
a plurality of photosensors, each photosensor including a quench resistor coupled in series with a Geiger-mode avalanche photodiode (APD),
a first electrode configured to provide an output signal of the SiPM array, the output signal comprising an amalgamation of the plurality of APD signals,
a second electrode configured to provide a biasing voltage to each of the plurality of photosensors, a differentiator coupled to the first electrode and configured to differentiate the output signal of the SiPM array, as a function of time to thereby amplify events in the output signal associated with incidence of photons thus enabling identification of two or more photons closely incident in time in nanosecond range, the differentiator configured to generate a differentiated signal from the output signal, and a pulse counting circuit coupled to the differentiator and configured to generate pulses associated with the differentiated signal, wherein the pulse counting circuit includes a buffer and a comparator with a threshold, wherein the threshold is an adaptive threshold based on an envelope of the photon signal, wherein the pulse counting circuit delays the photon signal so as to arrive concurrently at the comparator with the adaptive threshold, and wherein the pulse counting circuit further includes a counter and memory configured to store time information of the photon signal corresponding to pulses counted by the pulse counting circuit.

10. The particle detection optical system according to claim 9, wherein the differentiator includes a resistor-capacitor (RC) high-pass filter.

11. The particle detection optical system according to claim 10, wherein the capacitor of the RC high-pass filter is coupled to the first electrode and the resistor of the RC high-pass filter couples the capacitor to ground, such that a node between the capacitor and the resistor provides output of the differentiator.

12. The particle detection optical system according to claim 11, wherein the differentiator further includes an amplifier configured to buffer the output of the differentiator.

13. The particle detection optical system according to claim 9, wherein the output signal is selected from the group consisting of a photocurrent, a charge, a photon-count output from a photodiode or sensor element, a plurality of signals from a split photodiode, a plurality of signals from a position-sensitive photodetector, and any combination thereof.

14. The particle detection optical system according to claim 13, further comprising a flow system configured to move samples through the flow chamber in a flow direction at a flow rate.

15. The particle detection optical system according to 14, wherein the respective spaced-apart location associated with the second source of the at least two narrow-band illumination sources is downstream of the location associated with the first source of the at least two narrow-band illumination sources along the flow direction.

16. The particle detection optical system according to 15, wherein the predetermined time interval substantially corresponds to amount of time required for a sample to move at the flow rate from the spaced-apart location associated with the first source of the at least two narrow-band illumination sources and the spaced-apart location associated with the second source of the at least two narrow-band illumination sources.

17. The particle detection optical system according to claim 9, the controller further configured to selectively cycle through the at least two narrow-band illumination sources.

18. The particle detection optical system according to claim 9, the controller further configured to disable the second source of the at least two narrow-band illumination sources upon expiration of a second predetermined time interval after enabling the second source of the at least two narrow-band illumination sources.

\* \* \* \* \*